(12) United States Patent
Jeon et al.

(10) Patent No.: US 11,399,393 B2
(45) Date of Patent: Jul. 26, 2022

(54) RANDOM ACCESS BACKOFF INDICATOR

(71) Applicants: Hyoungsuk Jeon, Centreville, VA (US); Esmael Dinan, McLean, VA (US); Kyungmin Park, Vienna, VA (US); Ali Cirik, Herndon, VA (US); Hua Zhou, Herndon, VA (US); Alireza Babaei, Fairfax, VA (US); Kai Xu, Herndon, VA (US)

(72) Inventors: Hyoungsuk Jeon, Centreville, VA (US); Esmael Dinan, McLean, VA (US); Kyungmin Park, Vienna, VA (US); Ali Cirik, Herndon, VA (US); Hua Zhou, Herndon, VA (US); Alireza Babaei, Fairfax, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 191 days.

(21) Appl. No.: 16/738,483

(22) Filed: Jan. 9, 2020

(65) Prior Publication Data
US 2020/0221506 A1   Jul. 9, 2020

Related U.S. Application Data

(60) Provisional application No. 62/790,400, filed on Jan. 9, 2019.

(51) Int. Cl.
*H04W 4/00* (2018.01)
*H04W 74/08* (2009.01)

(52) U.S. Cl.
CPC ... *H04W 74/0833* (2013.01); *H04W 74/0808* (2013.01)

(58) Field of Classification Search
CPC ............... H04W 74/0833; H04W 74/0808
See application file for complete search history.

(56) References Cited

U.S. PATENT DOCUMENTS

| 2018/0270869 A1* | 9/2018 | Tsai | H04W 76/27 |
| 2020/0128582 A1* | 4/2020 | Chen | H04W 74/085 |
| 2020/0351946 A1* | 11/2020 | Pang | H04W 74/006 |

OTHER PUBLICATIONS

3GPP TSG RAN WG1 Meeting #95 R1-1814380; Spokane, USA, Nov. 12-16, 2018; Title: CR to 38.213 capturing the RAN1#94bis and RAN1#95 meeting agreements; Source to WG: Samsung; Source to TSG: Work item code: NR_newRAT-Core Date: Nov. 21, 2018; Category: F Release: Rel-15.

(Continued)

*Primary Examiner* — Siren Wei
(74) *Attorney, Agent, or Firm* — Brett Gardner; Kavon Nasabzadeh; Philip R. Smith

(57) ABSTRACT

A wireless device transmits, for a random access procedure, a first preamble via a cell comprising a first sub-band and a second sub-band. The wireless device receives a random access response. The random access response indicates a first backoff indicator indicating a first backoff time interval of the first sub-band. The random access response indicates a second backoff indicator indicating a second backoff time interval of the second sub-band. The wireless device determines a preamble retransmission for the random access procedure. The wireless device selects, as a backoff time interval, a shorter one of the first backoff time interval and the second backoff time interval. The wireless device performs, at a time based on the backoff time interval, a listen-before-talk procedure.

20 Claims, 43 Drawing Sheets

(56) References Cited

OTHER PUBLICATIONS

3GPP TSG RAN WG1 Meeting #95 R1-1814400; Spokane, USA, Nov. 12-16, 2018; Title: Combined CR of all essential corrections to 38.212 from RAN1#94bis and RAN1#95; Source to WG: Huawei; Source to TSG: R1; Work item code: NR_newRAT-Core Date: Nov. 18, 2018; Category: F Release: Rel-15.
3GPP TS 38.213 V15.3.0 (Sep. 2018); 3rd Generation Partnership Project; Technical Specification Group Radio Access Network; NR; Physical layer procedures for control (Release 15).
3GPP TSG-RAN1 Meeting #95 R1-1814395; Spokane, USA, Nov. 12-16, 2018; Title: Combined CR of all essential corrections to 38.214 from RAN1#94bis and RAN1#95; Source to WG: Nokia; Source to TSG: R1; Work item code: NR_newRAT-Core Date: Nov. 30, 2018; Category: F Release: Rel-15.
3GPP TS 38.214 V15.3.0 (Sep. 2018); 3rd Generation Partnership Project; Technical Specification Group Radio Access Network; NR; Physical layer procedures for data (Release 15).
3GPP TS 38.321 V15.3.0 (Sep. 2018); 3rd Generation Partnership Project; Technical Specification Group Radio Access Network; NR; Medium Access Control (MAC) protocol specification (Release 15).
3GPP TS 38.331 V15.3.0 (Sep. 2018); 3rd Generation Partnership Project; Technical Specification Group Radio Access Network; NR; Radio Resource Control (RRC) protocol specification (Release 15).
3GPP TSG RAN WG1 Meeting #95 R1-1813221; Spokane, USA, Nov. 12-16, 2018; Agenda Item: 7.2.2.4.2; Source: InterDigital Inc.; Title: Discussion on Procedures for Initial Access and Mobility in NR-U ; Document for: Discussion and Decision.
3GPP TSG-RAN WG2 Meeting #104 R2-1816261; Spokane, USA, Nov. 12-16, 2018 resubmission of R2-1813586; Agenda Item: 11.2.1.1; Source: OPPO; Title: Enhancements of 4-steps RACH in NR-U and the corresponding TP; Document for: Discussion, Decision.
3GPP TSG-RAN WG2 Meeting #104 R2-1816263; Spokane, USA, Nov. 12-16, 2018; Agenda Item: 11.2.1.1; Source: OPPO; Title: 2-steps RACH procedure for NR-U; Document for: Discussion, Decision.
3GPP TSG-RAN2 104 R2-1816312; Spokane, USA, Nov. 12-16, 2018; Agenda item: 11.2.1.1; Source: Samsung ; Title: Random Access Response Reception in NR-U; Document for: Discussion & Decision.
3GPP TSG RAN WG2 Meeting 104 R2-1816435; Spokane, US, Nov. 12-16, 2018 Revision of R2-1814438; Agenda Item: 11.2.1.1; Source: Motorola Mobility, Lenovo; Title: Modifications to RACH procedure due to LBT; Document for: Discussion, Decision.
3GPP TSG-RAN2#104 meeting Tdoc R2-1816478; Spokane, USA, Nov. 12-16, 2018; Agenda Item: 11.2.1.1 ; Souce: MediaTek Inc.; Title: LBT for Random Access in NR-U; Document for: Discussion and decision.
3GPP TSG-RAN WG2 Meeting #104 R2-1816616; Spokane, USA, Nov. 12-16, 2018; Agenda Item: 11.2.1.1; Source: Huawei, HiSilicon; Title: Four-step RACH procedure for NR-U; Document for: Discussion and decision.
3GPP TSG-RAN WG2 Meeting #104 R2-1816617; Spokane, USA, Nov. 12-16, 2018; Agenda Item: 11.2.1.1; Source: Huawei, HiSilicon; Title: Two-step RACH procedure for NR-U; Document for: Discussion and decision.
3GPP TSG-RAN WG2 Meeting #104 R2-1816618; Spoken, USA, Nov. 12-16, 2018; Agenda Item: 11.2.1.1; Source: Huawei, HiSilicon; Title: Impact of LBT on counters and windows for 4-step RACH;L Document for: Discussion and decision.
3GPP TSG-RAN WG2 Meeting #104 R2-1816687; Spokane, US, Nov. 12-16, 2018; Agenda Item: 11.2.1.1; Souce: MediaTek Inc.; Title: 2-step RACH msgB addressing and HARQ; Document for: Discussion and decision.
3GPP TSG-RAN WG2 Meeting #104 R2-1816688; Spokane, US, Nov. 12-16, 2018 Revision of R2-1813964; Agenda Item: 11.2.1.1; Souce: MediaTek Inc.; Title: Random access backoff and timers in NR-U; Document for:; Discussion and decision.
3GPP TSG-RAN WG2 meeting #104 R2-1816696; Spokane, USA, Nov. 12-16, 2018; Agenda Item: 11.2.1.1; Source: Intel Corporation; Title: Random access procedure for NR-u; Document for: Discussion and Decision.
3GPP TSG-RAN WG2 Meeting #104 R2-1816776; Spokane, U.S. A, Nov. 12-16, 2018 Revision of R2-1814007; Agenda Item: 11.2.1.1; Source: InterDigital; Title: Random access in NR-Unlicensed; Document for: Discussion, Decision.
3GPP TSG RAN WG2 NR #104 Meeting R2-1816829; Spokane, US, Nov. 12-16, 2018; Agenda Item: 11.2.1.1; Source: ZTE; Title: Considerations on 4-step RACH procedure for NR-U; Document for: Discussion and Decision.
3GPP TSG RAN WG2 NR #104 Meeting; R2-1816831; Spokane, US, Nov. 12-16, 2018; Agenda Item: 11.2.1.1; Source: ZTE; Title: LBT outcome indication; Document for: Discussion and Decision.
3GPP TSG RAN WG2 NR #104 Meeting R2-1816832; Spokane, US, Nov. 12-16, 2018; Agenda Item:11.2.1.1; Source: ZTE; Title: Considerations on RAR window size for NR-U; Document for: Discussion and Decision.
3GPP TSG-RAN WG2 Meeting#104 R2-1817064; Spokane, USA, Nov. 12-16, 2018; Revision of R2-1814034; Source: ZTE Corporation, Sanechips; Title: Msg2 payload contents for 2-step RACH; Agenda item:11.2.1.1; Document for: Discussion and Decision.
3GPP TSG-RAN WG2 Meeting #103 R2-181817075; Spokane, USA, Nov. 12-16, 2018 (revision of R2-1814736); Agenda Item: 11.2.1.1; Source: Sony; Title: Considerations on initial access procedures for NR unlicensed operations; Document for: Discussion / Decision.
3GPP TSG-RAN WG2 Meeting #104 R2-1817195; Spokane, USA, Nov. 12-16, 2018; Agenda item: 11.2.1.1; Source: Nokia, Nokia Shanghai Bell; Title: Network control of 2-step CBRA procedure; WID/SID: FS_NR_unlic—Release 16; Document for: Discussion and Decision.
3GPP TSG-RAN WG2 Meeting #104 R2-1817319; Spokane, USA, Nov. 12-16, 2018; reversion of R2-1813874; Agenda item: 11.2.1.1; Source: Spreadtrum Communications; Title: Random Access Procedure in NR-U; Document for: Discussion and Decision.
3GPP TSG-RAN WG2 Meeting #104 R2-1817473; Spokane, USA, Nov. 12-16, 2018; Agenda Item: 11.2.1.1; Source: Apple Inc.; Title: RACH Enhancements in NR-U; Document for: Discussion.
3GPP TSG-RAN WG2 #103bis R2-1818098; Spokane, USA, Nov. 12-16, 2018; (Revision of R2-1815157); Agenda Item : 11.2.1.1 (FS_NR_unlic); Source : LG Electronics Inc.; Title : 2-Step RACH procedure for NR-U; Document for : Discussion and Decision.
3GPP TSG-RAN WG2 #104 R2-1818100; Spokane, USA, Nov. 12-16, 2018; (Revision of R2-1815153); Agenda Item : 11.2.1.1 (FS_NR_unlic); Source : LG Electronics Inc.; Title : Enhanced RACH procedure for NR-U; Document for : Discussion and Decision.
3GPP TSG-RAN WG2#104 R2-1818187; Spokane, U.S.A, Nov. 12-16, 2018; Agenda item: 11.2.1.1; Source: Potevio; Title: Analysis of RA issues related with LBT; Document for: Discussion & Decision.
3GPP TSG-RAN WG2 Meeting #104 R2-1818258; Spokane, USA, Nov. 12-16, 2018 Revision of R2-1814262; Source: vivo; Title: Enhance RACH with Additional Transmission Opportunities; Agenda Item: 11.2.1.1; Document for: Discussion and Decision.
3GPP TSG-RAN WG2 Meeting #104 R2-1818259; Spokane, USA, Nov. 12-16, 2018; Source: vivo; Title: Counter for Preamble Transmission Attempt ; Agenda Item: 11.2.1.1 ; Document for: Discussion and Decision.
3GPP TSG-RAN WG2 Meeting #104 R2-1818260; Spokane, USA, Nov. 12-16, 2018 (Revision of R2-1814263); Source: vivo ; Title: RAN2 impacts of 2-step RACH; Agenda Item: 11.2.1.1; Document for: Discussion and Decision.
3GPP TSG-RAN WG2 Meeting #104 R2-1818355; Spokane, USA, Nov. 12-16, 2018 resubmission of R2-1812664; Agenda Item : 11.2.1.2 (FS_NR_unlic); Source : LG Electronics Inc.; Title : DRX for unlicense band operation; Document for : Discussion and Decision.

* cited by examiner

User Plane Protocol Stack

Control Plane Protocol Stack

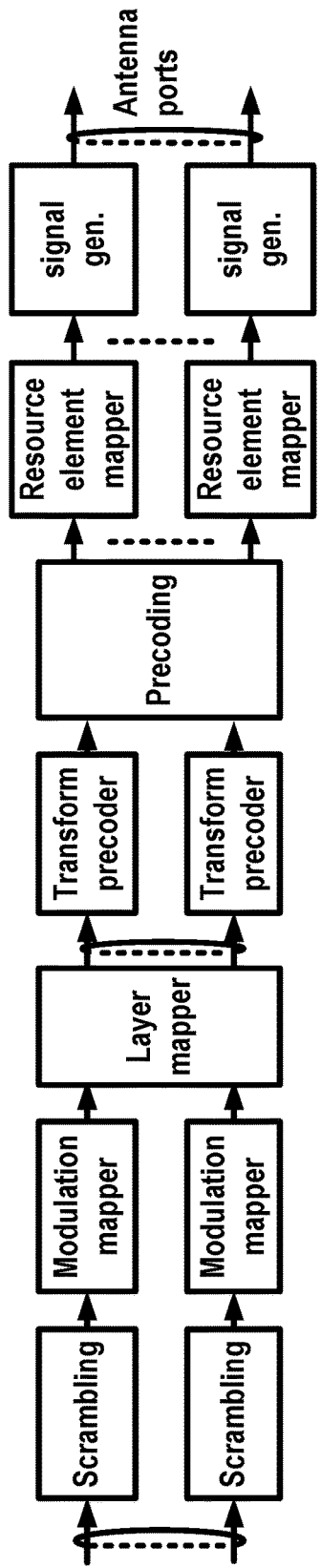
FIG. 4A
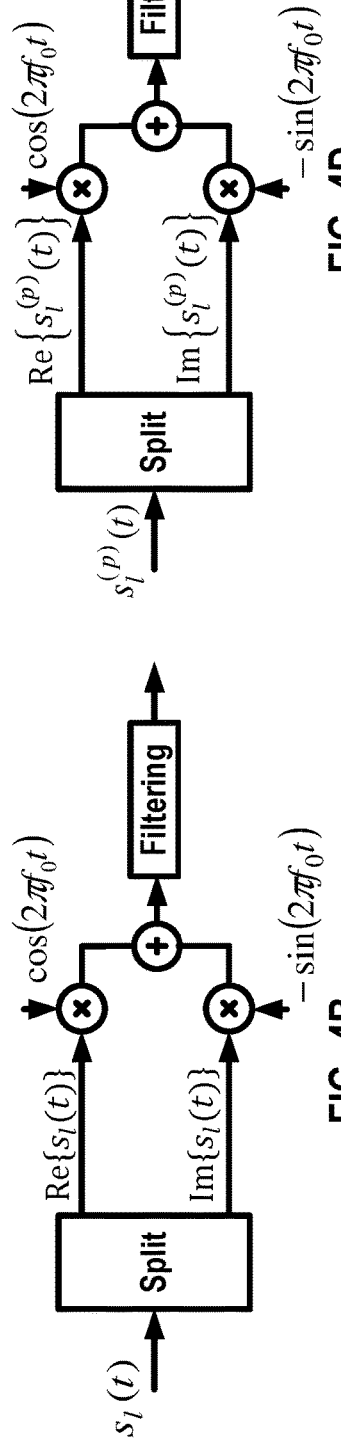
FIG. 4B
FIG. 4D
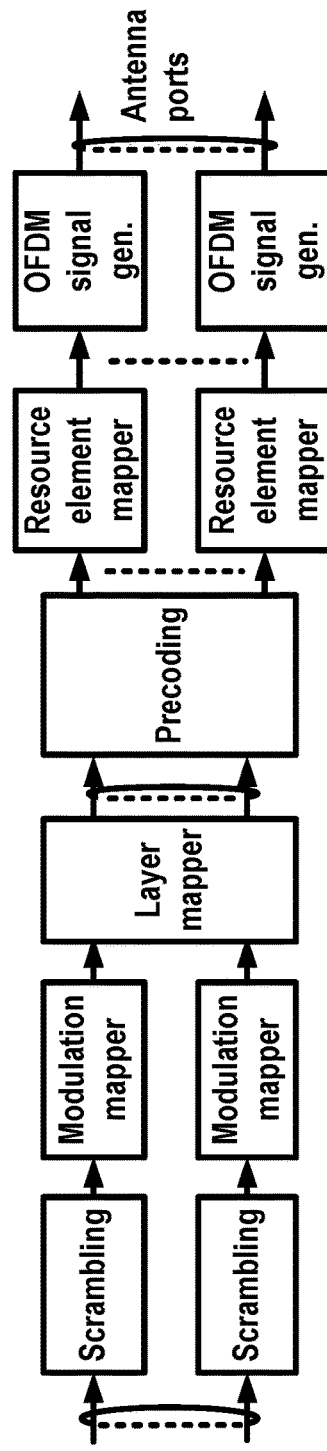
FIG. 4C

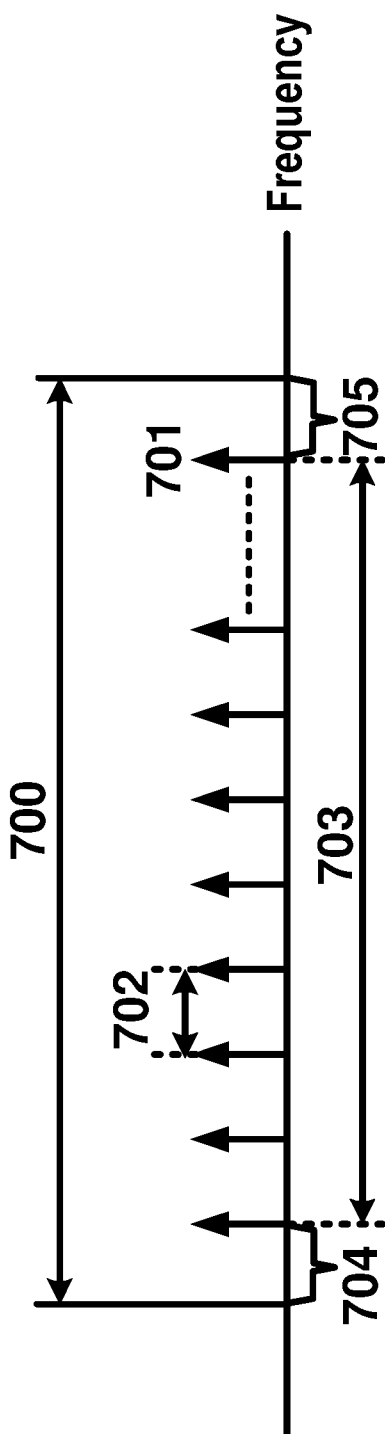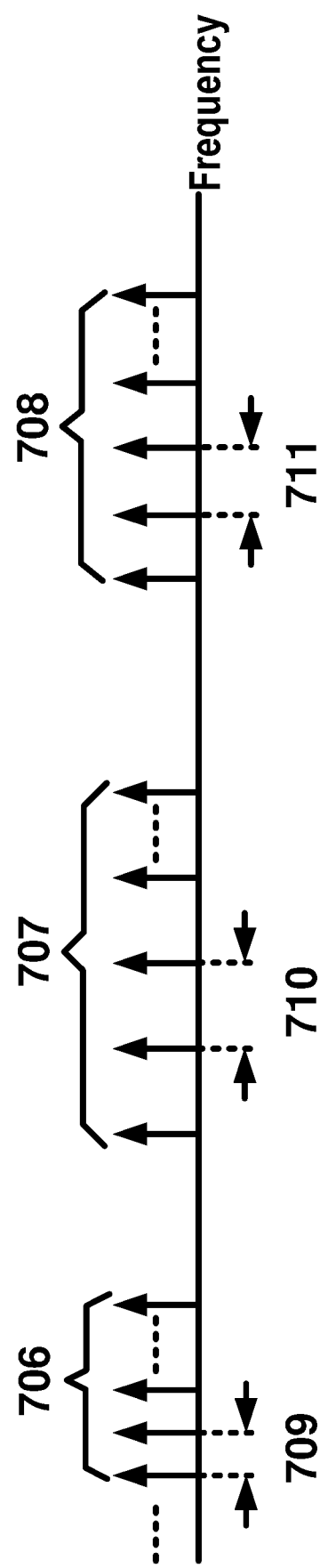

PRACH Mask Index values

| PRACH Mask Index | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

FIG. 18

| Numerology μ | Subcarrier spacing Δf=2^μ·15 [kHz] | Cyclic prefix | Num of symbols per slot | Num of slots per frame | Num of slots per subframe | Min Num of PRB | Max num of PRB |
|---|---|---|---|---|---|---|---|
| 0 | 15 | Normal | 14 | 10 | 1 | 20 | 275 |
| 1 | 30 | Normal | 14 | 20 | 2 | 20 | 275 |
| 2 | 60 | Normal | 14 | 40 | 4 | 20 | 275 |
| 2 | 60 | Extended | 12 | 40 | 4 | 20 | 275 |
| 3 | 120 | Normal | 14 | 80 | 8 | 20 | 275 |
| 4 | 240 | Normal | 14 | 160 | 16 | 20 | 138 |

** PRB: Physical resource block

FIG. 31

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

FIG. 32

Transmit, for a random access procedure, a first preamble via a cell comprising a first sub-band and a second sub-band
4210

Receive a random access response indicating:
a first backoff indicator indicating a first backoff time interval of the first sub-band; and
a second backoff indicator indicating a second backoff time interval of the second sub-band
4220

Determine a preamble retransmission for the random access procedure
4230

Select, as a backoff time interval, a shorter one of the first backoff time interval and the second backoff time interval
4240

Perform, at a time based on the backoff time interval, a listen-before-talk procedure
4250

FIG. 42

Receive, for a random access procedure, a first preamble via a cell comprising a first sub-band and a second sub-band
4310

Transmit a random access response indicating:
a first backoff indicator indicating a first backoff time interval of the first sub-band; and
a second backoff indicator indicating a second backoff time interval of the second sub-band; and
4320

RANDOM ACCESS BACKOFF INDICATOR

This application claims the benefit of U.S. Provisional Application No. 62/790,400, filed Jan. 9, 2019, which is hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

FIG. 18 shows an example of ra-ssb-OccasionMaskIndex values as per an aspect of an embodiment of the present disclosure.

FIG. 31 is an example of one or more numerologies as per an aspect of an embodiment of the present disclosure.

FIG. 32 is an example of backoff parameter values as per an aspect of an embodiment of the present disclosure.

FIG. 42 is an example flowchart of a wireless device as per an aspect of an embodiment of the present disclosure.

DETAILED DESCRIPTION OF EMBODIMENTS

Figure 1:
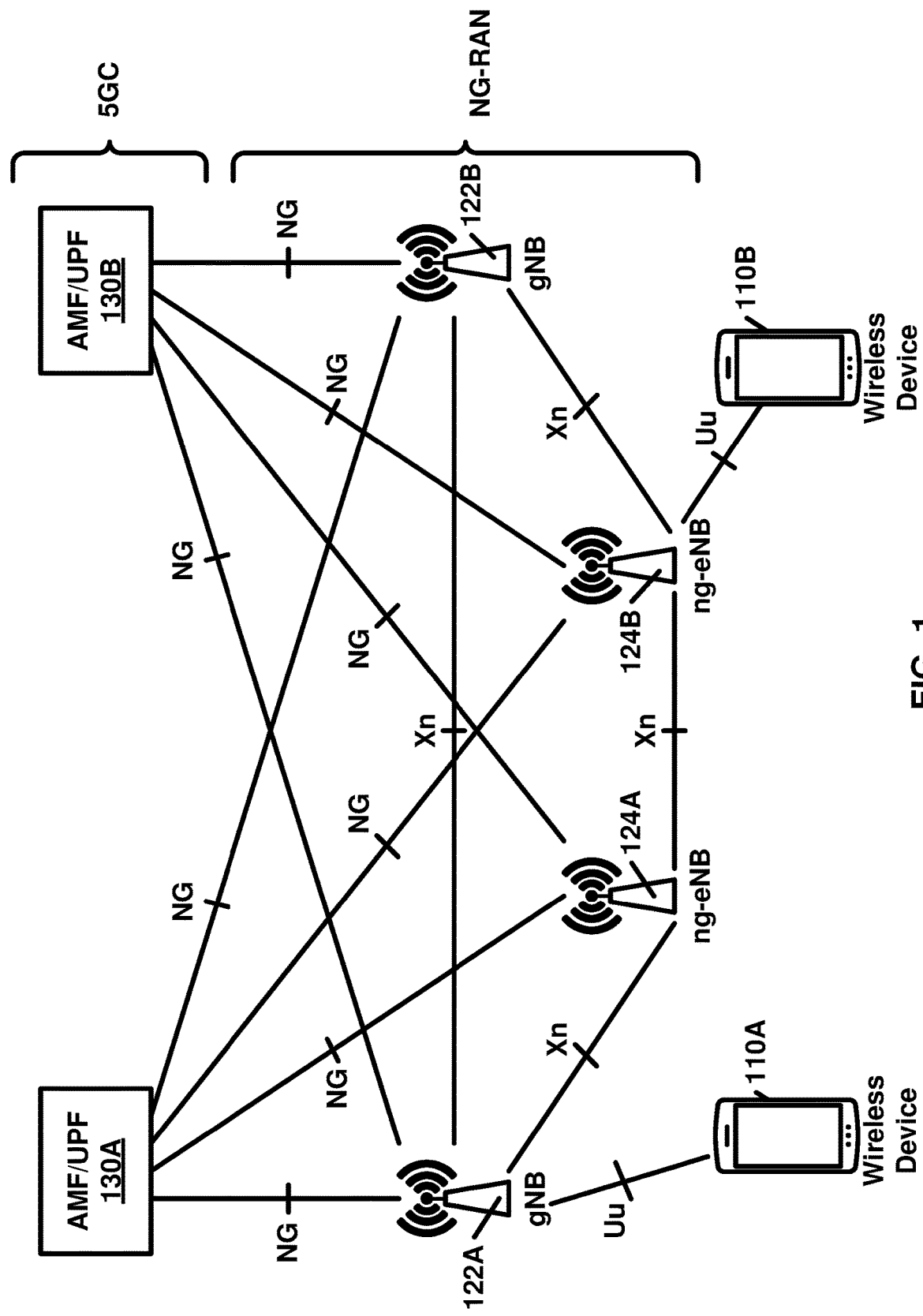
FIG. 1 is a diagram of an example RAN architecture as per an aspect of an embodiment of the present disclosure.

Example embodiments of the present disclosure enable operation of random access. Embodiments of the technology disclosed herein may be employed in the technical field of multicarrier communication systems. More particularly, the embodiments of the technology disclosed herein may relate to one or more random access procedures in multicarrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may comprise, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes comprise, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110.

Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3$^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
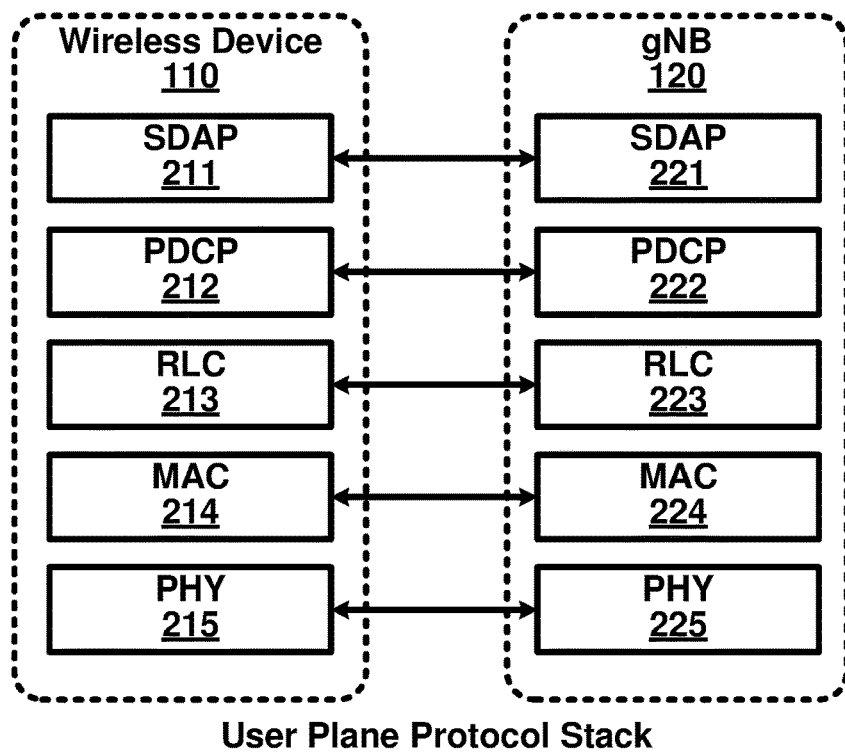
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
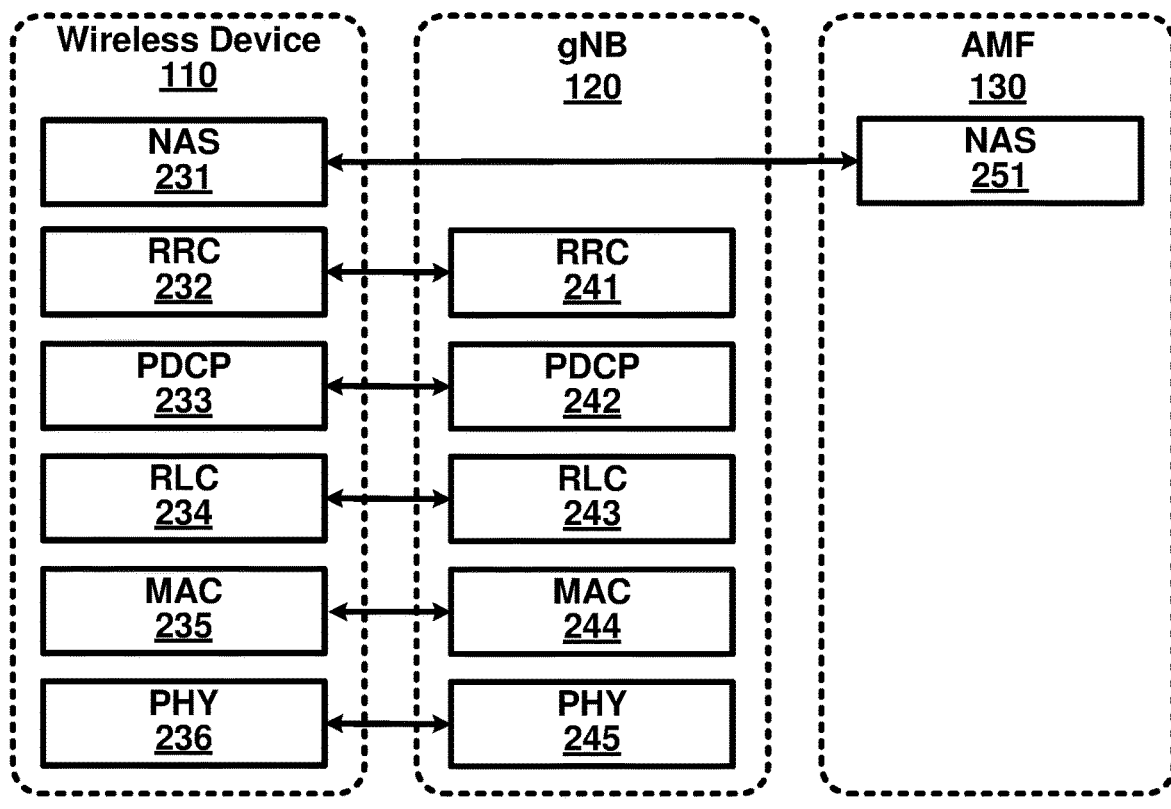
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
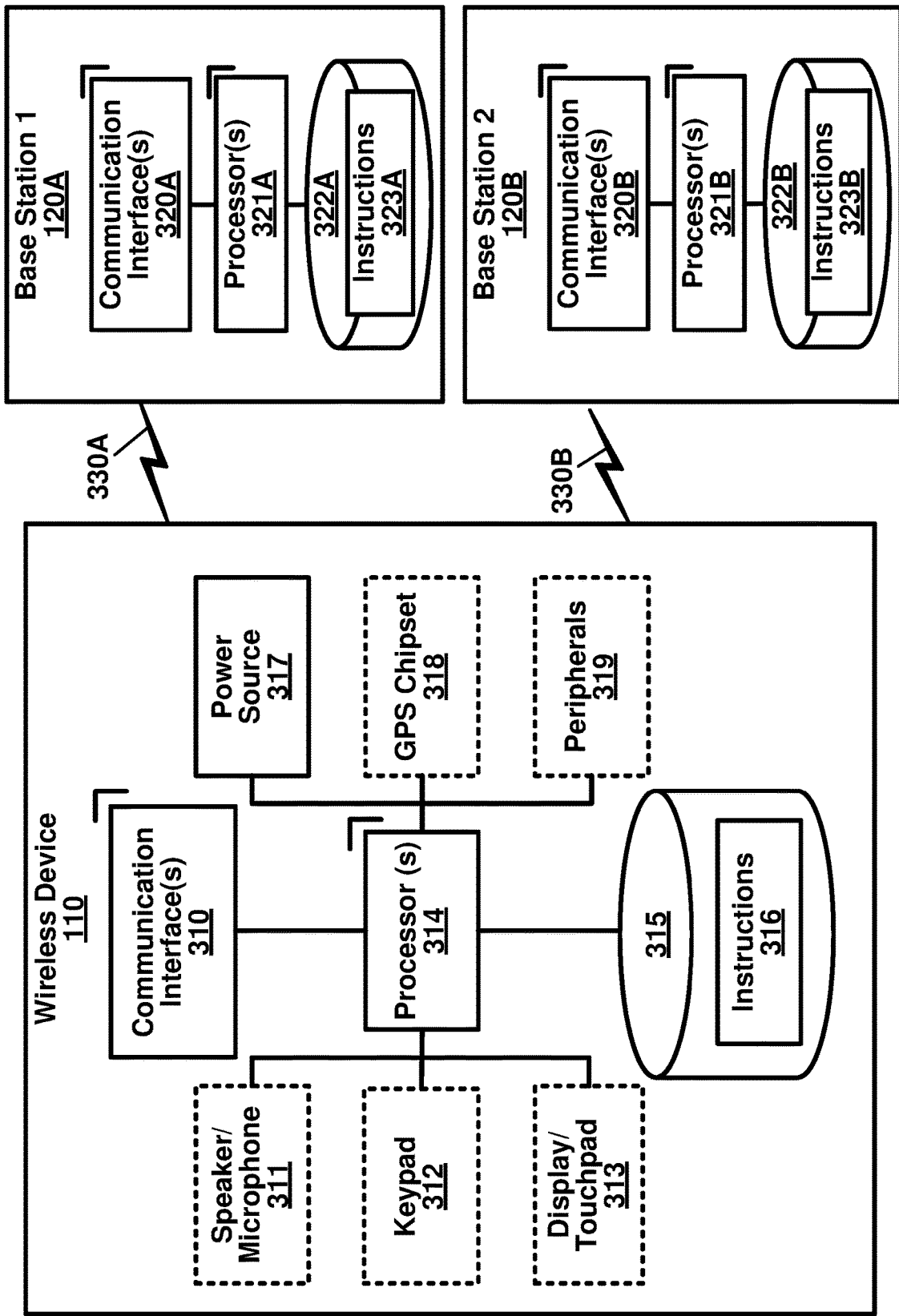
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message comprises the sCellToReleaseList, the wireless device may perform an SCell release. If the received RRC Connection Reconfiguration message comprises the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may comprise processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a base station may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
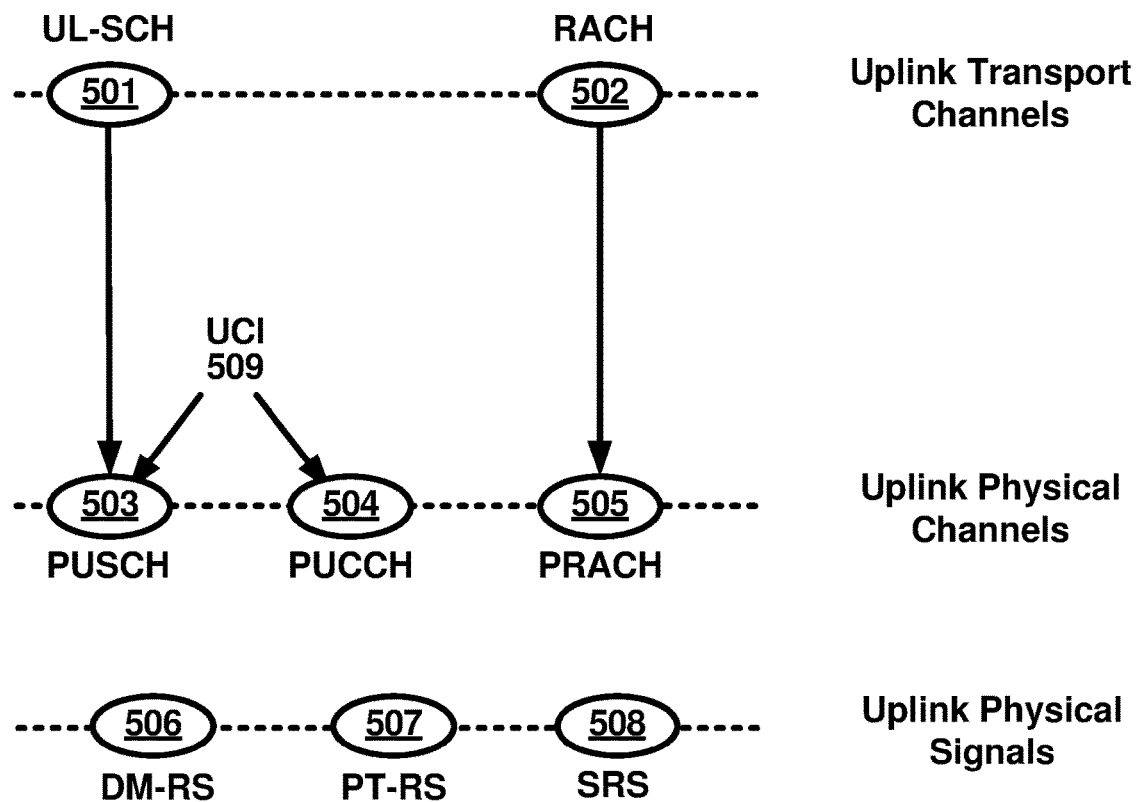
FIG. 5A is a diagram of an example uplink channel mapping and example uplink physical signals as per an aspect of an embodiment of the present disclosure.
Figure 5B:
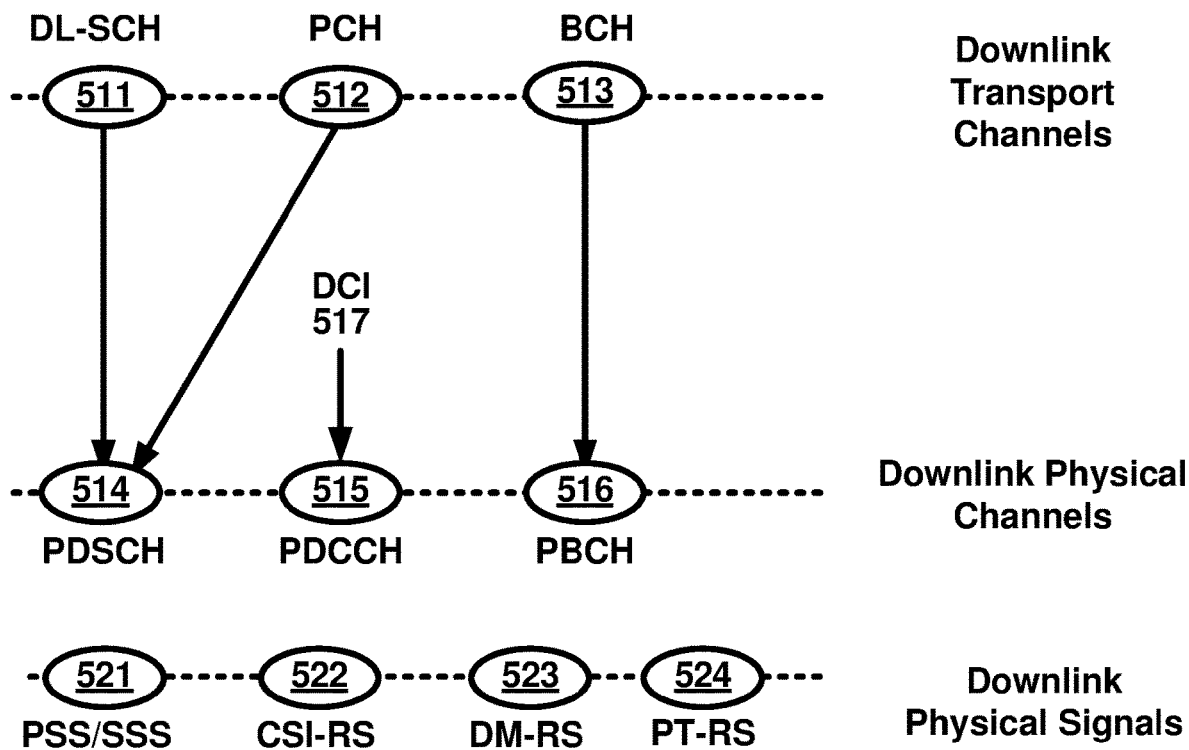
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statically configure a UE with one or more CSI-RS resource sets. One or more CSI-RS resources may be allocated from one or more CSI-RS resource sets to one or more UEs. For example, a base station may semi-statically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
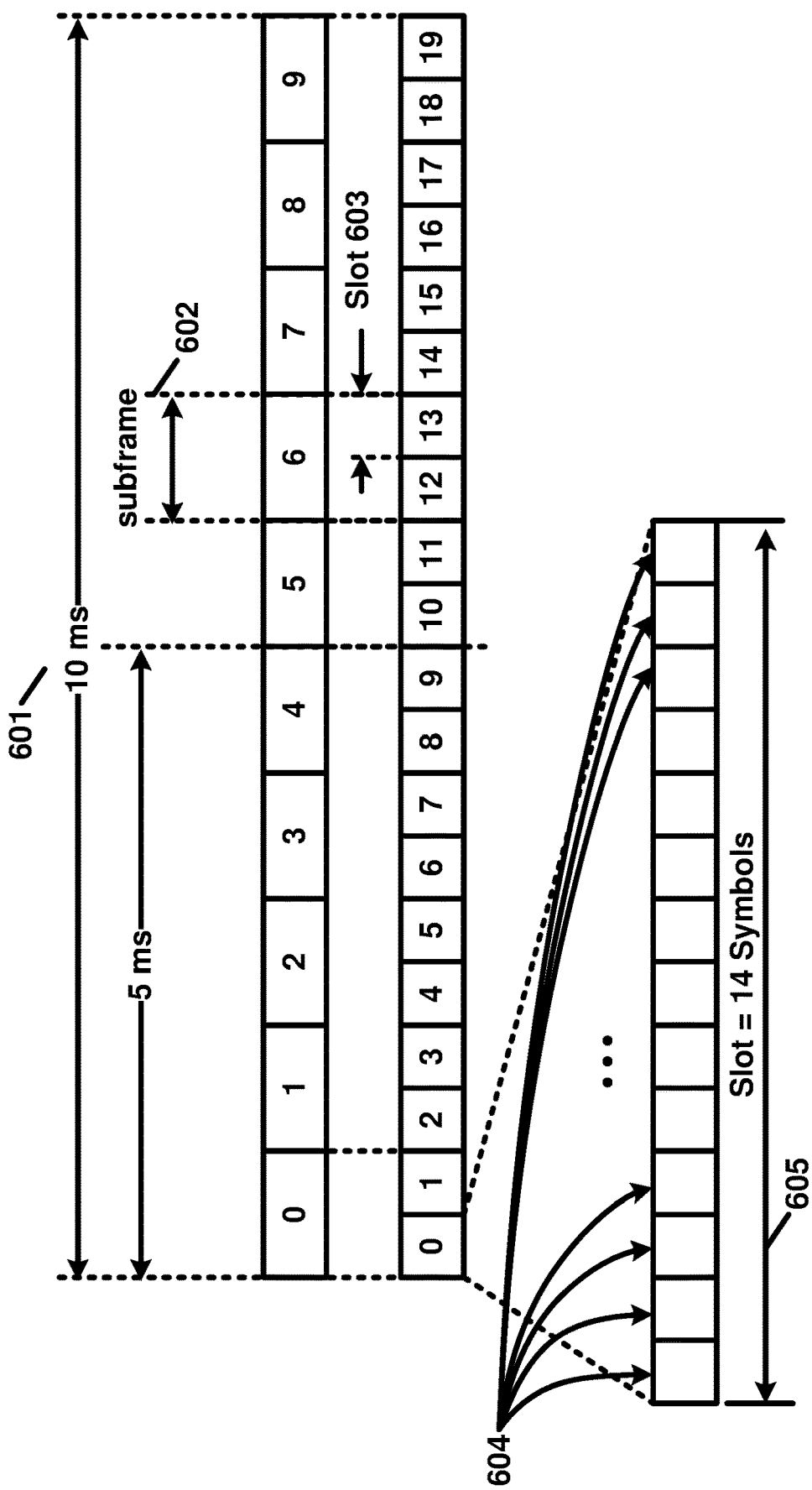
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may comprise one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may comprise a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The base station may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
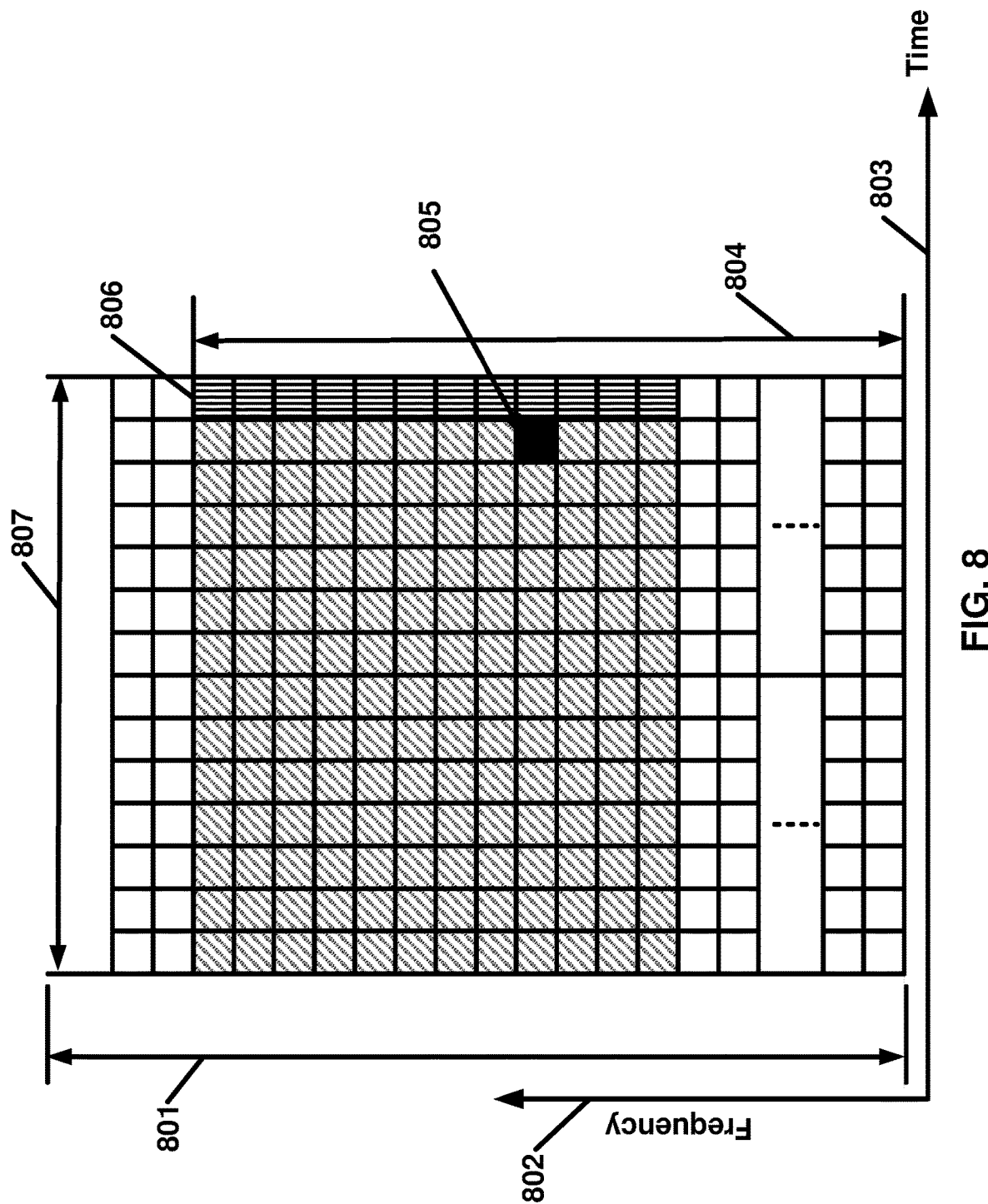
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The base station may transmit one or more RRC messages indicating a periodicity of the CS grant. The base station may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The base station may transmit one or more RRC messages indicating a periodicity of the CS grant. The base station may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
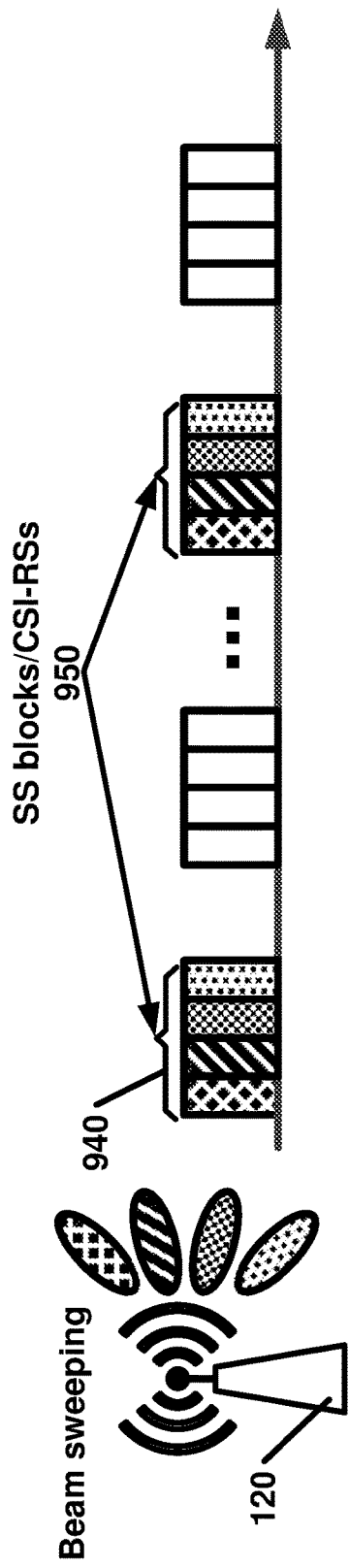
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
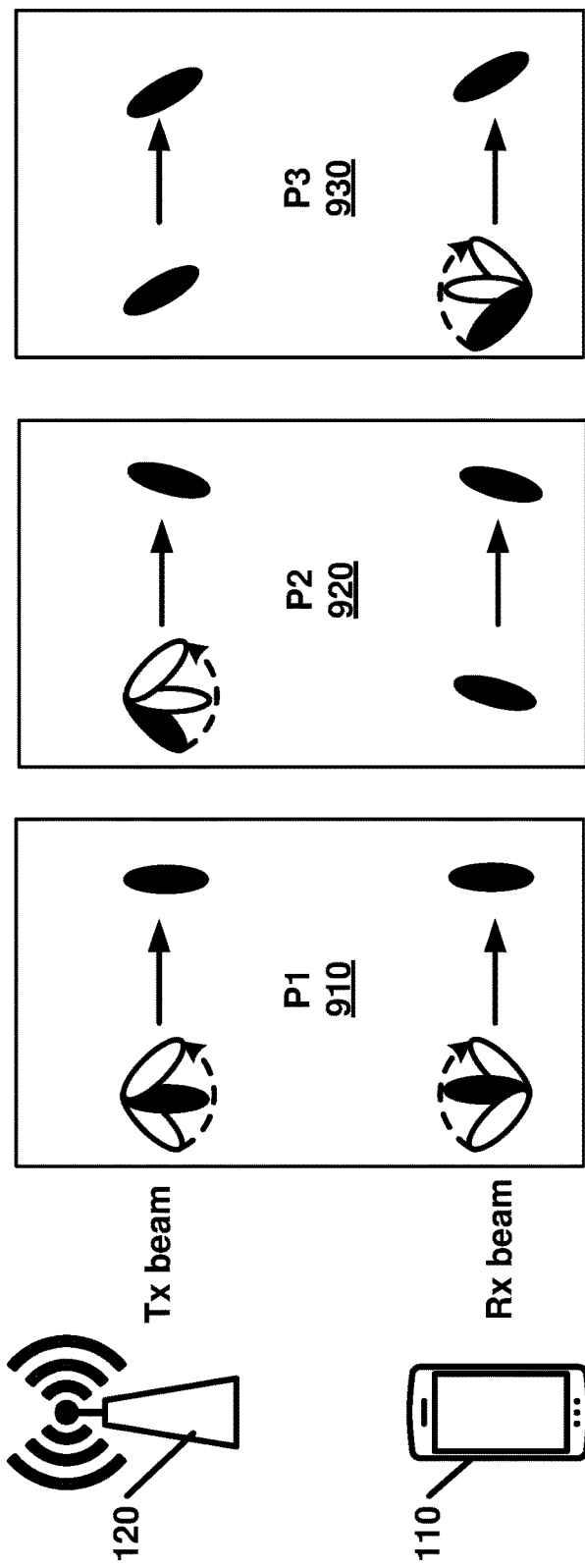
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
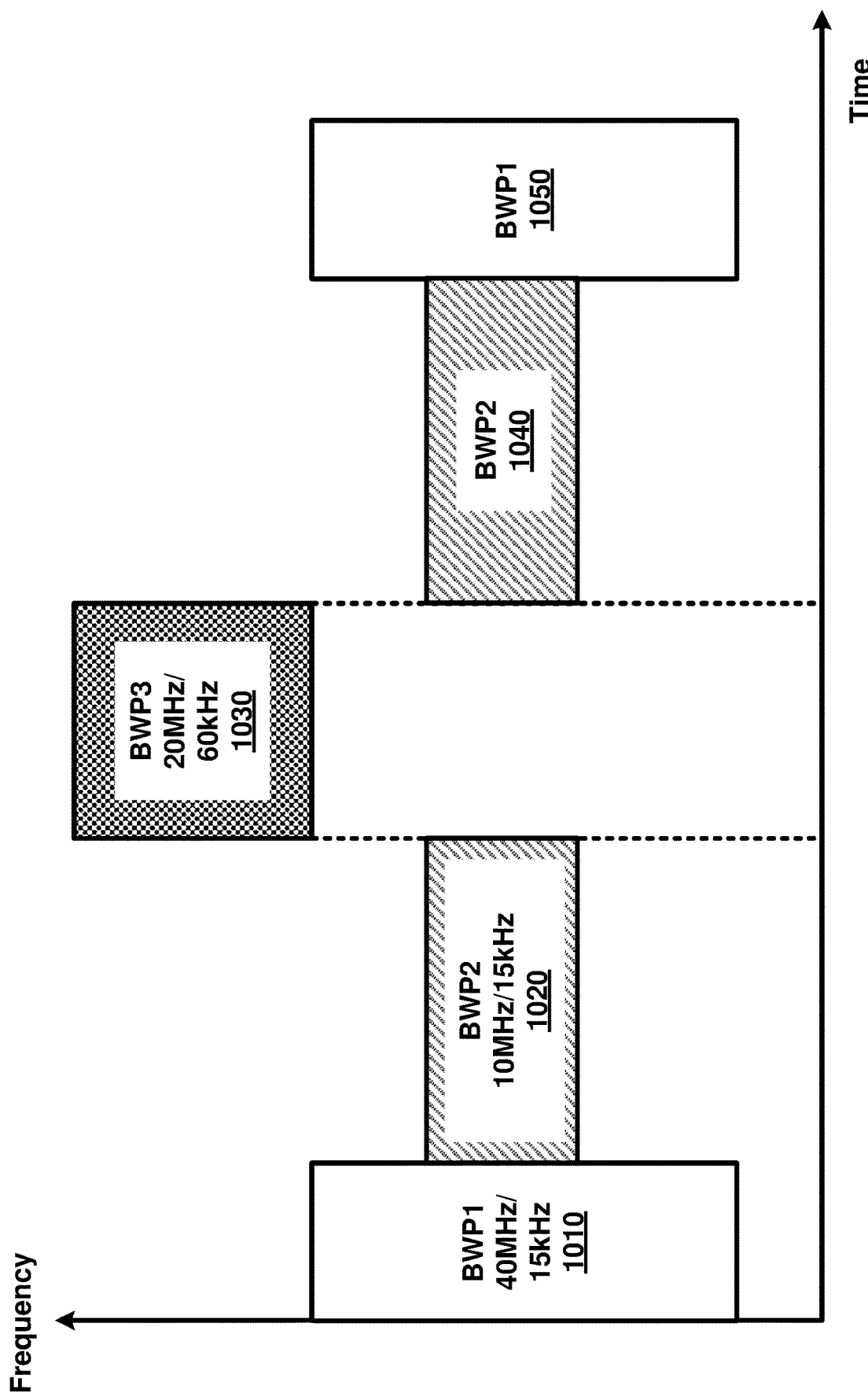
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
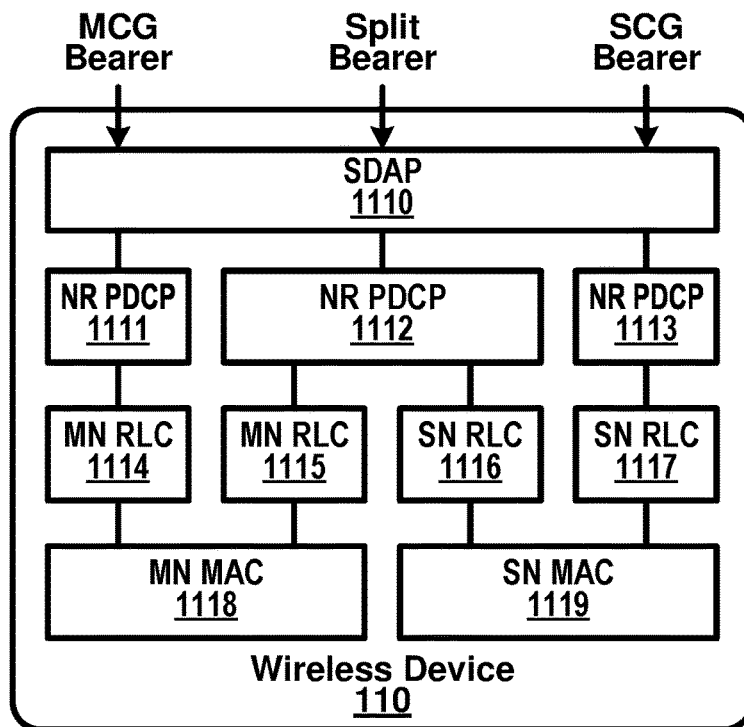
FIG. 11A, and FIG. 11B are diagrams of an example multi connectivity as per an aspect of an embodiment of the present disclosure.
Figure 11B:
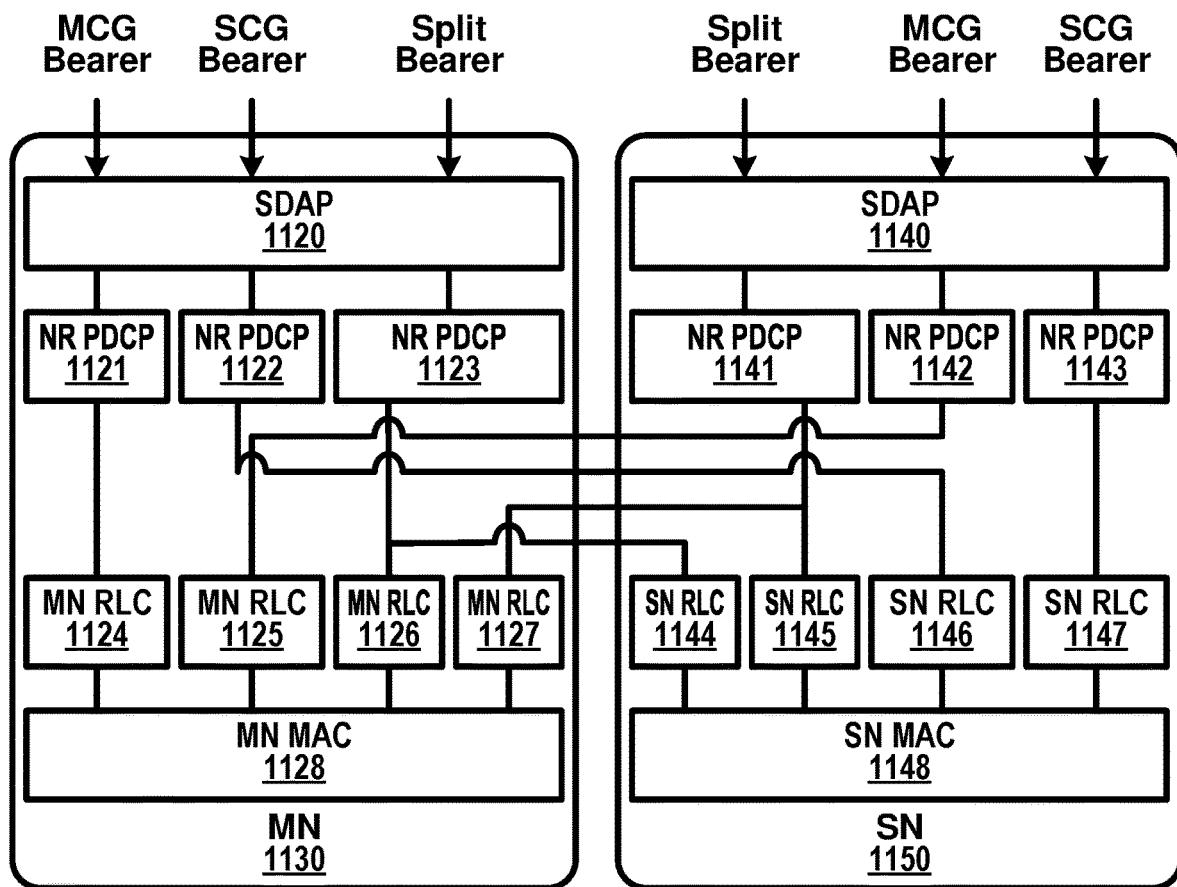

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
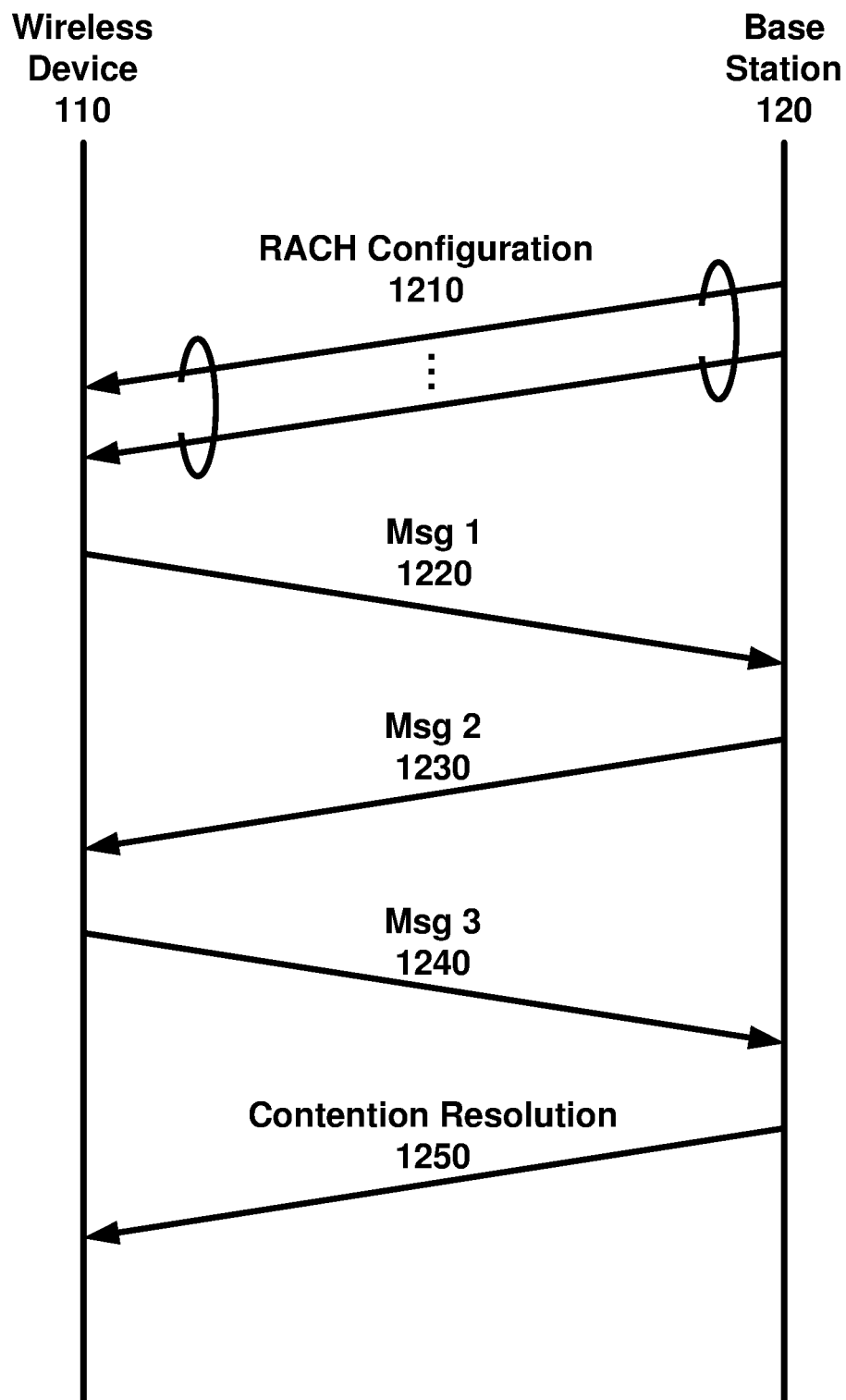
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSRP threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
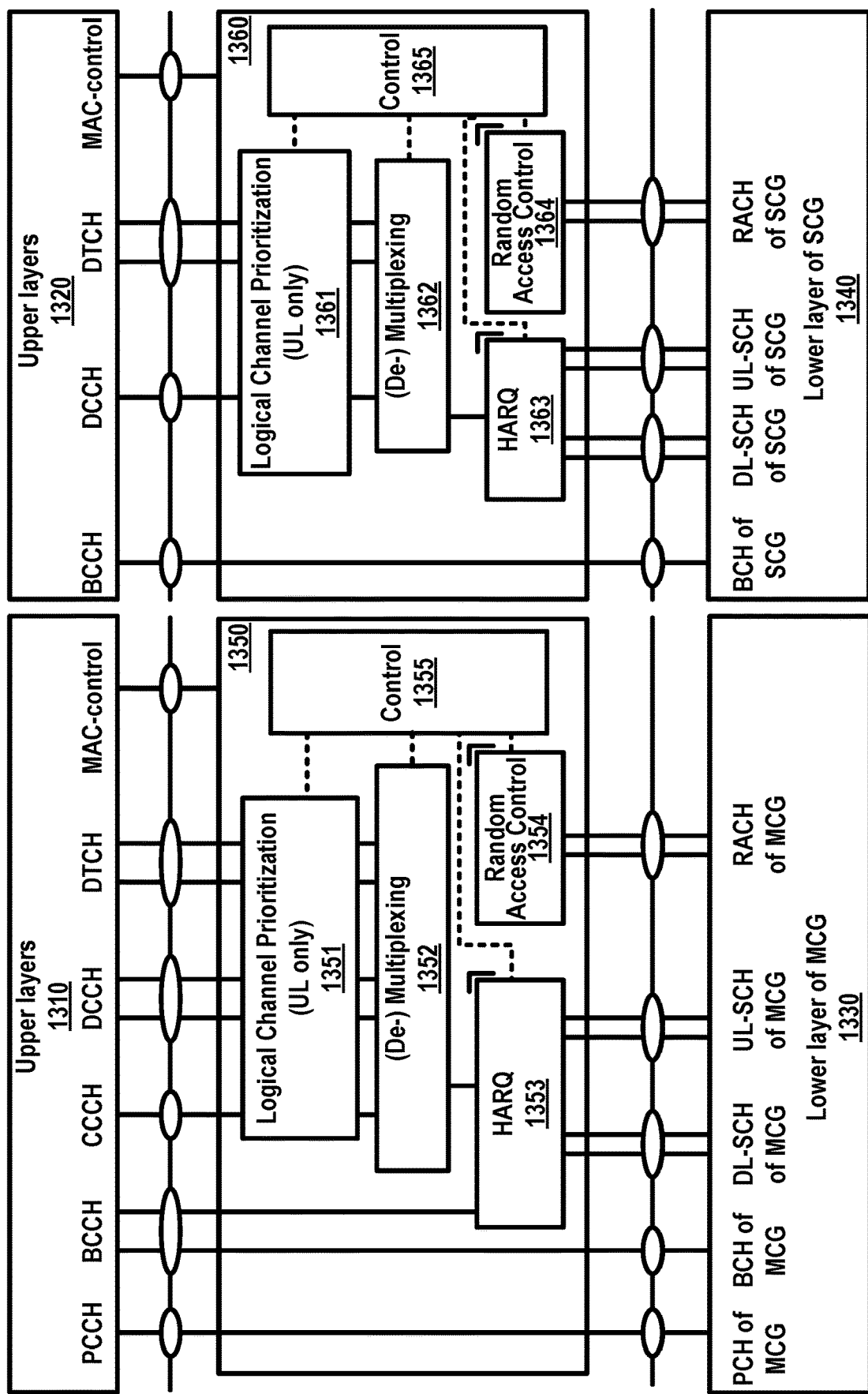
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
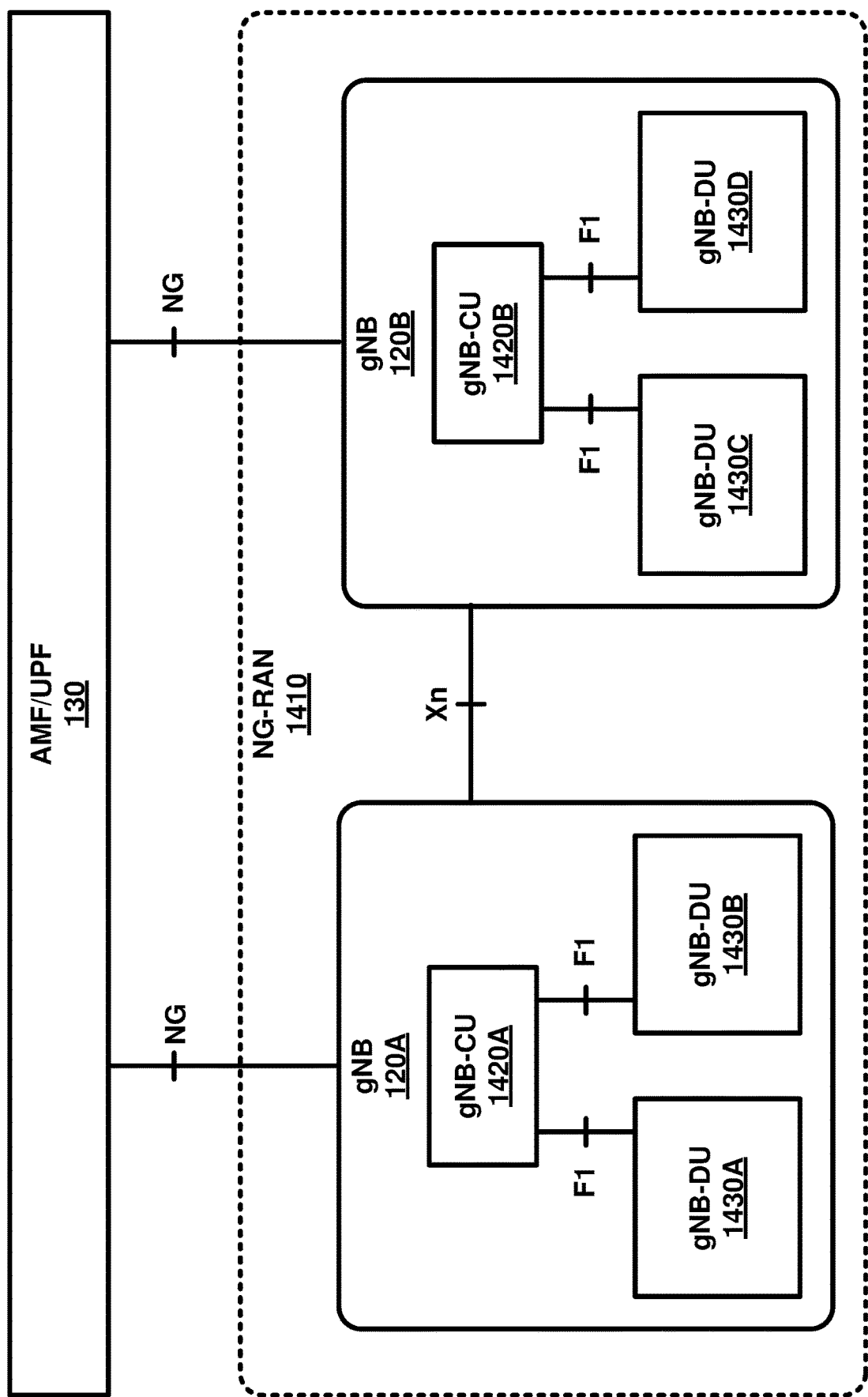
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
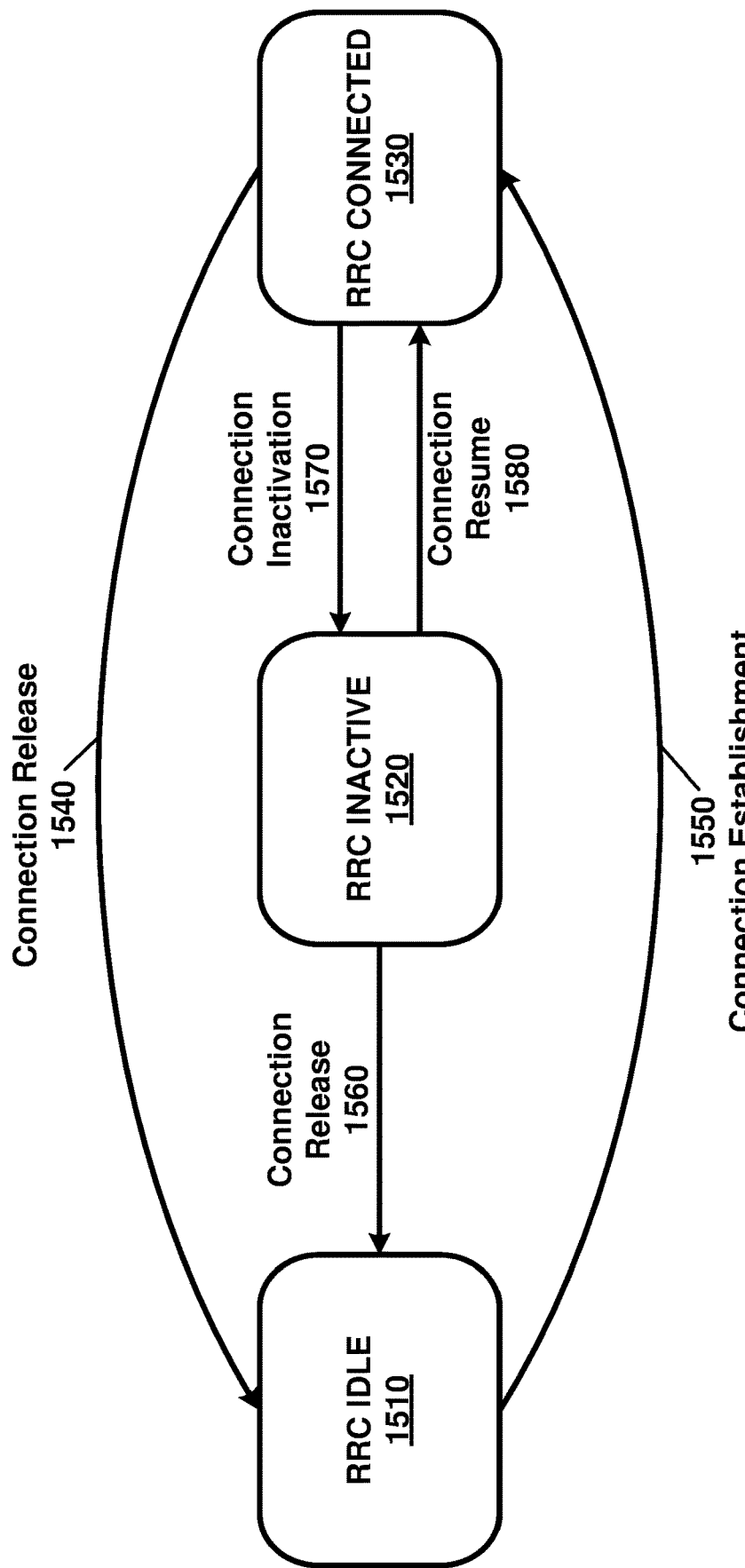
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

Random access (RA) procedures may be used to establish communications between a wireless device and a base station in a cell. A four-step RA procedure in FIG. 12 may have an associated latency, e.g., which may be a minimum of fourteen transmission time intervals (TTI). As an example, 3GPP TR 38.804 v14.0.0 indicates a minimum latency of fourteen TTIs comprising, e.g., 3 TTIs after a message from step 1 (e.g., Msg1 1220) of a four-step RA procedure, 1 TTI for a message from step 2 (e.g., Msg2 1230) of a four-step RA procedure, 5 TTIs after the message from step 2, 1 TTI for a message from step 3 (e.g., Msg 3 1240) of a four-step RA procedure, 3 TTIs after the message from step 3, and 1 TTI for a message from step 4 (e.g., contention Resolution 1250) of a four-step procedure (e.g., 3+1+5+1+3+1=14). Reducing the number of steps in an RA procedure may reduce latency. By using parallel transmissions, a four-step RA procedure may be reduced to a two-step RA procedure. A two-step RA procedure may have an associated latency, e.g., which may be a minimum of four TTIs and which may be less than an associated latency for a four-step RA procedure. As an example, 3GPP TR 38.804 v14.0.0 indicates a minimum latency of four TTIs comprising, e.g., 3 TTIs after a message from step 1 of a two-step RA procedure and 1 TTI for a message from step 2 of a two-step RA procedure.

Figure 16:
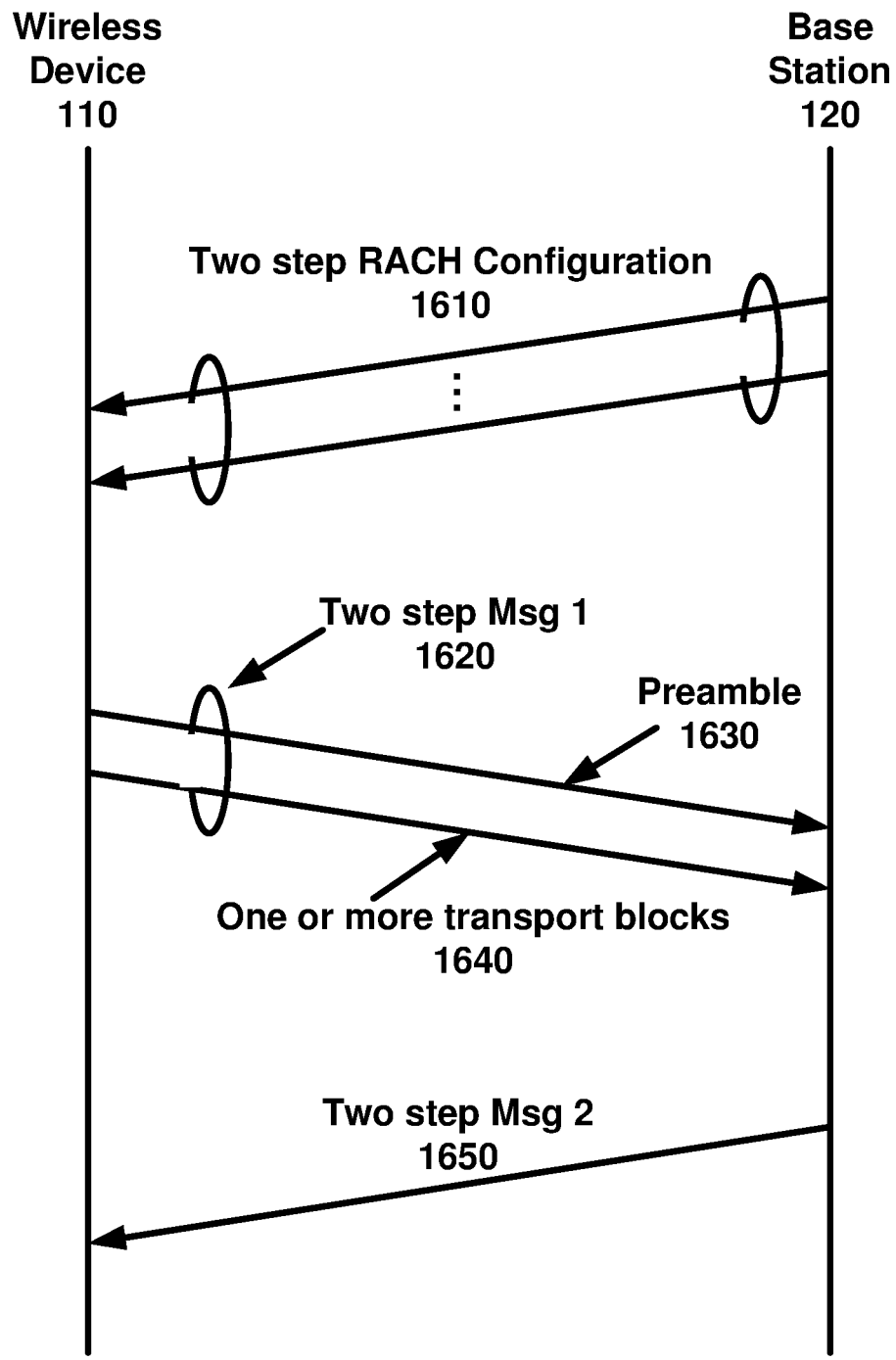
FIG. 16 is an example of a two-step RA procedure as per an aspect of an embodiment of the present disclosure.

FIG. 16 is an example of a two-step RA procedure that may comprise an uplink (UL) transmission of a two-step Msg1 1620 that may comprise a random access preamble (RAP) transmission 1630 and one or more transport blocks transmission 1640, followed by a downlink (DL) transmission of a two-step Msg2 1650 that may comprise a response, e.g., random access response (RAR), corresponding to the uplink transmission. The response may comprise contention resolution information. For example, the two-step Msg1 1620 may be also referred to as a message A (MsgA). For example, the two-step Msg2 1650 may be also referred to as a message B (MsgB).

A base station may transmit one or more RRC messages to configure a wireless device with one or more parameters of two step RACH configuration 1610. The one or more RRC messages may broadcast or multicast to one or more wireless devices. The one or more RRC messages may be wireless device-specific messages, e.g., a dedicated RRC message transmitted to a wireless device with RRC INACTIVE 1520 or RRC CONNECTED 1530. The one or more RRC messages may comprise parameters required for transmitting a two-step Msg1 1620. For example, the parameter may indicate at least one of following: PRACH resource allocation, preamble format, SSB information (e.g., total number of SSBs, downlink resource allocation of SSB transmission, transmission power of SSB transmission, and/or other information), and uplink radio resources for one or more transport block transmissions.

In the UL transmission of a two-step RA procedure, a wireless device may transmit, via a cell and to a base station, a RAP for UL time alignment and/or one or more transport blocks (e.g., delay-sensitive data, wireless device ID, security information, device information such as IMSI, and/or other information). In the DL transmission of the two-step RA procedure, a base station may transmit a two-step Msg2 1650 (e.g., an RAR) that may comprise at least one of following: a timing advance command indicating the TA value, a power control command, an UL grant (e.g., radio resource assignment, and/or MCS), a wireless device ID for contention resolution, an RNTI (e.g., C-RNTI or TC-RNTI), and/or other information. The two-step Msg2 1650 (e.g., an RAR) may comprise a preamble identifier corresponding to the preamble 1630, a positive or negative acknowledgement of a reception of the one or more transport blocks 1640, and/or an indication of a successful decoding of the one or more transport blocks 1640. A two-step RA procedure may reduce RA latency compared with a four-step RA procedure, e.g., by integrating a random access preamble transmission (e.g., a process to obtain a timing advance value) with one or more transport block transmissions.

In the UL transmission of a two-step RA procedure, a wireless device may transmit, via a cell and to a base station, an RAP in parallel with one or more TBs. The wireless device may acquire one or more configuration parameters for the UL transmission before the wireless device starts a two-step RA procedure, e.g., at step 1610 in FIG. 16. For example, the one or more configuration parameters may indicate at least one of following: PRACH resource allocation, preamble format, SSB information (e.g., a number of transmitting SSBs, downlink resource allocation of SSB transmissions, transmission power of SSB transmission, and/or other information), uplink radio resources (in terms of time, frequency, code/sequence/signature) for one or more transport block transmissions, and power control parameters of one or more TB transmissions (e.g., cell and/or UE specific power adjustments used for calculating received target power, inter-cell interference control parameter that may be used as a scaling factor of pathloss measurement, reference signal power to calculate for pathloss measurement, and/or one or more margins).

There may be one or more ways for a wireless device to generate an RAP. For example, a two-step RACH configuration may comprise an RAP generating parameters (e.g., a root sequence) that may be employed by the wireless device to generate an RAP. The wireless device may employ the RAP generating parameters to generate one or more candidate preambles and may randomly select one of the candidate preambles as the RAP. The RAP generating parameters may be SSB specific and/or cell-specific. For example, a RAP generating parameters for a first SSB may be different from or the same to a RAP generating parameters for a second SSB. For example, a base station may transmit a control message (e.g., RRC message for a handover, and/or a PDCCH order for a secondary cell addition) that comprise a preamble index of an RAP dedicated to a wireless device to initiate a two-step RA procedure. The one or more candidate preambles may be organized into groups that may indicate an amount of data for transmission. In an example, the amount of data may indicate one or more transport blocks that remain in the buffer. Each of the groups may be associated with a range of data size. For example, a first group of the groups may comprise RAPs indicated for small data transmissions, and a second group may comprise RAPs indicated for larger data transmissions. A base station may transmit an RRC message comprising one or more thresholds with which a wireless device may determine a group of RAP by comparing the one or more thresholds and the amount of data. By transmitting an RAP from a specific group of RAPs, the wireless device may be able to indicate a size of data it may have for transmission.

In a two-step RA procedure, a wireless device may transmit the RAP via a RACH resource indicated by a two-step RACH configuration. The wireless device may transmit one or more TBs via an UL radio resource indicated by a two-step RACH configuration. The transmission of the RAP may be overlapped in time (partially or entirely) with the transmission of the one or more TBs. The two-step RACH configuration may indicate a portion of overlapping of radio resources between the RAP and one or more TB transmissions. The two-step RACH configuration may indicate one or more UL radio resources associated with one or more RAPs (or RAP groups) and/or the RACH resource. For example, based on a selection of an RAP, an RAP group, and/or an RACH resource, a wireless device may determine at least one UL radio resource where the wireless device transmits one or more TBs as a part of a two-step RACH procedure. The one or more UL radio resources may be indicated based on a frame structure in FIG. 6, and/or OFDM radio structure in FIG. 8, e.g., with respect to an SFN (SNR=0), slot number, and/or OFDM symbol number for a time domain radio resource, and/or with respect to a subcarrier number, a number of resource elements, a number of resource blocks, RBG number, and/or frequency index for a frequency domain radio resource. For example, the one or more UL radio resources may be indicated based on a time offset and/or a frequency offset with respect to one or more RACH resources of a selected RAP. The UL transmissions may occur, e.g., in the same subframe (or slot/mini-slot), in consecutive subframes (or slot/mini-slot), or in the same burst.

Figures 17A, 17B, 17C:
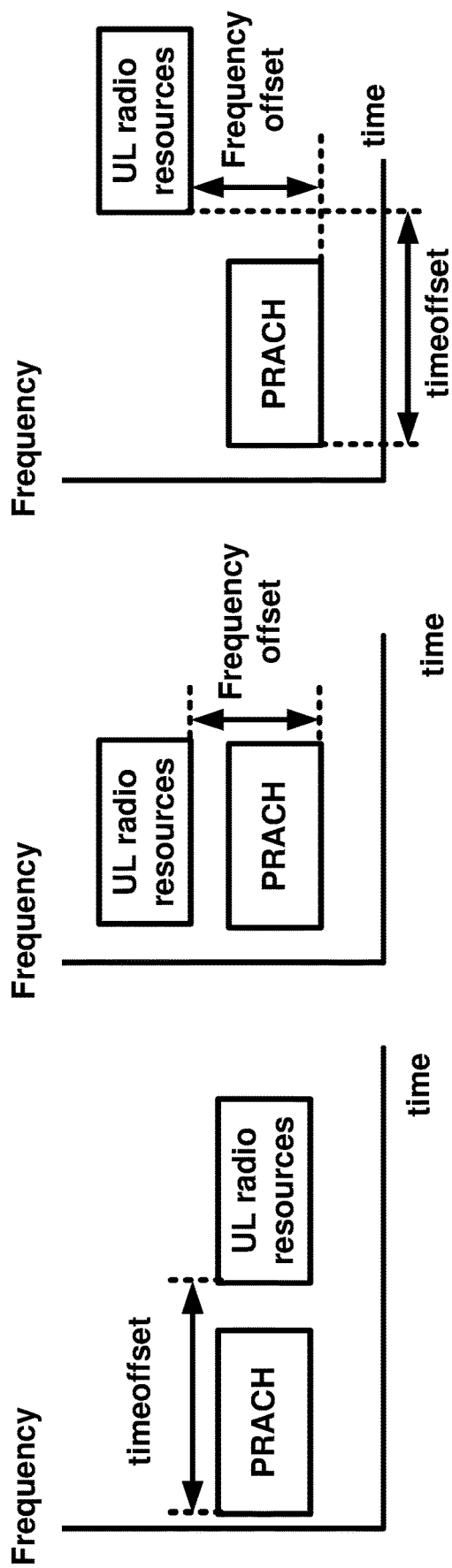
FIG. 17A, FIG. 17B, and FIG. 17C are examples of radio resource allocations of a PRACH resource and one or more associated UL radio resources as per an aspect of an embodiment of the present disclosure.

For example, a PRACH resource and one or more associated UL radio resources for a two-step Msg1 may be allocated with a time offset and/or frequency offset, e.g., provided by RRC messages (as a part of RACH config.) and/or predefined (e.g., as a mapping table). FIG. 17A, FIG. 17B, and FIG. 17C are examples of radio resource allocations of a PRACH resource and one or more associated UL radio resources based on a time offset, a frequency offset, and a combination of a time offset and a frequency offset, respectively. The examples in FIG. 17A, FIG. 17B, and FIG. 17C may be a case of a PRACH resource and a UL radio resource where a single SSB transmission is configured. The examples may be a case of a PRACH resource and a UL radio resource associated with a first SSB transmission of one or more SSB transmissions.

A base station may acquire a UL transmission timing by detecting an RAP transmitted PRACH resource based on the time offset and/or the frequency offset. A base station may detect and/or decode one or more transport blocks transmitted via one or more associated UL radio resources based on the UL transmission timing acquired from the RAP detection. For example, a base station may transmit one or more SSBs, and each of the one or more SSBs may have one or more associated PRACH and UL radio resources provided by a two-step RACH configuration. A wireless device may measure one or more SSBs, and based on measured received signal strength (or based on other selection rule), may select at least one SSB. The wireless device may respectively transmit an RAP and one or more transport blocks via PRACH associated with the at least one SSB, and via UL radio resources associated with the PRACH and/or the at least one SSB.

In an example, a base station may employ the RAP to adjust UL transmission time for a cell and/or to aid in channel estimation for one or more TBs. A portion of the UL transmission for one or more TBs in a two-step RACH procedure may comprise, e.g., a wireless device ID, a C-RNTI, a service request such as buffer state reporting (e.g., a buffer status report) (BSR), one or more user data packets, and/or other information. A wireless device in an RRC CONNECTED state may use a C-RNTI as an identifier of the wireless device (e.g., a wireless device ID). A wireless device in an RRC INACTIVE state may use a C-RNTI (if available), a resume ID, or a short MAC-ID as an identifier of the wireless device. A wireless device in an RRC IDLE state may use a C-RNTI (if available), a resume ID, a short MACID, an IMSI (International Mobile Subscriber Identifier), a T-IMSI (Temporary-IMSI), and/or a random number as an identifier of the wireless device.

In a two-step RACH procedure, the UL transmission may comprise one or more TBs that may be transmitted in one or more ways. One or more transport blocks may be multiplexed with an RAP transmission in time and/or frequency domains. A base station may configure one or more resources reserved for the UL transmission that may be indicated to a wireless device before the UL transmission. If a wireless device transmits one or more TBs in a two-step Msg1 1620 of a two-step RA procedure, a base station may transmit in a two-step Msg2 1650 (e.g., an RAR) that may comprise a contention resolution message and/or an acknowledgement (ACK or NACK) message of the one or more TBs. A wireless device may transmit one or more second TBs after the reception of an RAR. The wireless device may transmit an indicator, such as buffer state reporting, in a two-step Msg1 1620 of a two-step RA procedure. The indicator may indicate to a base station an amount of data the wireless device to transmit and/or an amount of data remains in a buffer. The base station may determine a UL grant based on the indicator. The base station may transmit the UL grant to the wireless device via an RAR.

In a two-step/RA procedure, a wireless device may receive two separate responses; a first response for RAP transmission; and a second response for one or more TB transmission. A wireless device may monitor a common search space to detect the first response with a random access RNTI generated based on time and frequency indices of PRACH resource where the wireless device transmits an RAP. A wireless device may monitor a common search space and/or a wireless device specific search space to detect the second response. To detect the second response, the wireless device may employ a C-RNTI (e.g., if configured) or a random access RNTI generated based on time and frequency indices of PRACH resource where the wireless device transmits an RAP. The wireless device specific search space may be predefined and/or configured by an RRC message.

One or more events may trigger a two-step random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, beam failure recovery procedure, and/or request for other system information. For example, a PDCCH order, a MAC entity, and/or a beam failure indication may initiate a random access procedure.

A two-step RA procedure may be initiated based on one or more case-based procedures, services, or radio conditions. For example, a base station in the cell may configure one or more wireless devices under its coverage to use a two-step RA procedure, for example, if a cell is small such that there may be no need for a TA. A wireless device may acquire the configuration, via one or more RRC messages (e.g., MIB, system information blocks, multicast and/or unicast RRC signaling), and/or via L1 control signaling (e.g., PDCCH order) used to initiate a two-step RA procedure.

For example, in a macro coverage area, a wireless device may have a stored and/or persisted TA value, e.g., a stationary or near stationary wireless device such as a sensor-type wireless device. In this case a two-step RA procedure may be initiated. A base station having macro coverage may use broadcasting and/or dedicated signaling to configure a two-step RA procedure with one or more wireless devices having stored and/or persisted TA value(s) under the coverage.

A wireless device in an RRC connected state may perform a two-step RA procedure. For example, the two-step RA procedure may be initiated when a wireless device performs a handover (e.g., network-initiated handover), and/or when the wireless device requires or requests a UL grant for a transmission of delay-sensitive data and there are no physical-layer uplink control channel resources available to transmit a scheduling request. A wireless device in an RRC INACTIVE state may perform a two-step RA procedure, e.g., for a small data transmission while remaining in the RRC INACTIVE state or for resuming a connection. A wireless device may initiate a two-step RA procedure, for example, for initial access such as establishing a radio link, re-establishment of a radio link, handover, establishment of UL synchronization, and/or a scheduling request when there is no UL grant.

The following description presents one or more examples of a RACH procedure. The procedures and/or parameters described in the following may not be limited to a specific RA procedure. The procedures and/or parameters described in the following may be applied for a four-step RA procedure and/or a two-step RA procedure. For example, a RA procedure may refer to a four-step RA procedure and/or a two-step RA procedure in the following description.

A wireless device may perform a cell search. For example, the wireless device may acquire time and frequency synchronization with the cell and detect a first physical layer cell ID of the cell during the cell search procedure. The wireless device may perform the cell search, for example, when the wireless device has received one or more synchronization signals (SS), for example, the primary synchronization signal (PSS) and the secondary synchronization signal (SSS). The wireless device may assume that reception occasions of one or more physical broadcast channels (PBCH), PSS, and SSS are in consecutive symbols, and, for example, form a SS/PBCH block (SSB). For example, the wireless device may assume that SSS, PBCH demodulation reference signal (DM-RS), and PBCH data have the same energy per resource element (EPRE). For example, the wireless device may assume that the ratio of PSS EPRE to SSS EPRE in a SS/PBCH block is a particular value (e.g., either 0 dB or 3 dB). For example, the wireless device may assume that the ratio of PDCCH DM-RS EPRE to SSS EPRE is within a particular range (e.g., from −8 dB to 8 dB), for example, when the wireless device has not been provided dedicated higher layer parameters.

A wireless device may determine a first symbol index for one or more candidate SS/PBCH block. For example, for a half frame with SS/PBCH blocks, the first symbol index for one or more candidate SS/PBCH blocks may be determined according to a subcarrier spacing of the SS/PBCH blocks. For example, index 0 corresponds to the first symbol of the first slot in a half-frame. As an example, the first symbol of the one or more candidate SS/PBCH blocks may have indexes {2, 8}+14·n for 15 kHz subcarrier spacing, where, for example, n=0, 1 for carrier frequencies smaller than or equal to 3 GHz, and for example, n=0, 1, 2, 3 for carrier frequencies larger than 3 GHz and smaller than or equal to 6 GHz. The one or more candidate SS/PBCH blocks in a half frame may be indexed in an ascending order in time, for example, from 0 to L−1. The wireless device may determine some bits (for example, the 2 least significant bits (LSB) for L=4, or the 3 LSB bits for L>4) of a SS/PBCH block index per half frame from, for example, a one-to-one mapping with one or more index of a DM-RS sequence transmitted in the PBCH.

Prior to initiation of a random access procedure, a base station may transmit one or more RRC messages to configure a wireless device with one or more parameters of RACH configuration. The one or more RRC messages may broadcast or multicast to one or more wireless devices. The one or more RRC messages may be wireless device-specific messages, e.g., a dedicated RRC messages transmitted to a wireless device with RRC INACTIVE 1520 or RRC CONNECTED 1530. The one or more RRC messages may comprise one or more parameters required for transmitting at least one preamble via one or more random access resources. For example, the one or more parameters may indicate at least one of the following: PRACH resource allocation, preamble format, SSB information (e.g., total number of SSBs, downlink resource allocation of SSB transmission, transmission power of SSB transmission, SSB index corresponding to a beam transmitting the one or more RRC messages and/or other information), and/or uplink radio resources for one or more transport block transmissions.

The base station may further transmit one or more downlink reference signals. For example, the one or more downlink reference signals may comprise one or more discovery reference signals. The wireless device may select a first downlink reference signal among the one or more downlink reference signals. For example, the first downlink reference signal may comprise one or more synchronization signals and a physical broadcast channel (SS/PBCH). For example, the wireless device may adjust a downlink synchronization based on the one or more synchronization signals. For example, the one or more downlink reference signals may comprise one or more channel state information-reference signals (CSI-RS).

The one or more RRC messages may further comprise one or more parameters indicating one or more downlink control channels, for example, PDCCH. Each of the one or more downlink control channels may be associated with at least one of the one or more downlink reference signals. For example, the first downlink reference signal may comprise one or more system information (e.g., master information block (MIB) and/or system information block (SIB)). The base station may transmit the one or more system information, for example, on the physical broadcast channel (PBCH), physical downlink control channel (PDCCH), and/or physical downlink shared channel (PDSCH).

The one or more system information may comprise at least one information element (e.g., PDCCH-Config, PDCCH-ConfigSIB1, PDCCH-ConfigCommon). The at least one information element may be used, for example, to configure a wireless device with one or more control parameters. The one or more control parameters may comprise one or more parameters of one or more control resource sets (CORESET). For example, the one or more control parameters may comprise the parameters of a first common CORESET #0 (e.g., controlResourceSetZero), and/or a second common CORESET (e.g., commonControlResourceSet). The one or more control parameters may further comprise one or more search space sets. For example, the one or more control parameters may comprise the parameters of a first search space for the system information block (e.g., searchSpaceSIB1), and/or a first common search space #0 (e.g., searchSpaceZero), and/or a first random access search space (e.g., ra-SearchSpace), and/or a first paging search space (e.g., pagingSearchSpace). For example, the wireless device may use the one or more control parameters to acquire the one or more downlink control channels.

For example, a wireless device may monitor a set of one or more candidates for the one or more downlink control channels in the one or more control resource sets. The one or more control resource sets may be on a first active downlink frequency band, e.g., an active bandwidth part (BWP), on a first activated serving cell. For example, the first activated serving cell may be configured with the one or more control parameters according to the one or more search space sets. For example, the wireless device may decode each of the one or more downlink control channels in the set of candidates for the one or more downlink control channels according to a first format of a first downlink control information (DCI). For example, the set of candidates for the one or more downlink control channels may be defined in terms of the one or more search space sets. For example, the one or more search space sets may be one or more common search space sets (e.g., Type0-PDCCH, Type0A-PDCCH, Type1-PDCCH, Type2-PDCCH, and/or Type3-PDCCH), and/or one or more wireless device-specific search space sets.

For example, the wireless device may monitor the set of candidates for the one or more downlink control channels in a Type0-PDCCH common search space set. For example, the Type0-PDCCH common search space set may be configured by the at least one information element, e.g., the PDCCH-ConfigSIB1 in the MIB. For example, the Type0-PDCCH common search space set may be configured by the one or more search space sets, e.g., a searchSpaceSIB1 in the PDCCH-ConfigCommon, or the searchSpaceZero in the PDCCH-ConfigCommon. For example, the Type0-PDCCH common search space set may be configured for a first format of a first downlink control information scrambled by a first radio network temporary identifier, e.g., a system information-radio network temporary identifier (SI-RNTI).

For example, the wireless device may monitor the set of candidates for the one or more downlink control channels in a Type1-PDCCH common search space set. For example, the Type1-PDCCH common search space set may be configured by the one or more search space sets, e.g., the ra-searchSpace in the PDCCH-ConfigCommon. For example, the Type1-PDCCH common search space set may be configured for a second format of a second downlink control information scrambled by a second radio network temporary identifier, e.g., a random access-radio network temporary identifier (RA-RNTI), or a temporary cell-radio network temporary identifier (TC-RNTI).

The wireless device may determine, for example during a cell search, that a first control resource set for a first common search space (e.g., Type0-PDCCH) is present. The first control resource set may comprise one or more resource blocks and one or more symbols. The one or more RRC messages may comprise one or more parameters indicating one or more monitoring occasions of the one or more downlink control channels. For example, the wireless device may determine a number of consecutive resource blocks and a number of consecutive symbols for the first control resource set of the first common search space. For example, one or more bits (e.g., a four most significant bits) of the at least one information element (e.g., PDCCH-ConfigSIB1) may indicate the number of consecutive resource blocks and the number of consecutive symbols. For example, the wireless device may determine the one or more monitoring occasions of the one or more downlink control channels from one or more bits (e.g., a four least significant bits) of the at least one information element (e.g., PDCCH-ConfigSIB1). For example, the one or more monitoring occasions of the one or more downlink control channels associated with the first downlink reference signal may be determined based on one or more system frame numbers and one or more slot indexes of the first control resource set. For example, the first downlink reference signal with a first index may overlap in time with the first frame number and the first slot index.

The wireless device may determine a first downlink channel among the one or more downlink control channels, based on the first downlink reference signal. For example, the first downlink channel may be a first downlink control channel, or a first system information block (e.g., SIB1). The wireless device may assume that a demodulation reference signal antenna port associated with a reception of the first downlink channel is quasi co-located (QCL) with the first downlink reference signal. For example, the demodulation reference signal antenna port associated with the reception of the first downlink channel and the first downlink reference signal (e.g., the corresponding SS/PBCH block) may be quasi co-located with respect to at least one of the following: an average gain, QCL-TypeA, and/or QCL-TypeD.

A physical layer of the wireless device may receive, from higher layers, one or more SS/PBCH block indexes. For example, the physical layer may receive one or more configuration parameters of one or more physical random access channel (PRACH) transmission parameters (e.g., the one or more PRACH transmission parameters may indicate PRACH preamble format, preamble index, a corresponding RA-RNTI, time resources, and/or frequency resources for PRACH transmission), and/or parameters for determining one or more sequences and their shifts in the PRACH preamble sequence set (e.g., set type). The physical layer may provide to higher layers one or more corresponding sets of reference signal received power (RSRP) measurements.

The random access procedure may comprise one or more transmissions of a random access preamble (e.g., Msg1) in one or more PRACH occasions. The random access procedure may further comprise one or more transmissions of one or more random access response (RAR) messages, for example, with one or more physical downlink channels (e.g., Msg2). The random access procedure may further comprise one or more Msg3 in one or more physical uplink channels (e.g., PUSCH), and one or more physical downlink channels (PDSCH) for contention resolution. The random access procedure may be triggered upon request of one or more PRACH transmissions, for example, by higher layers or by one or more control orders (e.g., PDCCH order).

A MAC entity of the wireless device may select one or more random access resources for a random access procedure initiated. The MAC entity may select a first downlink reference signal. For example, the MAC entity may select the first downlink reference signal (e.g., a first SS/PBCH block (SSB), or a first channel state information-reference signal (CSI-RS)) with the first reference signal received power (RSRP) above a first reference signal received power threshold. For example, the first reference signal received power threshold may be defined per a type of reference signal (e.g., rsrp-ThresholdSSB may for a SSB, and rsrp-ThresholdCSI-RS for a CSI-RS). The first reference signal received power threshold may be broadcast, semi-statically configured, and/or predefined. For example, the MAC entity may select the first downlink reference signal for contention-free random access procedure, for example for beam failure recovery, or system information request. For example, the MAC entity may select the first downlink reference signal for contention-based random access procedure.

The wireless device may select one or more random access resources. The one or more random access resources may, for example, comprise one or more random access preambles, one or more time resources, and/or one or more frequency resources for PRACH transmission. The one or more random access resources may be predefined. The one or more random access resources may be provided by one or more RRC messages. The one or more random access resources may be provided by one or more downlink control orders (e.g., PDCCH order). The one or more random access resources may be determined based on the first downlink reference signal. For example, the wireless device may set a first preamble index to a parameter (e.g., ra-PreambleIndex) corresponding to the first downlink reference signal.

The wireless device may transmit at least one random access preamble in the one or more random access resources. For example, the wireless device may transmit a first preamble with the first preamble index. The first preamble may be transmitted using a first PRACH format with a first transmission power on one or more PRACH resources. The one or more PRACH resources may comprise one or more PRACH occasions.

The one or more RRC messages may comprise one or more random access parameters. For example, a cell specific random access configuration message (e.g., RACH-ConfigCommon and/or RACH-ConfigGeneric) may comprise at least one of the following: a total number of random access preambles (e.g., totalNumberOfRA-Preambles), one or more PRACH configuration index (e.g., prach-ConfigurationIndex), a number of PRACH occasions that may be multiplexed in frequency domain (FDMed) in a time instance (e.g., msg1-FDM), an offset of a lowest PRACH occasion in frequency domain with respect to a first resource block (e.g., msg1-FrequencyStart), a power ramping step for PRACH (e.g., powerRampingStep), a target power level at the network receiver side (preambleReceivedTargetPower), a maximum number of random access preamble transmission that may be performed (e.g., preambleTransMax), a window length for a random access response (i.e., RAR, e.g., Msg2) (e.g., ra-ResponseWindow), a number of SSBs per random access channel (RACH) occasion and a number of contention-based preambles per SSB (e.g., ssb-per-RACH-OccasionAndCB-PreamblesPerSSB). For example, the total number of random access preambles may be a multiple of the number of SSBs per RACH occasion. For example, the window length for RAR may be in number of slots. For example, a dedicated random access configuration message (e.g., RACH-ConfigDedicated) may comprise one or more RACH occasions for contention-free random access (e.g., occasions), and one or more PRACH mask index for random access resource selection (e.g., ra-ssb-Occasion-MaskIndex).

The one or more random access parameters (e.g., ssb-perRACH-OccasionAndCB-PreamblesPerSSB) may provide the wireless device with a first number (e.g., N) of the one or more downlink reference signals (e.g., SS/PBCH blocks) that may be associated with a first PRACH occasion. The one or more random access parameters (e.g., ssb-perRACH-OccasionAndCB-PreamblesPerSSB) may provide the wireless device with a second number (e.g., R) of the one or more random access preambles for the first downlink reference signal and for the first PRACH occasion. The one or more random access preambles may be contention based preambles. The first downlink reference signal may be a first SS/PBCH block. For example, according to the first number (e.g., if N<1), the first SS/PBCH block may be mapped to at least one (e.g., 1/N) consecutive valid PRACH occasions. For example, according to the second number (e.g., R), at least one preamble with consecutive indexes associated with the first SS/PBCH block may start from the first preamble index for the first valid PRACH occasion.

For example, the one or more PRACH configuration indexes (e.g., prach-ConfigurationIndex), may indicate a preamble format, a periodicity for the one or more PRACH time resources, one or more PRACH subframe numbers, a number of PRACH slots within the one or more PRACH subframes, a PRACH starting symbol number, and/or a number of time domain PRACH occasions within the first PRACH slot.

The one or more random access parameters may further comprise an association period for mapping the one or more SS/PBCH blocks to the one or more PRACH occasions. For example, the one or more SS/PBCH block indexes may be mapped to the one or more PRACH occasions based on an order. For example, the order may be as follows: In increasing order of the indexes of the at least one preamble in the first PRACH occasion. In increasing order of the indexes of the one or more frequency resources (e.g., for frequency multiplexed PRACH occasions). In increasing order of the indexes of the one or more time resources (e.g., for time multiplexed PRACH occasions) in the first PRACH slot. In increasing order of the indexes for the PRACH slots.

For example, for the PRACH transmission triggered by the one or more control orders (e.g., PDCCH order), one or more PRACH mask indexes (e.g., ra-ssb-OccasionMaskIndex) may indicate the one or more PRACH occasions. The one or more PRACH occasions may be associated with the first SS/PBCH block index indicated by the one or more control orders. For example, the PRACH occasions may be mapped consecutively for the first SS/PBCH block index. The wireless device may select the first PRACH occasion indicated by a first PRACH mask index value for the first SS/PBCH block index in the first association period. The first association period may be a first mapping cycle. The wireless device may reset the one or more indexes of the one or more PRACH occasions for the first mapping cycle.

In an example, a base station may transmit, to a wireless device, one or more messages indicating random access parameters of a four-step random access procedure in FIG. 12 and/or a two-step random access procedure in FIG. 16. For example, the one or more messages may be broadcast RRC message, wireless device specific RRC message, and/or combination thereof. For example, the one or more message may comprise at least one of random access common configuration (e.g., RACH-ConfigCommon), random access generic configuration (e.g., RACH-ConfigGeneric), and/or random access configuration dedicated to a wireless device (e.g., RACH-ConfigDedicated). For example, for a contention based (four-step and/or a two-step) random access procedure, a wireless device may receive, from a base station, at least RACH-ConfigCommon and RACH-ConfigGeneric. For example, for a contention free (four-step and/or a two-step) random access procedure, a wireless device may receive, from a base station, at least RACH-ConfigDedicated.

For example, a random access procedure may be initiated in one or more ways at least based on one of RACH-ConfigCommon, RACH-ConfigGeneric, and RACH-ConfigDedicated. For example, a random access procedure may be initiated by a PDCCH order transmitted by a base station, by the MAC entity of a wireless device, and/or by RRC. There may be one random access procedure ongoing at any point in time in a MAC entity. A random access procedure on an SCell may be initiated by a PDCCH order with ra-PreambleIndex different from a first index (that may be predefined or configured e.g., 0b000000). For example, if the MAC entity of a wireless device receives a request for a random access procedure while another is already ongoing in the MAC entity, a wireless device may continue with the ongoing procedure or start with the new procedure (e.g. for SI request).

An example random access common configuration (e.g., RACH-ConfigCommon) may be below:

```
RACH-ConfigCommon ::= SEQUENCE {
    rach-ConfigGeneric      RACH-ConfigGeneric,
    totalNumberOfRA-Preambles   INTEGER (1..63)   OPTIONAL, -- Need S
    ssb-perRACH-OccasionAndCB-PreamblesPerSSB CHOICE {
        oneEighth         ENUMERATED
{n4,n8,n12,n16,n20,n24,n28,n32,n36,n40,n44,n48,n52,n56,n60,n64},
        oneFourth         ENUMERATED
{n4,n8,n12,n16,n20,n24,n28,n32,n36,n40,n44,n48,n52,n56,n60,n64},
        oneHalf           ENUMERATED
{n4,n8,n12,n16,n20,n24,n28,n32,n36,n40,n44,n48,n52,n56,n60,n64},
        one               ENUMERATED
n4,n8,n12,n16,n20,n24,n28,n32,n36,n40,n44,n48,n52,n56,n60,n64},
        two               ENUMERATED {n4,n8,n12,n16,n20,n24,n28,n32},
        four              INTEGER (1..16),
```

```
        eight            INTEGER (1..8),
        sixteen          INTEGER (1..4)
    } OPTIONAL,-- Need M
    groupBconfigured    SEQUENCE {
        ra-Msg3SizeGroupA ENUMERATED { b56, b144, b208, b256, b282, b480,
b640, b800, b1000, spare7, spare6, spare5, spare4, spare3, spare2, spare1},
        messagePowerOffsetGroupB ENUMERATED { minusinfinity, dB0, dB5,
dB8, dB10, dB12, dB15, dB18},
        numberOfRA-PreamblesGroupA    INTEGER (1..64)
    } OPTIONAL,-- Need R
    ra-ContentionResolutionTimer    ENUMERATED { sf8, sf16, sf24, sf32, sf40,
sf48, sf56, sf64},
    rsrp-ThresholdSSB    RSRP-Range OPTIONAL, -- Need R
    rsrp-ThresholdSSB-SUL    RSRP-Range OPTIONAL, -- Cond SUL
    prach-RootSequenceIndex    CHOICE {
        l839    INTEGER (0..837),
        l139    INTEGER (0..137)
    },
    msg1-SubcarrierSpacing   SubcarrierSpacing  OPTIONAL, --Need S
    restrictedSetConfig    ENUMERATED {unrestrictedSet, restrictedSetTypeA,
restrictedSetTypeB},
    msg3-transformPrecoding    ENUMERATED {enabled} OPTIONAL, -- Need R
    ...
}
```

For example, messagePowerOffsetGroupB may indicate a threshold for preamble selection. The value of messagePowerOffsetGroupB may be in dB. For example, minusinfinity in RACH-ConfigCommon may corresponds to −infinity. The value dB0 may correspond to 0 dB, dB5 may correspond to 5 dB and so on. msg1-SubcarrierSpacing in RACH-ConfigCommon may indicate a subcarrier spacing of PRACH. One or more values, e.g., 15 or 30 kHz (<6 GHz), 60 or 120 kHz (>6 GHz) may be applicable. There may be a layer 1 parameter (e.g., 'prach-Msg1SubcarrierSpacing) corresponding to msg1-SubcarrierSpacing. A wireless device may apply the SCS as derived from the prach-ConfigurationIndex in RACH-ConfigGeneric, for example, if this parameter is absent. A base station may employ msg3-transformPrecoding to indicate to a wireless device whether transform precoding is enabled for data transmission (e.g., Msg3 in a four-step RA procedure and/or one or more TB transmission in a two-step RA procedure). Absence of msg3-transformPrecoding may indicate that it is disabled. numberOfRA-PreamblesGroupA may indicate a number of contention based (CB) preambles per SSB in group A. This may determine implicitly the number of CB preambles per SSB available in group B. The setting may be consistent with the setting of ssb-perRACH-OccasionAndCB-PreamblesPerSSB. prach-RootSequenceIndex may indicate PRACH root sequence index. There may be a layer 1 parameter (e.g., 'PRACHRootSequenceIndex') corresponding to ssb-perRACH-OccasionAndCB-PreamblePerSSB. The value range may depend on a size of preamble, e.g., whether a preamble length (L) is L=839 or L=139. ra-ContentionResolutionTimer may indicate an initial value for the contention resolution timer. For example, a value ms8 in RACH-ConfigCommon may indicate 8 ms, value ms16 may indicate 16 ms, and so on. ra-Msg3SizeGroupA may indicate a transport blocks size threshold in bit. For example, a wireless device may employ a contention based RA preamble of group A, for example, when the transport block size is below ra-Msg3SizeGroupA. rach-ConfigGeneric may indicate one or more generic RACH parameters in RACH-ConfigGeneric. restrictedSetConfig may indicate a configuration of an unrestricted set or one of two types of restricted sets. rsrp-ThresholdSSB may indicate a threshold for SS block selection. For example, a wireless device may select the SS block and corresponding PRACH resource for path-loss estimation and (re)transmission based on SS blocks that satisfy the threshold. rsrp-ThresholdSSB-SUL may indicate a threshold for uplink carrier selection. For example, a wireless device may select an SUL carrier to perform random access based on this threshold. ssb-perRACH-OccasionAndCB-PreamblesPerSSB may indicate a number of SSBs per RACH occasion and a number of contention based preambles per SSB. There may be layer 1 one or more parameters (e.g., 'SSB-per-rach-occasion' and/or 'CB-preambles-per-SSB') corresponding to ssb-perRACH-OccasionAndCB-PreamblesPerSSB. For example, a total number of CB preambles in a RACH occasion may be given by CB-preambles-per-SSB*max(1,SSB-per-rach-occasion). totalNumberOfRA-Preambles may indicate a total number of preambles employed for contention based and contention free random access. For example, totalNumberOfRA-Preambles may not comprise one or more preambles employed for other purposes (e.g. for SI request). A wireless device may use one or more of 64 preambles for RA, for example, if the field is absent.

An example random access common configuration of RACH-ConfigGeneric may be below:

```
RACH-ConfigGeneric ::= SEQUENCE {
    prach-ConfigurationIndex    INTEGER (0..255),
    msg1-FDM                    ENUMERATED {one, two, four, eight},
    msg1-FrequencyStart         INTEGER (0..maxNrofPhysicalResourceBlocks-1),
    zeroCorrelationZoneConfig   INTEGER(0..15),
    preambleReceivedTargetPower INTEGER (−202..−60),
```

```
    preambleTransMax    ENUMERATED {n3, n4, n5, n6, n7,n8, n10, n20, n50, n100,
n200),
        powerRampingStep        ENUMERATED {dB0, dB2, dB4, dB6},
        ra-ResponseWindow       ENUMERATED {sl1, sl2, sl4, sl8, sl10, sl20, sl40, sl80},
        ...
}
```

For example, msg1-FDM may indicate a number of PRACH transmission occasions FDMed in one time instance. There may be a layer 1 parameter (e.g., 'prach-FDM') corresponding to msg1-FDM. msg1-FrequencyStart may indicate an offset of PRACH transmission occasion (e.g., lowest PRACH transmission occasion) in frequency domain with respective to a particular PRB (e.g., PRB 0). A base station may configure a value of msg1-FrequencyStart such that the corresponding RACH resource is within the bandwidth of the UL BWP. There may be a layer 1 parameter (e.g., 'prach-frequency-start') corresponding to msg1-FreqencyStart. powerRampingStep may indicate power ramping steps for PRACH. prach-ConfigurationIndex may indicate a PRACH configuration index. For example, a radio access technology (e.g., LTE, and/or NR) may predefine one or more PRACH configurations, and prach-Configuration-Index may indicate one of the one or more PRACH configurations. There may be a layer 1 parameter (e.g., 'PRACHConfigurationIndex') corresponding to prach-ConfigurationIndex. preambleReceivedTargetPower may indicate a target power level at the network receiver side. For example, multiples of a particular value (e.g., in dBm) may be chosen. RACH-ConfigGeneric above shows an example when multiples of 2 dBm are chosen (e.g. −202, −200, −198, . . . ). preambleTransMax may indicate a number of RA preamble transmissions performed before declaring a failure. For example, preambleTransMax may indicate a maximum number of RA preamble transmissions performed before declaring a failure. ra-ResponseWindow may indicate an RAR window length in number of slots (or sub-frames, mini-slots, and/or symbols). a base station may configure a value lower than or equal to a particular value (e.g., 10 ms). The value may be larger than a particular value (e.g., 10 ms). zeroCorrelationZoneConfig may indicate an index of preamble sequence generation configuration (e.g., N-CS configuration). A radio access technology (e.g., LTE and/or NR) may predefine one or more preamble sequence generation configurations, and zeroCorrelationZoneConfig may indicate one of the one or more preamble sequence generation configurations. For example, a wireless device may determine a cyclic shift of preamble sequence based on zeroCorrelationZoneConfig. zeroCorrelationZoneConfig may determine a property of random access preambles (e.g., a zero correlation zone)

An example random access dedicated configuration (e.g., RACH-ConfigDedicated) may be below:

```
RACH-ConfigDedicated ::= SEQUENCE {
    cfra                    CFRA                    OPTIONAL, -- Need N
    ra-Prioritization       RA-Prioritization       OPTIONAL, -- Need N
    ...
}
CFRA ::= SEQUENCE {
    occasions   SEQUENCE {
        rach-ConfigGeneric          RACH-ConfigGeneric,
        ssb-perRACH-Occasion        ENUMERATED {oneEighth, oneFourth,
oneHalf, one, two, four, eight, sixteen}   OPTIONAL   -- Cond SSB-CFRA
    } OPTIONAL,-- Need S
    resources   CHOICE {
        ssb     SEQUENCE {
            ssb-ResourceList SEQUENCE (SIZE(1..maxRA-SSB-Resources)) OF
CFRA-SSB-Resource,
            ra-ssb-OccasionMaskIndex            INTEGER (0..15)
        },
        csirs   SEQUENCE {
            csirs-ResourceList SEQUENCE (SIZE(1..maxRA-CSIRS-Resources)) OF
CFRA-CSIRS-Resource,
            rsrp-ThresholdCSI-RS        RSRP-Range
        }
    },
    ...
}
CFRA-SSB-Resource ::= SEQUENCE {
    ssb                 SSB-Index,
    ra-PreambleIndex    INTEGER (0..63),
    ...
}
CFRA-CSIRS-Resource ::=  SEQUENCE {
    csi-RS              CSI-RS-Index,
    ra-OccasionList     SEQUENCE (SIZE(1..maxRA-OccasionsPerCSIRS)) OF
INTEGER (0..maxRA-Occasions-1),
    ra-PreambleIndex    INTEGER (0..63),
    ...
}
```

For example, csi-RS may indicate an identifier (e.g., ID) of a CSI-RS resource defined in the measurement object associated with this serving cell. ra-OccasionList may indicate one or more RA occasions. A wireless device may employ the one or more RA occasions, for example, when the wireless device performs a contention-free random access (CFRA) procedure upon selecting the candidate beam identified by this CSI-RS. ra-PreambleIndex may indicate an RA preamble index to use in the RA occasions associated with this CSI-RS. ra-ssb-OccasionMaskIndex may indicate a PRACH Mask Index for RA Resource selection. The mask may be valid for one or more SSB resources signaled in ssb-ResourceList. rach-ConfigGeneric may indicate a configuration of contention free random access occasions for the CFRA procedure. ssb-perRACH-Occasion may indicate a number of SSBs per RACH occasion. ra-PreambleIndex may indicate a preamble index that a wireless device may employ when performing CF-RA upon selecting the candidate beams identified by this SSB. ssb in RACH-ConfigDedicated may indicate an identifier (e.g., ID) of an SSB transmitted by this serving cell. cfra in RACH-ConfigDedicated may indicate one or more parameters for contention free random access to a given target cell. A wireless device may perform contention based random access, for example, if the field (e.g., cfra) is absent. ra-prioritization may indicate one or more parameters which apply for prioritized random access procedure to a given target cell. A field, SSB-CFRA, in RACH-ConfigDedicated may be present, for example, if the field resources in CFRA is set to ssb; otherwise it may be not present.

In an example, a base station may transmit, to a wireless device, one or more RRC message indicating at least one of following for a random access procedure:

an available set of PRACH occasions for the transmission of the Random Access Preamble (e.g., prach-ConfigIndex), an initial Random Access Preamble power (e.g., preambleReceivedTargetPower), an RSRP threshold for the selection of the SSB and corresponding Random Access Preamble and/or PRACH occasion (e.g., rsrp-ThresholdSSB, rsrp-ThresholdSSB may be configured in a beam failure recovery configuration, e.g., BeamFailureRecoveryConfig IE, for example, if the Random Access procedure is initiated for beam failure recovery), an RSRP threshold for the selection of CSI-RS and corresponding Random Access Preamble and/or PRACH occasion (e.g., rsrp-ThresholdCSI-RS, rsrp-ThresholdCSI-RS may be set to a value calculated based on rsrp-ThresholdSSB and an offset value, e.g., by multiplying rsrp-ThresholdSSB by powerControlOffset), an RSRP threshold for the selection between the NUL carrier and the SUL carrier (e.g., rsrp-ThresholdSSB-SUL), a power offset between rsrp-ThresholdSSB and rsrp-ThresholdCSI-RS to be employed when the Random Access procedure is initiated for beam failure recovery (e.g., powerControlOffset), a power-ramping factor (e.g., power-RampingStep), a power-ramping factor in case of differentiated Random Access procedure (e.g., powerRampingStepHighPriority), an index of Random Access Preamble (e.g., ra-PreambleIndex), an index (e.g., ra-ssb-OccasionMaskIndex) indicating PRACH occasion(s) associated with an SSB in which the MAC entity may transmit a Random Access Preamble (e.g., FIG. 18 shows an example of ra-ssb-OccasionMaskIndex values), PRACH occasion(s) associated with a CSI-RS in which the MAC entity may transmit a Random Access Preamble (e.g., ra-OccasionList), a maximum number of Random Access Preamble transmission (e.g., preambleTransMax), a number of SSBs mapped to each PRACH occasion and a number of Random Access Preambles mapped to each SSB (e.g., ssb-perRACH-OccasionAndCB-PreamblesPerSSB, the time window (duration, and/or interval) to monitor RA response(s) (e.g., ra-ResponseWindow) and/or a Contention Resolution Timer (e.g., ra-ContentionResolutionTimer).

In an example, a random access procedure may be initiated for beam failure detection and recovery. For example, a wireless device may be configured by RRC with a beam failure recovery procedure which may be employed for indicating to the serving base station of a SSB or CSI-RS when beam failure is detected on the serving SSB(s)/CSI-RS(s). Beam failure may be detected by counting one or more beam failure instance indication from the lower layers to the MAC entity. For example, a base station may configure a wireless device by transmitting an RRC message (e.g., comprising a beam failure recovery configuration, e.g., BeamFailureRecoveryConfig) indicating at least one of following: beamFailureInstanceMaxCount for the beam failure detection. beamFailureDetectionTimer for the beam failure detection, beamFailureRecoveryTimer for the beam failure recovery procedure, rsrp-ThresholdSSB for an RSRP threshold for the beam failure recovery, powerRampingStep for the beam failure recovery, preambleReceivedTargetPower, preambleReceivedTargetPower for the beam failure recovery, preambleTransMax for the beam failure recovery, the time window (e.g., ra-ResponseWindow) to monitor response(s) for the beam failure recovery using contention-free Random Access Preamble, prach-ConfigIndex for the beam failure recovery, ra-ssb-OccasionMaskIndex for the beam failure recovery, ra-OccasionList for the beam failure recovery.

In an example, a wireless device may employ one or more parameters for a random access procedure. For example, a wireless device may employ at least one of PREAMBLE_INDEX; PREAMBLE_TRANSMISSION_ COUNTER; PREAMBLE_POWER_RAMPING_ COUNTER; PREAMBLE_POWER_RAMPING_STEP; PREAMBLE_RECEIVED_TARGET_POWER; PREAMBLE-_BACKOFF; PCMAX; SCALING_FACTOR_BI; and TEMPORARY_C-RNTI.

In an example, a wireless device may perform random access resource selection for selecting one or more preambles and one or more PRACH occasion (or resources comprising time, frequency, and/or code). For example, there may be one or more cases that a random access procedure may be initiated for beam failure recovery; and/or the beamFailureRecoveryTimer is either running or not configured; and/or the contention-free Random Access Resources for beam failure recovery request associated with any of the SSBs and/or CSI-RSs have been explicitly provided by RRC; and/or at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available. In this case, a wireless device may select one or more SSBs with corresponding one or more SS-RSRP values above rsrp-ThresholdSSB amongst the SSBs in candidateBeamRSList or one or more CSI-RSs with corresponding one or more CSI-RSRP values above rsrp-ThresholdCSI-RS amongst the CSI-RSs in candidateBeamRSList. For example, a wireless device may select at least one CSI-RS and set the PREAMBLE_INDEX to a ra-PreambleIndex corresponding to the SSB in candidateBeamRSList which is quasi-collocated with the at least one CSI-RS selected by the wireless device, for example, if there is no ra-PreambleIndex associated with the at least one CSI-RS, otherwise the wireless device may set the PRE- AMBLE_INDEX to a ra-PreambleIndex corresponding to the selected SSB or CSI-RS from the set of Random Access Preambles for beam failure recovery request.

For example, a wireless device may be under one of following cases: a random access procedure may be initiated, a ra-PreambleIndex has been provided by either PDCCH or RRC, the ra-PreambleIndex is not a first preamble index (that may be predefined or configured e.g., 0b000000), contention-free Random Access Resource associated with SSBs or CSI-RSs have not been provided by RRC. In this case, the wireless device may set the PREAMBLE_INDEX to the signaled ra-PreambleIndex.

For example, there may be one or more cases that a random access procedure may be initiated and/or the contention-free Random Access Resources associated with SSBs have been explicitly provided by RRC and at least one SSB with SS-RSRP above rsrp-ThresholdSSB amongst the associated SSBs is available. In this case, a wireless device may select an SSB with SS-RSRP above rsrp-ThresholdSSB amongst the associated SSBs. For example, the wireless device may set the PREAMBLE_INDEX to a ra-PreambleIndex corresponding to the selected SSB.

For example, there may be one or more cases that a random access procedure may be initiated, and the contention-free random access resources associated with CSI-RSs have been explicitly provided by RRC and at least one CSI-RS with CSI-RSRP above rsrp-ThresholdCSI-RS amongst the associated CSI-RSs is available. In this case, a wireless device may select a CSI-RS with CSI-RSRP above rsrp-ThresholdCSI-RS amongst the associated CSI-RSs. for example, the wireless device may set the PREAMBLE_INDEX to a ra-PreambleIndex corresponding to the selected CSI-RS.

For example, there may be one or more cases that a random access procedure may be initiated and at least one of the SSBs with SS-RSRP above rsrp-ThresholdSSB is available. In this case, for example, a wireless device may select an SSB with SS-RSRP above rsrp-ThresholdSSB, otherwise may select any SSB. For example, a random access resource selection is performed when Msg3 1240, two-step Msg1 1620, and/or one or more TBs 1640 is being retransmitted, a wireless device may select the same group of Random Access Preambles as was employed for the Random Access Preamble transmission attempt corresponding to the first transmission of Msg3, two-step Msg1 1620, and/or one or more TBs 1640. For example, if the association between random access preambles and SSBs is configured, a wireless device may select a ra-PreambleIndex randomly with equal probability from the Random Access Preambles associated with the selected SSB and the selected Random Access Preambles group. For example, if the association between random access preambles and SSBs is not configured, a wireless device may select a ra-PreambleIndex randomly with equal probability from the Random Access Preambles within the selected Random Access Preambles group. For example, a wireless device may set the PREAMBLE_INDEX to the selected ra-PreambleIndex.

In an example, if an SSB is selected above and an association between PRACH occasions and SSBs is configured, a wireless device may determine the next available PRACH occasion from the PRACH occasions corresponding to the selected SSB permitted by the restrictions given by the ra-ssb-OccasionMaskIndex if configured (the MAC entity of the wireless device may select a PRACH occasion randomly with equal probability amongst the PRACH occasions occurring simultaneously but on different subcarriers, corresponding to the selected SSB; the MAC entity may take into account the possible occurrence of measurement gaps when determining the next available PRACH occasion corresponding to the selected SSB).

In an example, if a CSI-RS is selected above and an association between PRACH occasions and CSI-RSs is configured. a wireless device may determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

In an example, if a CSI-RS is selected above and there is no contention-free Random Access Resource associated with the selected CSI-RS, a wireless device may determine the next available PRACH occasion from the PRACH occasions, permitted by the restrictions given by the ra-ssb-OccasionMaskIndex if configured, corresponding to the SSB in candidateBeamRSList which is quasi-collocated with the selected CSI-RS (the MAC entity may take into account the possible occurrence of measurement gaps when determining the next available PRACH occasion corresponding to the SSB which is quasi-collocated with the selected CSI-RS).

For example, a wireless device may determine the next available PRACH occasion (the MAC entity shall select a PRACH occasion randomly with equal probability amongst the PRACH occasions occurring simultaneously but on different subcarriers; the MAC entity may take into account the possible occurrence of measurement gaps when determining the next available PRACH occasion).

For example, based on a selected PREAMBLE INDEX and PRACH occasion, a wireless device may perform the random access preamble transmission. For example, if the notification of suspending power ramping counter has not been received from lower layers; and/or if SSB selected is not changed (i.e. same as the previous Random Access Preamble transmission), a wireless device may increment PREAMBLE_POWER_RAMPING_COUNTER by 1. the wireless device may select a value of DELTA_PREAMBLE that may be predefined and/or semi-statically configured by a base station and set PREAMBLE_RECEIVED_TARGET_ POWER to preambleReceivedTargetPower+DELTA_PREAMBLE+(PREAMBLE_POWER_RAMPING_COUNTER−1)×PREAMBLE_POWER_RAMPING_STEP.

The wireless device may instruct the physical layer to transmit the Random Access Preamble using the selected PRACH, corresponding RA-RNTI (e.g., if available), PREAMBLE_INDEX and PREAMBLE_RECEIVED_TARGET_POWER. For example, the wireless device may compute an RA-RNTI associated with the PRACH occasion in which the Random Access Preamble is transmitted, e.g., In an example, the RA-RNTI associated with the PRACH in which the Random Access Preamble is transmitted, may be computed in terms of index of the first OFDM symbol of the specified PRACH, an index of the first slot of the specified PRACH in a system frame, an index of the specified PRACH in the frequency domain, and/or uplink carrier indicator. For example, an example RA-RNTI may be calculated as:

$$RA\text{-}RNTI = 1 + s\_id + 14 \times t\_id + 14 \times 80 \times f\_id + 14 \times 80 \times 8 \times ul\_carrier\_id$$

where s_id may be the index of the first OFDM symbol of the specified PRACH ($0 \leq s\_id < 14$), t_id may be the index of the first slot of the specified PRACH in a system frame ($0 \leq t\_id < 80$), f_id may be the index of the specified PRACH in the frequency domain ($0 \leq f\_id < 8$), and ul_carrier_id may be the UL carrier used for Msg1 1220 transmission or two-step Msg1 1620 (0 for NUL carrier, and 1 for SUL carrier or vice versa).

For example, a wireless device, that transmitted a random access preamble, may start to monitor a downlink control channel for a random access response corresponding to the random access preamble. The possible occurrence of a measurement gap may not determine when a wireless device starts to monitor a downlink control channel.

If a wireless device performs a contention-free random access procedure for a beam failure recovery request, the wireless device may start a random access window (e.g., ra-ResponseWindow) configured in a beam management configuration parameters (e.g., BeamFailureRecoveryConfig) at a first downlink control channel (e.g., PDCCH) occasion from the end of the Random Access Preamble transmission. The wireless device may monitor the first downlink control channel of the SpCell for a response to beam failure recovery request identified by the C-RNTI while the random access window is running If a wireless device down not performs a contention-free random access procedure for beam a failure recovery request, the wireless device may start a random access window (e.g., ra-ResponseWindow) configured in a random access configuration parameter (e.g., RACH-ConfigCommon) at a first downlink control channel occasion from an end of a random access preamble transmission. The wireless device may monitor the first downlink control channel occasion of the SpCell for random access response(s) identified by the RA-RNTI while a random access response window (e.g., ra-ResponseWindow) is running In an example, a downlink assignment may be received by a wireless device, on the PDCCH for the RA-RNTI and the received TB (e.g., MAC PDU comprising one or more random access responses is successfully decoded. For example, the MAC PDU may comprise a MAC subPDU with Random Access Preamble identifier corresponding to a preamble that a wireless device transmits to a base station. In this case, the wireless device may determine that this random access response reception may be successful. For example, the MAC subPDU may comprise a preamble index (e.g., RAPID) only, e.g., for a random access procedure initiated for a system information request.

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of interworking solutions with Wi-Fi, e.g., LTE/ WLAN interworking. This interest indicates that unlicensed spectrum, when present, may be an effective complement to licensed spectrum for cellular operators to help addressing the traffic explosion in some scenarios, such as hotspot areas. For example, in a legacy system (e.g., LTE), licensed assisted access (LAA) and/or new radio on unlicensed band(s) (NR-U) may offer an alternative for operators to make use of unlicensed spectrum while managing one radio network, thus offering new possibilities for optimizing the network's efficiency.

In an example embodiment, Listen-before-talk (LBT) may be implemented for transmission in a cell configured in unlicensed band (referred to as a LAA cell and/or a NR-U cell for the sake of convenience, for example, an LAA cell and NR-U cell may be interchangeable and may refer any cell operating in unlicensed band. The cell may be operated as non-standalone with an anchor cell in a licensed band or standalone without an anchor cell in licensed band). The LBT may comprise a clear channel assessment. For example, in an LBT procedure, equipment may apply a clear channel assessment (CCA) check before using the channel. For example, the CCA comprise at least energy detection that determines the presence (e.g., channel is occupied) or absence (e.g., channel is clear) of other signals on a channel A regulation of a country may impact on the LBT procedure. For example, European and Japanese regulations mandate the usage of LBT in the unlicensed bands, for example in 5 GHz unlicensed band. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous downlink transmission in the unlicensed band Channel reservation may be enabled by the transmission of signals, by an NR-U node, after or in response to gaining channel access based on a successful LBT operation. Other nodes may receive the signals (e.g., transmitted for the channel reservation) with an energy level above a certain threshold that may sense the channel to be occupied. Functions that may need to be supported by one or more signals for operation in unlicensed band with discontinuous downlink transmission may comprise one or more of the following: detection of the downlink transmission in unlicensed band (including cell identification) by wireless devices; time and frequency synchronization of a wireless devices.

In an example embodiment, DL transmission and frame structure design for an operation in unlicensed band may employ subframe, (mini-)slot, and/or symbol boundary alignment according to carrier aggregation timing relationships across serving cells aggregated by CA. This may not imply that the base station transmissions start at the subframe, (mini-)slot, and/or symbol boundary. Unlicensed cell operation (e.g., LAA and/or NR-U) may support transmitting PDSCH, for example, when not all OFDM symbols are available for transmission in a subframe according to LBT. Delivery of necessary control information for the PDSCH may be supported.

An LBT procedure may be employed for fair and friendly coexistence of 3GPP system (e.g., LTE and/or NR) with other operators and technologies operating in unlicensed spectrum. For example, a node attempting to transmit on a carrier in unlicensed spectrum may perform a clear channel assessment (e.g., as a part of one or more LBT procedures) to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. A radio access technology (e.g., LTE and/or NR) may employ a mechanism to adaptively change the energy detection threshold. For example, NR-U may employ a mechanism to adaptively lower the energy detection threshold from an upper bound. Adaptation mechanism may not preclude static or semi-static setting of the threshold. In an example Category 4 LBT (CAT4 LBT) mechanism or other type of LBT mechanisms may be implemented.

Various example LBT mechanisms may be implemented. In an example, for some signals, in some implementation scenarios, in some situations, and/or in some frequencies no LBT procedure may be performed by the transmitting entity. In an example, Category 1 (CAT1, e.g., no LBT) may be implemented in one or more cases. For example, a channel in unlicensed band may be hold by a first device (e.g., a base station for DL transmission), and a second device (e.g., a wireless device) takes over the for a transmission without performing the CAT1 LBT. In an example, Category 2 (CAT2, e.g. LBT without random back-off and/or one-shot LBT) may be implemented. The duration of time determining that the channel is idle may be deterministic (e.g., by a regulation). A base station may transmit an uplink grant indicating a type of LBT (e.g., CAT2 LBT) to a wireless device. CAT1 LBT and CAT2 LBT may be employed for COT sharing. For example, a base station (a wireless device) may transmit an uplink grant (resp. uplink control information) comprising a type of LBT. For example, CAT1 LBT and/or CAT2 LBT in the uplink grant (or uplink control information) may indicate, to a receiving device (e.g., a base station, and/or a wireless device) to trigger COT sharing. In an example, Category 3 (CAT3, e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (CAT4, e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N may be used in the LBT procedure to determine the duration of time that the channel is sensed to be idle before the transmitting entity transmits on the channel In an unlicensed band, a type of LBT (CAT1, CAT2, CAT3, and/or CAT4) may be configured via control messages (RRC, MAC CE, and/or DCI) per a cell. In an example, a type of LBT (CAT1, CAT2, CAT3, and/or CAT4) may be configured via control messages (RRC, MAC CE, and/or DCI) per BWP. For example, a type of LBT (CAT1, CAT2, CAT3, and/or CAT4) may be determined at least based on a numerology configured in a BWP. In this case, BWP switching may change a type of LBT.

In an example, a wireless device may employ uplink (UL) LBT. The UL LBT may be different from a downlink (DL) LBT (e.g. by using different LBT mechanisms or parameters) for example, since the NR-U UL may be based on scheduled access which affects a wireless device's channel contention opportunities. Other considerations motivating a different UL LBT comprise, but are not limited to, multiplexing of multiple wireless devices in a subframe (slot, and/or mini-slot).

In an example, DL transmission burst(s) may be a continuous (unicast, multicast, broadcast, and/or combination thereof) transmission by a base station (e.g., to one or more wireless devices) on a carrier component (CC). UL transmission burst(s) may be a continuous transmission from one or more wireless devices to a base station on a CC. In an example, DL transmission burst(s) and UL transmission burst(s) on a CC in an unlicensed spectrum may be scheduled in a TDM manner over the same unlicensed carrier. Switching between DL transmission burst(s) and UL transmission burst(s) may require an LBT (e.g., CAT1 LBT, CAT2 LBT, CAT3 LBT, and/or CAT4 LBT). For example, an instant in time may be part of a DL transmission burst and/or an UL transmission burst.

Channel occupancy time (COT) sharing may be employed in a radio access technology (e.g., LTE and or NR). COT sharing may be a mechanism that one or more wireless devices share a channel that is sensed as idle by at least one of the one or more wireless devices. For example, one or more first devices occupy a channel an LBT (e.g., the channel is sensed as idle based on CAT4 LBT) and one or more second devices shares it using an LBT (e.g., 25 us LBT) within a maximum COT (MCOT) limit. For example, the MCOT limit may be given per priority class, logical channel priority, and/or wireless device specific. COT sharing may allow a concession for UL in unlicensed band. For example, a base station may transmit an uplink grant to a wireless device for a UL transmission. For example, a base station may occupy a channel and transmit, to one or more wireless devices a control signal indicating that the one or more wireless devices may use the channel. For example, the control signal may comprise an uplink grant and/or a particular LBT type (e.g., CAT1 LBT and/or CAT2 LBT). The one or more wireless device may determine COT sharing based at least on the uplink grant and/or the particular LBT type. The wireless device may perform UL transmission(s) with dynamic grant and/or configured grant (e.g., Type 1, Type2, autonomous UL) with a particular LBT (e.g., CAT2 LBT such as 25 us LBT) in the configured period, for example, if a COT sharing is triggered. A COT sharing may be triggered by a wireless device. For example, a wireless device performing UL transmission(s) based on a configured grant (e.g., Type 1, Type2, autonomous UL) may transmit an uplink control information indicating the COT sharing (UL-DL switching within a (M)COT). A starting time of DL transmission(s) in the COT sharing triggered by a wireless device may be indicated by one or more ways. For example, one or more parameters in the uplink control information indicate the starting time. For example, resource configuration(s) of configured grant(s) configured/activated by a base station may indicate the starting time. For example, a base station may be allowed to perform DL transmission(s) after or in response to UL transmission(s) on the configured grant (e.g., Type 1, Type 2, and/or autonomous UL). There may be a delay (e.g., at least 4 ms) between the uplink grant and the UL transmission. The delay may be predefined, semi-statically configured (via a RRC message) by a base station, and/or dynamically indicated (e.g., via an uplink grant) by a base station. The delay may not be accounted in the COT duration.

In an example, one or more DL to UL and UL to DL switching within a shared COT may be supported. Example LBT requirements to support one or more switching points, may comprise: for gap of less than a first threshold (e.g., 16 us): no-LBT may be used; for gap of above the first threshold (e.g., 16 us) but does not exceed a second threshold (e.g., 25 us): one-shot LBT may be employed; for single switching point, for the gap from DL transmission to UL transmission exceeds the second threshold (e.g., 25 us): one-shot LBT may be employed; for multiple switching points, for the gap from DL transmission to UL transmission exceeds the second threshold (e.g., 25 us), one-shot LBT may be employed.

In an example, a signal that facilitates its detection with low complexity may be useful for wireless device power saving; Improved coexistence; Spatial reuse at least within the same operator network, Serving cell transmission burst acquisition, etc. In an example, a radio access technology (e.g., LTE and/or NR) may employ a signal comprising at least SS/PBCH block burst set transmission. Other channels and signals may be transmitted together as part of the signal. In an example, the signal may be a discovery reference signal (DRS). There may be no gap within a time span that the signal is transmitted at least within a beam. In an example, a gap may be defined for beam switching. In an example, the same interlace structure for PUCCH and PUSCH may be used. In an example, interlaced based PRACH may be used.

In an example, initial active DL/UL BWP may be approximately 20 MHz for a first unlicensed band, e.g., in a 5 GHz unlicensed band. An initial active DL/UL BWP in one or more unlicensed bands may be similar (e.g., approximately 20 MHz in a 5 GHz and/or 6 GHz unlicensed spectrum), for example, if similar channelization is used in the one or more unlicensed bands (e.g., by a regulation). For a wideband case, a base station may configure the wideband with one or more BWP. For example, for 80 MHz case, a base station may configure four BWPs; each BWP may be configured with about 20 MHz. An active BWP (DL and/or UL) may be switched one to another at least based on BWP switching mechanism. For example, a base station may configure the wideband with one or more subbands. For example, for 80 MHz case, a base station may configure four subbands; each subband may be configured with about 20 MHz. For example, a wireless device may perform an LBT subband by subband, and may transmit data via scheduled resources on one or more subbands where the LBT indicates idle.

In an example, HARQ acknowledge and negative acknowledge (A/N) for the corresponding data may be transmitted in a shared COT (e.g., with a CAT2 LBT). In some examples, the HARQ A/N may be transmitted in a separate COT (e.g., the separate COT may require a CAT4 LBT). In an example, when UL HARQ feedback is transmitted on unlicensed band, a radio access technology (e.g., LTE and/or NR) may support flexible triggering and multiplexing of HARQ feedback for one or more DL HARQ processes. HARQ process information may be defined independent of timing (e.g., time and/or frequency resource) of transmission. In an example, UCI on PUSCH may carry HARQ process ID, NDI, RVID. In an example, Downlink Feedback Information (DFI) may be used for transmission of HARQ feedback for configured grant.

In an example, contention-based random access (CBRA) and/or contention-free random access (CFRA) may be supported on SpCell. CFRA may be supported on SCells. In an example, an RAR may be transmitted via SpCell, e.g., non-standalone scenario. In an example, an RAR may be transmitted via SpCell and/or SCell, e.g., standalone scenario. In an example, a predefined HARQ process ID for an RAR.

In an example, carrier aggregation between PCell configured on a licensed band and SCell configured on unlicensed band may be supported. In an example, SCell may have both DL and UL, or DL-only. In an example, dual connectivity between PCell (e.g., LTE cell) configured on a licensed band and PSCell (e.g., NR-U cell) configured on unlicensed band may be supported. In an example, Stand-alone operation on an unlicensed band, where all carriers are in one or more unlicensed bands, may be supported. In an example, a cell with DL in unlicensed band and UL in a licensed band or vice versa may be supported. In an example, dual connectivity between PCell (e.g., NR cell) on a licensed band and PSCell (e.g., NR-U cell) on unlicensed band may be supported.

In an example, a radio access technology (e.g., LTE and/or NR) operating bandwidth may be an integer multiple of 20 MHz, for example, if absence of Wi-Fi cannot be guaranteed (e.g. by regulation) in an unlicensed band (e.g., 5 GHz, 6 GHZ, and/or sub-7 GHz) where the radio access technology (e.g., LTE and/or NR) is operating. In an example, a wireless device may perform one or more LBTs in units of 20 MHz. In an example, receiver assisted LBT (e.g., RTS/CTS type mechanism) and/or on-demand receiver assisted LBT (e.g., for example receiver assisted LBT enabled only when needed) may be employed. In an example, techniques to enhance spatial reuse may be used.

In an example, wideband carrier with more than one channels (e.g., subbands) is supported on in an unlicensed band. In an example, there may be one active BWP in a carrier. In an example, a BWP with one or more channels may be activated. In an example, when absence of Wi-Fi cannot be guaranteed (e.g. by regulation), LBT may be performed in units of 20 MHz. In this case, there may be multiple parallel LBT procedures for this BWP. The actual transmission bandwidth may be subject to subband with LBT success, which may result in dynamic bandwidth transmission within this active wideband BWP.

Channel congestion may cause an LBT failure. For example, the probability of successful LBT may be increased for random access and/or for data transmission, for example, if the wireless device selects the cell/BWP/channel with lowest congestion load. For example, channel occupancy aware RACH procedure may be considered to reduce LBT failure. For example, the random access backoff time for the wireless device may be adjusted based on channel conditions (e.g., based on channel occupancy and/or RSSI measurements). For example, a base station may (semi-statically and/or dynamically) transmit a random access backoff. For example, the random access backoff may be predefined. For example, the random access backoff may be incremented after or in response to one or more random access response reception failures corresponding to one or more random access preamble attempts.

A base station may transmit a SS/PBCH burst set in one contiguous burst. For example, DRS transmission may comprise SS/PBCH burst set in one contiguous burst. The base station may transmit one or more CSI-RSs and/or the remaining minimum system information (RMSI)-CORESET(s) and/or the PDSCH(s) carrying RMSI associated with the SS/PBCH block(s) in the contiguous burst (e.g., DRS transmission). A base station may transmit one or more messages/signals comprising the SS/PBCH burst, the CSI-RS(s), the RMSI-CORESET(s), and/or the PDSCH(s) carrying RMSI in one burst in time domain that results in limiting the required number of channel access and short channel occupancy in an unlicensed band. A radio access technology (e.g., LTE and/or NR) may support a stand-alone operation and/or dual-connectivity deployments.

A base station (e.g., deployed in an unlicensed band) may transmit DRS comprising signals and/or channels that are required for cell acquisition. For example, the DRS may comprise the transmission of at least one of reference signals, paging and/or OSI signals. In some scenario and/or radio access technology, a base station may not transmit at least one of following signal(s)/channel(s) in the DRS: RMSI-CORESET, PDSCH and/or CSI-RS The base station may transmit a DRS within a duration of a DRS transmission window. The DRS transmission window may have a fixed length (e.g. 5 ms) and/or a fixed periodicity (e.g. 20 ms). The length and/or the periodicity of the DRS transmission window may be semi-statically configured by a base station. For example, a duration of the DRS (e.g., comprising SS/PBCH blocks and other multiplex signals/channels) transmitted within the DRS transmission window, may be limited to a particular time duration (e.g., 1 ms). For example, the duration of the DRS within the window may be limited depending on the periodicity of DRS. The base station may transmit one or more message indicating a number of candidate SSB positions within DRS transmission window, e.g. up to 64. The base station may transmit a number of SSBs within DRS transmission window, e.g. up to 8. The transmitted SSBs within the DRS window may not overlap in time domain.

Transmission(s) of SS/PBCH block(s) may not be guaranteed (or may be blocked, cancel, rescheduled, postponed, and/or delayed) in unlicensed band due to LBT failure. In an example, one or more SS/PBCH blocks may be dropped at certain time instances due to LBT failure. Predefined transmission position of SS/PBCH block(s) may be in efficient. There may be a need to opportunistically schedule one or more SS/PBCH block(s), e.g., depending on a success and/or failure of LBT performed on a channel in an unlicensed band. For example, one or more SS/PBCH bursts (e.g., an entire SS/PBCH burst set) may be shifted in time to the next transmission instance. For example, a start of a SS/PBCH burst may be truncated and one or more dropped SSB (e.g., due to the truncation) may be cyclically wrapped at the end of the burst set transmission. For example, the network may schedule one or more SSBs and transmit a message indicating the timing information of scheduled one or more SSBs. For example, SS/PBCH block transmission occasion time index and the associated SS/PBCH block index may be indicated in the SS/PBCH block to allow the wireless device to derive the timing information.

The base station may determine a COT duration for SS/PBCH burst transmission. The COT duration may be determined at least based on a subcarrier spacing of the SS/PBCH burst transmission and/or a number of SS/PBCH blocks in the burst transmission. In an example, the base station may use CAT2 LBT for the SS/PBCH burst transmission, for example, that may provide a short COT of 1 ms. A type of LBT may be determined based on priorities. In an example, a base station may use higher priority CAT4 LBT with shorter random backoff, which may provide a short COT of 2 ms. In an example, the base station may use lower priority CAT4 LBT with longer random backoff, which may provide longer COT, e.g., up to 10 ms.

Semi-static resource allocation of PRACH may be supported as baseline design in a radio access technology (e.g., LTE and/or NR). A base station may semi-statically configure a wireless device with an association between one or more PRACH occasions/preambles and SS/PBCH block(s). For example, the base station may configure the wireless device with a number of SS/PBCH blocks associated with one PRACH occasion based on one or more higher layer parameters. A value of configured number of SS/PBCH blocks associated with one PRACH occasion may be smaller or larger than one. For example, one SS/PBCH block may be mapped to multiple (e.g., consecutive) PRACH occasions, or vice versa. A base station may support a mapping from different SS/PBCH blocks to non-overlapping subsets of RACH preamble indices within one PRACH occasion, for example, if more than one SS/PBCH blocks are mapped to one PRACH occasion.

One or more PRACH periodicities may be supported, e.g., 10, 20, 40, 60, and 160 ms. A wireless device may not wait until the next configured PRACH occasion without transmitting RACH preamble, for example, if the wireless device determines an LBT failure.

There may be one or more enhancements implemented in a radio access technology (e.g., LTE and/or NR) for an operation in an unlicensed band. In an example, one or more transmission opportunities for PRACH may be configured in time, frequency, code, and/or combination thereof. For example, a base station may configure a wireless device with one or more PRACH resources across one or more LBT sub-bands/carriers, for example, for contention-free and/or contention-based RA. In the time domain, a base station may configure a wireless device with one or more PRACH resources dynamically, e.g., via DCI for connected mode wireless device. For example, PRACH resources configured to a wireless device may comprise one or more first PRACH resources dynamically configured (e.g., via DCI) and/or one or more second PRACH resource semi-statically configured (e.g., via a RRC message). For example, a base station may dynamically configure one or more PRACH resources within a COT where the base station transmits one or more SSBs. For example, the one or more PRACH resources may be dynamically scheduled e.g., via paging for idle mode wireless device and/or via DCI (or any control signal) for a connected mode wireless device. For example, the one or more RACH resources may follow one or more SSBs (e.g., DRS transmission).

A wireless device may transmit one or more preambles. For example, the one or more preambles may be limited before reception of a random access response (e.g., Msg2) in RAR window. For example, the one or more preambles may be allowed before starting an RAR window. For example, the number of allowed preamble transmissions may be predefined or indicated by a message e.g., RMSI in an RRC message and/or PDCCH order in a DL control signal. In an example, group wise SSB-to-RO mapping may be supported, e.g., by frequency first-time second manner, where grouping is in time domain A wireless device may perform LBT for accessing a channel before transmitting PRACH in an unlicensed band. The wireless device may transmit the PRACH, for example, if the channel is free. The wireless device may postpone the PRACH transmission, for example, if the channel is busy. A base station may reserve a time duration for the wireless device before transmitting PRACH to perform LBT, e.g., an LBT gap for RACH occasion (RO). The base station may schedule RACH occasions after or in response to a SS/PBCH burst transmission. Scheduling ROs after or in response to the SS/PBCH burst transmission may help a wireless device to avoid LBT failure for the RACH transmission(s). The wireless device may assume no interference and/or no hidden nodes after or in response to detecting SS/PBCH block. The wireless device may skip an LBT and transmit PRACH in response to a reception of at least one SSB. The wireless device may transmit at least one preamble without LBT (or with performing a particular LBT, e.g., CAT2 LBT), for example, if the gap between DL/UL switching point (e.g., between a SSB reception and selected RACH resource) is small.

The base station may configure a wireless device with an association between (e.g., SSB-to-RO mapping) SS/PBCH blocks and RACH. For example, a base station may transmit an RRC message indicating the SSB-to-RO mapping that may be time independent. For example, the RRC message may indicate a frequency resource and/or preamble of a PRACH transmission. The base station may transmit a second message indicating a time resource of the PRACH transmission. The network may support contention-free and contention-based random access procedures on SCells. A base station may transmit a random access response (RAR) on an SCell where the base station may receive a preamble. A base station may transmit a random access response (RAR) on an SCell where a base station does not receive a preamble, e.g., with a cell identifier where the base station receives the preamble.

A base station may share an acquired COT with a wireless device for random access procedure. The base station may allow the wireless device to multiplex PRACH resources in UL portion of a acquired COT. For example, the base station may transmit, to one or more wireless device, an indication via a group-common PDCCH (GC-PDCCH) to schedule PRACH resources within the acquired COT, e.g., for connected, inactive, and/or idle mode wireless device(s). In an example, the base station may transmit the PDCCH (e.g., GC-PDCCH) to schedule resources after one or more SSBs (e.g., in an RMSI and/or in a DCI). In an example, the wireless device may perform one-shot (CAT2) LBT or no LBT for random access preamble (Msg1) and Msg3 transmission in the COT acquired by the base station, for example, the wireless device receives the indication.

A wireless device may share a COT with a base station, for example, when the wireless device acquires the COT, for example, based on CAT4 LBT. For example, the wireless device may acquire the COT for Msg1 and/or Msg3 transmission(s). The base station may perform one-shot (CAT2) LBT or no LBT before Msg2 and Msg4 transmission in the COT. For a two-step RA procedure, a wireless device may acquire the COT for MsgA (e.g., preamble(s), and/or UL data) transmission. The base station may perform one-shot (CAT2) LBT or no LBT before MsgB (e.g., RAR(s) and/or contention resolution) transmission in the COT A base station may configure one or more wireless devices to share one or more RACH resources. The one or more wireless devices may block each other, for example, if the one or more wireless devices transmit one or more preambles without UL synchronization in the same RACH resource. For example, a preamble transmission time may vary between wireless devices, for example, if the wireless devices are not UL-synchronized, and/or if the wireless devices select different values of backoff timers. The base station may perform an LBT to reserve RACH resources. The RACH resources may be within the base-station-initiated COT. The channel prior to the RACH resource may be occupied by the base station. The wireless device may assume that the channel is reserved by the base station for RACH transmission and may skip LBT, for example when the channel prior to the RACH resource is occupied by the serving gNB, and/or the RACH resource is within the COT of the gNB. The base station may indicate the above information to the wireless device, for example using an initial signal. The initial signal may comprise COT sharing indication.

The base station may perform an LBT and transmit a polling indication to one or more wireless devices, for example, in response to a success of the LBT. The one or more wireless devices may transmit one or more preambles with for example, one-shot (CAT2) LBT or with a high priority CAT4 LBT performed in response to receiving the polling indication. One or more PRACH occasions may follow the polling indication in the COT that a base station acquired. The wireless device may be configured to transmit a preamble (e.g., Msg1) with a particular LBT (e.g., one-shot LBT) after or in response to receiving the polling indication from the base station. For example, a reception of the polling indication may be a reference time of one or more preamble transmissions for the one or more wireless devices. A base station may configure one or more wireless devices to transmit at least one preamble (e.g., Msg1) without LBT or with a particular LBT after or in response to receiving the polling indication (e.g., being polled by the base station).

In an example, one or more active BWPs may be supported. To improve the BWP utilization efficiency, the BWP bandwidth may be the same as the bandwidth of subband for LBT, e.g., LBT may be carried out on each BWP. The network may activate/deactivate the BWPs based on data volume to be transmitted.

In an example, one or more non-overlapped BWPs may be activated for a wireless device within a wide component carrier, which may be similar as carrier aggregation. To improve the BWP utilization efficiency, the BWP bandwidth may be the same as the bandwidth of subband for LBT, i.e. LBT may be a carrier out on each BWP. When more than one subband LBT success, it requires a wireless device to have the capability to support one or more narrow RF or a wide RF which may comprise the one or more activated BWPs.

In an example, a single wideband BWP may be activated for a wireless device within a component carrier. The bandwidth of wideband BWP may be in the unit of subband for LBT. For example, if the subband for LBT is 20 MHz in 5 GHz band, the wideband BWP bandwidth may comprise multiple 20 MHz. The actual transmission bandwidth may be subject to subband with LBT success, which may result in dynamic bandwidth transmission within this active wideband BWP.

In an example, active BWP switching may be achieved by use of scheduling DCI. In an example, the network may indicate to a wireless device a new active BWP to use for an upcoming, and any subsequent, data transmission/reception. In an example, a wireless device may monitor multiple, configured BWPs to determine which has been acquired for DL transmissions by the base station. For example, a wireless device may be configured with monitoring occasion periodicity and offset for each configured BWP. The wireless device may attempt to determine if a BWP has been acquired by the base station during those monitoring occasions. In an example, upon determining that the channel is acquired, the wireless device may continue with that BWP as its active BWP, at least until indicated otherwise or Maximum Channel Occupancy Time (MCOT) has been reached. In an example, when a wireless device has determined that a BWP is active, it may attempt blind detection of PDCCH in configured CORESETs and it might also perform measurements on aperiodic or periodic resources (e.g., Type 1 or Type 2 configured grant).

A base station may configure a wireless device with a carrier aggregation with at least one SCell operating in an unlicensed band. A configured set of serving cells for the wireless device may comprise at least one SCell operating in the unlicensed band according to a particular frame structure (e.g., frame structure Type 3 in LTE).

In a RA procedure, a wireless device may receive from a base station at least one RAR as a response of Msg1 1220 or two-step Msg1 1620. The at least one RAR may be scrambled by a particular radio network temporary identifier (e.g., RA-RNTI). The wireless device may monitor a search space set (e.g., the Type1-PDCCH common search space) for a first downlink control information (e.g., DCI format 1_0). The first downlink control information may comprise the at least one RAR. For example, a base station may transmit the at least one RAR in a form of DCI format 1_0 for a random access procedure initiated by PDCCH order, MAC layer, and/or RRC layer. For example, the DCI format 1_0 may comprise at least one of the following fields: one or more random access preamble index, SS/PBCH index, PRACH mask index, UL/SUL indicator, frequency and time domain resource assignments, modulation and/or coding schemes.

A wireless device may monitor for the first downlink control information (e.g., DCI format 1_0) during a time window. The time window may be indicated by the one or more RRC messages. The time window may start at a first symbol of a first control resource set. The wireless device may be configured by the one or more parameters in the one or more RRC messages to receive the first downlink control information on the first control resource set. The wireless device may determine a length of the time window based on the one or more parameters in the one or more RRC messages (e.g., ra-ResponseWindow). The length of the time window may be in number of slots.

The wireless device may stop the time window after or in response to a reception of the one or more random access responses being determined as successful. A reception of the one or more random access responses may be determined as successful, for example, when the one or more random access responses comprise a preamble index (e.g., a random access preamble identity: RAPID) corresponding to a preamble that the wireless device transmits to a base station. For example, the RAPID may be associated with the PRACH transmission. The one or more random access responses may comprise an uplink grant indicating one or more uplink resources granted for the wireless device. The wireless device may transmit one or more transport blocks (e.g., Msg 3) via the one or more uplink resources.

Figure 19A:
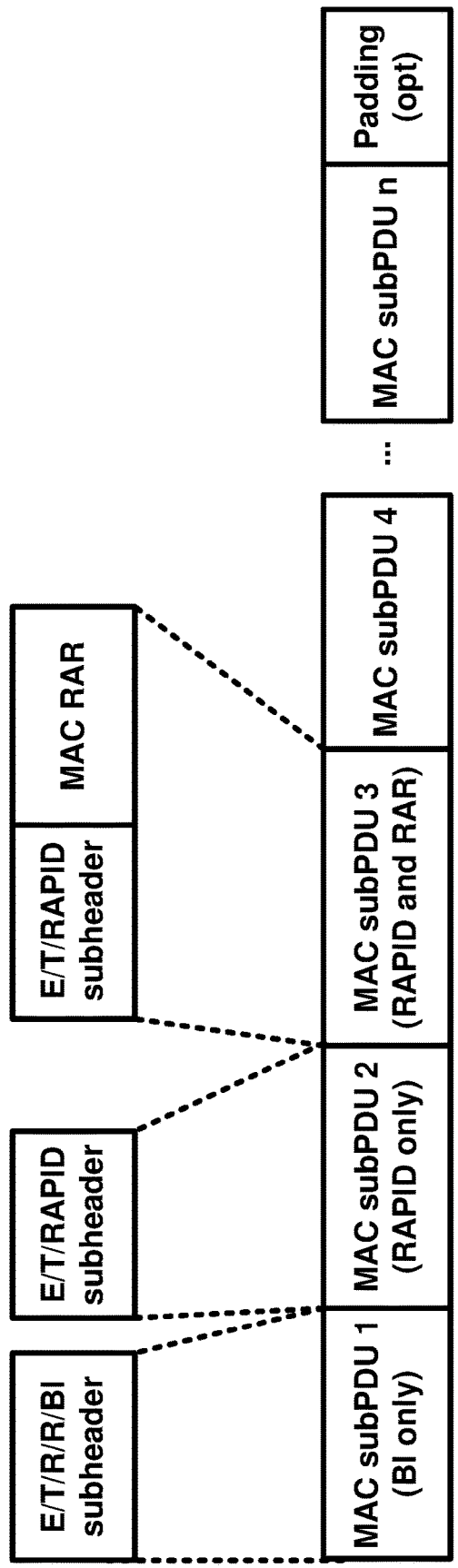
FIG. 19A, FIG. 19B, and FIG. 19C are respectively examples of an RAR, a MAC subheader with backoff indicator, and a MAC subheader with RAPID as per an aspect of an embodiment of the present disclosure.
Figure 19B:
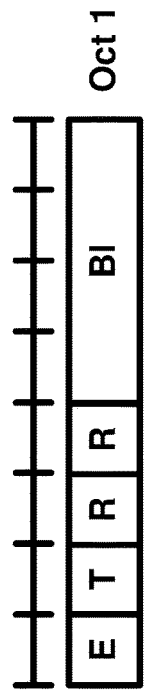
Figure 19C:
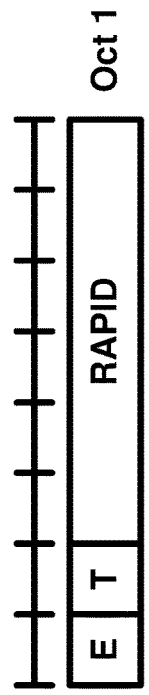

An RAR may be in a form of MAC PDU comprising one or more MAC subPDUs and/or optionally padding. FIG. 19A is an example of an RAR. A MAC subheader may be octet aligned. Each MAC subPDU may comprise at least one of following: a MAC subheader with Backoff Indicator only; a MAC subheader with RAPID only (i.e. acknowledgment for SI request); a MAC subheader with RAPID and MAC RAR. FIG. 19B is an example of a MAC subheader with backoff indicator. For example, a MAC subheader with backoff indicator comprise one or more header fields, e.g., E/T/R/R/BI as described in FIG. 19B. A MAC subPDU with backoff indicator may be placed at the beginning of the MAC PDU, for example, if the MAC subPDU comprises the backoff indicator. MAC subPDU(s) with RAPID only and MAC subPDU(s) with RAPID and MAC RAR may be placed anywhere after MAC subPDU with Backoff Indicator and, if exist before padding as described in FIG. 19A. A MAC subheader with RAPID may comprise one or more header fields, e.g., E/T/RAPID as described in FIG. 19C. Padding may be placed at the end of the MAC PDU if present. Presence and length of padding may be implicit based on TB size, size of MAC subPDU(s).

In an example one or more header fields in a MAC subheader may indicate as follow: an E field may indicate an extension field that may be a flag indicating if the MAC subPDU including this MAC subheader is the last MAC subPDU or not in the MAC PDU. The E field may be set to "1" to indicate at least another MAC subPDU follows. The E field may be set to "0" to indicate that the MAC subPDU including this MAC subheader is the last MAC subPDU in the MAC PDU; a T filed may be a flag indicating whether the MAC subheader contains a Random Access Preamble ID or a Backoff Indicator (one or more backoff values may predefined and BI may indicate one of backoff value). The T field may be set to "0" to indicate the presence of a Backoff Indicator field in the subheader (BI). The T field may be set to "1" to indicate the presence of a Random Access Preamble ID field in the subheader (RAPID); an R filed may indicate a reserved bit that may be set to "0"; a BI field may be a backoff indicator field that identifies the overload condition in the cell. The size of the BI field may be 4 bits; an RAPID field may be a Random Access Preamble IDentifier field that may identify the transmitted Random Access Preamble. The MAC subPDU may not comprise a MAC RAR, for example, if the RAPID in the MAC subheader of a MAC subPDU corresponds to one of the Random Access Preambles configured for SI request.

Figure 20:
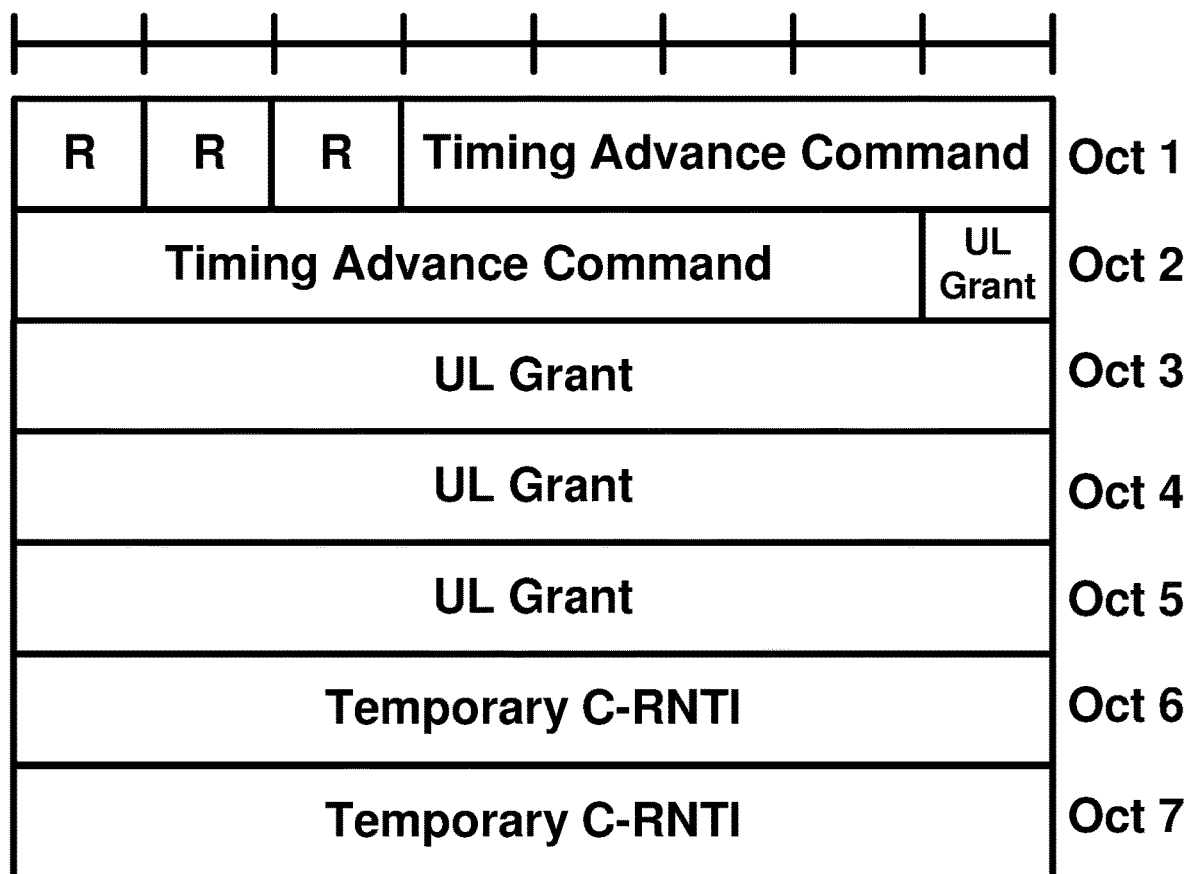
FIG. 20 is an example of one of MAC RAR formats

There may be one or more MAC RAR format. At least one of following MAC RAR format may be employed in a four-step or a two-step RA procedure. For example, FIG. 20 is an example of one of MAC RAR formats. The MAC RAR may be fixed size as depicted in FIG. 20 and may comprise at least one of the following fields: an R field that may indicate a Reserved bit, set to "0"; a Timing Advance Command field that may indicate the index value TA employed to control the amount of timing adjustment; a UL Grant field that indicate the resources to be employed on the uplink; and a RNTI field (e.g., Temporary C-RNTI and/or C-RNTI) that may indicate an identity that is employed during Random Access. For example, for a two-step RA procedure, an RAR may comprise at least one of following: a UE contention resolution identity, an RV ID for retransmission of one or more TBs, decoding success or failure indicator of one or more TB transmission, and one or more fields shown in FIG. 20.

Figure 21:
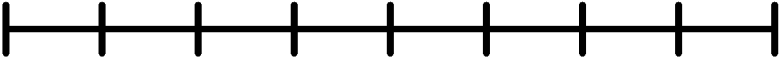
FIG. 21 is an example RAR format as per an aspect of an embodiment of the present disclosure.

There may be a case that a base station may multiplex, in a MAC PDU, RARs for two-step and four-step RA procedures. If RARs for two-step and four-step RA procedure have the same size, a wireless device may not require an RAR length indicator field and/or the wireless device may determine the boundary of each RAR in the MAC PDU based on pre-determined RAR size information. For example, FIG. 21 is an example RAR format that may be employed in a MAC PDU multiplexing RARs for two-step and four-step RA procedures. The RAR shown in FIG. 21 may be a fixed size using the same format for two-step and four-step RA procedures.

Figures 22A, 22B:
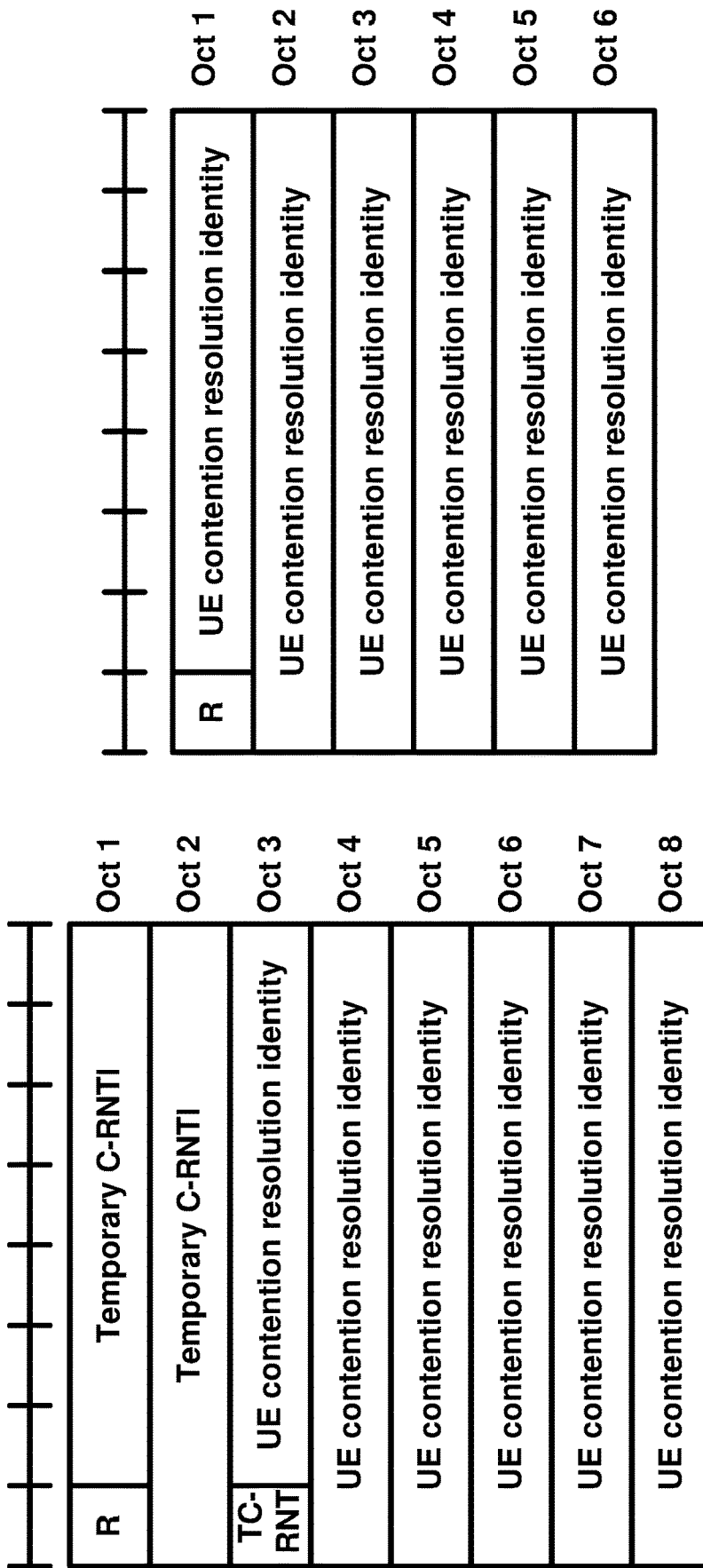
FIG. 22A and FIG. 22B are example RAR formats as per an aspect of an embodiment of the present disclosure.

In an example, an RAR for a two-step RA procedure may have a different format, size, and/or fields, from an RAR for a four-step RA procedure. For example, FIG. 22A, and FIG. 22B are example RAR formats that may be employed for a two-step RA procedure. If RARs for two-step and four-step RA procedures are multiplexed into a MAC PDU, and the RARs have different format between two-step and four-step RA procedure, an RAR may have a field to indicate a type of RAR (e.g., a reserved "R" field as shown in FIG. 20, FIG. 22A, and FIG. 22B may be employed to indicate a type of RAR). A field for indicating an RAR type may be in a subheader (such as a MAC subheader) or in an RAR. An RAR may comprise different types of fields that may correspond with an indicator in a subheader or in an RAR. A wireless device may determine the boundary of one or more RARs in a MAC PDU based on one or more indicators.

In an example, a base station may configure a wireless device with a serving cell comprising one or multiple BWPs. In an example, a maximum number of BWP per Serving Cell may be a first number.

In an example, the BWP switching for a Serving Cell may be used to activate an inactive BWP and deactivate an active BWP at a time. In an example, the BWP switching may be controlled by the PDCCH indicating a downlink assignment or an uplink grant, by the bwp-InactivityTimer, by RRC signaling, or by the MAC entity itself upon initiation of Random Access procedure. In an example, upon/in response to addition of SpCell or activation of an SCell, the DL BWP and UL BWP indicated by firstActiveDownlinkBWP-Id and firstActiveUplinkBWP-Id respectively may be active without receiving PDCCH indicating a downlink assignment or an uplink grant. The active BWP for a Serving Cell may be indicated by either RRC or PDCCH. For unpaired spectrum, a DL BWP may be paired with a UL BWP, and BWP switching may be common for both UL and DL.

In an example, for an activated Serving Cell configured with a BWP, if the BWP is activated, the MAC entity may transmit on UL-SCH on the BWP; may transmit on RACH on the BWP; may monitor the PDCCH on the BWP; may transmit PUCCH on the BWP; may transmit SRS on the BWP; may receive DL-SCH on the BWP; and may (re-)initialize any suspended configured uplink grants of configured grant Type 1 on the active BWP according to the stored configuration, if any, and to start in a symbol.

In an example, for an activated Serving Cell configured with a BWP, if a BWP is deactivated, the MAC entity may not transmit on UL-SCH on the BWP; may not transmit on RACH on the BWP; may not monitor the PDCCH on the BWP; may not transmit PUCCH on the BWP; may not report CSI for the BWP; may not transmit SRS on the BWP; may not receive DL-SCH on the BWP; may clear any configured downlink assignment and configured uplink grant of configured grant Type 2 on the BWP; and may suspend any configured uplink grant of configured grant Type 1 on the inactive BWP.

In an example, upon/in response to initiation of the Random Access procedure on a Serving Cell, if PRACH occasions are not configured for the active UL BWP, the MAC entity may switch the active UL BWP to BWP indicated by initialUplinkBWP and if the Serving Cell is a SpCell, the MAC entity may switch the active DL BWP to BWP indicated by initialDownlinkBWP. The MAC entity may perform the Random Access procedure on the active DL BWP of SpCell and active UL BWP of this Serving Cell.

In an example, upon/in response to initiation of the Random Access procedure on a Serving Cell, if PRACH occasions are configured for the active UL BWP, if the Serving Cell is a SpCell and if the active DL BWP does not have the same bwp-Id as the active UL BWP, the MAC entity may switch the active DL BWP to the DL BWP with the same bwp-Id as the active UL BWP. The MAC entity may perform the Random Access procedure on the active DL BWP of SpCell and active UL BWP of this Serving Cell.

In an example, if the MAC entity receives a PDCCH for BWP switching of a serving cell, if there is no ongoing Random Access procedure associated with this Serving Cell; or if the ongoing Random Access procedure associated with this Serving Cell is successfully completed upon reception of this PDCCH addressed to C-RNTI the MAC entity may perform BWP switching to a BWP indicated by the PDCCH.

In an example, if the MAC entity receives a PDCCH for BWP switching for a Serving Cell while a Random Access procedure associated with that Serving Cell is ongoing in the MAC entity, it may be up to a wireless device implementation whether to switch BWP or ignore the PDCCH for BWP switching, except for the PDCCH reception for BWP switching addressed to the C-RNTI for successful Random Access procedure completion in which case the wireless device may perform BWP switching to a BWP indicated by the PDCCH. In an example, upon/in response to reception of the PDCCH for BWP switching other than successful contention resolution, if the MAC entity decides to perform BWP switching, the MAC entity may stop the ongoing Random Access procedure and may initiate a Random Access procedure on the new activated BWP; if the MAC decides to ignore the PDCCH for BWP switching, the MAC entity may continue with the ongoing Random Access procedure on the active BWP.

In an example, if the bwp-InactivityTimer is configured, if the defaultDownlinkBWP is configured, and the active DL BWP is not the BWP indicated by the defaultDownlinkBWP; or if the defaultDownlinkBWP is not configured, and the active DL BWP is not the initialDownlinkBWP, if a PDCCH addressed to C-RNTI or CS-RNTI indicating downlink assignment or uplink grant is received on the active BWP; or if a PDCCH addressed to C-RNTI or CS-RNTI indicating downlink assignment or uplink grant is received for the active BWP; or if a MAC PDU is transmitted in a configured uplink grant or received in a configured downlink assignment: if there is no ongoing random access procedure associated with this Serving Cell; or if the ongoing Random Access procedure associated with this Serving Cell is successfully completed upon reception of this PDCCH addressed to C-RNTI, the MAC entity may for each activated Serving Cell may start or restart the bwp-InactivityTimer associated with the active DL BWP.

In an example, if the bwp-InactivityTimer is configured, if the defaultDownlinkBWP is configured, and the active DL BWP is not the BWP indicated by the defaultDownlinkBWP; or if the defaultDownlinkBWP is not configured, and the active DL BWP is not the initialDownlinkBWP, if a PDCCH for BWP switching is received on the active DL BWP, and the MAC entity switches the active BWP, the MAC entity may for each activated Serving Cell may start or restart the bwp-InactivityTimer associated with the active DL BWP.

In an example, if the bwp-InactivityTimer is configured, if the defaultDownlinkBWP is configured, and the active DL BWP is not the BWP indicated by the defaultDownlinkBWP; or if the defaultDownlinkBWP is not configured, and the active DL BWP is not the initialDownlinkBWP, if Random Access procedure is initiated on this Serving Cell, the MAC entity may for each activated Serving Cell may stop the bwp-InactivityTimer associated with the active DL BWP of this Serving Cell, if running. In an example, if the Serving Cell is SCell, the MAC entity may stop the bwp-InactivityTimer associated with the active DL BWP of SpCell, if running.

In an example, if the bwp-InactivityTimer is configured, if the defaultDownlinkBWP is configured, and the active DL BWP is not the BWP indicated by the defaultDownlinkBWP; or if the defaultDownlinkBWP is not configured, and the active DL BWP is not the initialDownlinkBWP, if the bwp-InactivityTimer associated with the active DL BWP expires, if the defaultDownlinkBWP is configured, the MAC entity may perform BWP switching to a BWP indicated by the defaultDownlinkBWP, otherwise the MAC entity may perform BWP switching to the initialDownlinkBWP.

In an example, a wireless device configured for operation in bandwidth part(s) (BWPs) of a serving cell, may be configured by higher layers for the serving cell a set of at most X (e.g., four) bandwidth parts (BWPs) for receptions by the wireless device (DL BWP set) in a DL bandwidth by a parameter (e.g., BWP-Downlink) and a set of at most Y (e.g., four) BWPs for transmissions by the wireless device (UL BWP set) in an UL bandwidth by a parameter (e.g., BWP-Uplink) for the serving cell.

An initial active DL BWP may be defined by a location and number of contiguous PRBs, a subcarrier spacing, and a cyclic prefix, for the control resource set for Type0-PDCCH common search space. For operation on the primary cell or on a secondary cell, a wireless device may be provided an initial active UL BWP by higher layer parameter initialuplinkBWP. If the wireless device is configured with a supplementary carrier, the wireless device may be provided an initial UL BWP on the supplementary carrier by higher layer parameter (e.g., initialUplinkBWP) in supplementaryUplink.

In an example, if a wireless device has dedicated BWP configuration, the wireless device may be provided by a higher layer parameter (e.g., firstActiveDownlinkBWP-Id) a first active DL BWP for receptions and by a higher layer parameter (e.g., firstActiveUplinkBWP-Id) a first active UL BWP for transmissions on the primary cell.

In an example, for each DL BWP or UL BWP in a set of DL BWPs or UL BWPs, respectively, the wireless device may be configured the following parameters for the serving cell: a subcarrier spacing provided by a higher layer parameter (e.g., subcarrierSpacing); a cyclic prefix provided by a higher layer parameter (e.g., cyclicPrefix); a first PRB and a number of contiguous PRBs indicated by a higher layer parameter (e.g., locationAndBandwidth) that is interpreted as RIV, setting $N_{BWP}^{size}=275$, and the first PRB is a PRB offset relative to the PRB indicated by higher layer parameters (e.g., offsetToCarrier and subcarrierSpacing); an index in the set of DL BWPs or UL BWPs by respective a higher layer parameter (e.g., bwp-Id); a set of BWP-common and a set of BWP-dedicated parameters by higher layer parameters (e.g., bwp-Common and bwp-Dedicated).

In an example, for unpaired spectrum operation, a DL BWP from the set of configured DL BWPs with index provided by higher layer parameter (e.g., bwp-Id) for the DL BWP is linked with an UL BWP from the set of configured UL BWPs with index provided by higher layer parameter (e.g., bwp-Id) for the UL BWP when the DL BWP index and the UL BWP index are equal. In an example, for unpaired spectrum operation, a wireless device may not expect to receive a configuration where the center frequency for a DL BWP is different than the center frequency for an UL BWP when the bwp-Id of the DL BWP is equal to the bwp-Id of the UL BWP.

In an example, for each DL BWP in a set of DL BWPs on the primary cell, a wireless device may be configured control resource sets for every type of common search space and for wireless device-specific search space. In an example, the wireless device may not expect to be configured without a common search space on the PCell, or on the PSCell, in the active DL BWP.

In an example, for each UL BWP in a set of UL BWPs, the wireless device may be configured resource sets for PUCCH transmissions.

In an example, a wireless device may receive PDCCH and PDSCH in a DL BWP according to a configured subcarrier spacing and CP length for the DL BWP. A wireless device may transmit PUCCH and PUSCH in an UL BWP according to a configured subcarrier spacing and CP length for the UL BWP.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

If a bandwidth part indicator field is configured in DCI format 0_1 or DCI format 1_1 and indicates an UL BWP or a DL BWP different from the active UL BWP or DL BWP, respectively, for each information field in the received DCI format 0_1 or DCI format 1_1, in an example, if the size of the information field is smaller than the one required for the DCI format 0_1 or DCI format 1_1 interpretation for the UL BWP or DL BWP that is indicated by the bandwidth part indicator, respectively, the wireless device may prepend zeros to the information field until its size is the one required for the interpretation of the information field for the UL BWP or DL BWP prior to interpreting the DCI format 0_1 or DCI format 1_1 information fields, respectively. In an example, if the size of the information field is larger than the one required for the DCI format 0_1 or DCI format 1_1 interpretation for the UL BWP or DL BWP that is indicated by the bandwidth part indicator, respectively, the wireless device may use a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively. In an example, the wireless device may set the active UL BWP or DL BWP to the UL BWP or DL BWP indicated by the bandwidth part indicator in the DCI format 0_1 or DCI format 1_1, respectively.

In an example, a wireless device may expect to detect a DCI format 0_1 indicating active UL BWP change, or a DCI format 1_1 indicating active DL BWP change, if a corresponding PDCCH is received within the first X (e.g., 3) symbols of a slot.

In an example, for the primary cell, a wireless device may be provided by a higher layer parameter (e.g., defaultDownlinkBWP-Id) a default DL BWP among the configured DL BWPs. In an example, if a wireless device is not provided a default DL BWP by higher layer parameter defaultDownlinkBWP-Id, the default DL BWP may be the initial active DL BWP.

In an example, if a wireless device is configured for a secondary cell with higher layer parameter defaultDownlinkBWP-Id indicating a default DL BWP among the configured DL BWPs and the wireless device is configured with higher layer parameter bwp-InactivityTimer indicating a timer value, the wireless device procedures on the secondary cell may be same as on the primary cell using the timer value for the secondary cell and the default DL BWP for the secondary cell.

In an example, if a wireless device is configured by higher layer parameter bwp-InactivityTimer a timer value for the primary cell and the timer is running, the wireless device may increment the timer every interval of 1 millisecond for frequency range 1 or every 0.5 milliseconds for frequency range 2 if the wireless device does not detect a DCI format for PDSCH reception on the primary cell for paired spectrum operation or if the wireless device does not detect a DCI format for PDSCH reception or a DCI format for PUSCH transmission on the primary cell for unpaired spectrum operation during the interval.

In an example, if a wireless device is configured by higher layer parameter BWP-InactivityTimer a timer value for a secondary cell and the timer is running, the wireless device may increment the timer every interval of 1 millisecond for frequency range 1 or every 0.5 milliseconds for frequency range 2 if the wireless device does not detect a DCI format for PDSCH reception on the secondary cell for paired spectrum operation or if the wireless device does not detect a DCI format for PDSCH reception or a DCI format for PUSCH transmission on the secondary cell for unpaired spectrum operation during the interval. In an example, the wireless device may deactivate the secondary cell when the timer expires.

In an example, if a wireless device is configured by higher layer parameter firstActiveDownlinkBWP-Id a first active DL BWP and by higher layer parameter firstActiveUplinkBWP-Id a first active UL BWP on a secondary cell or supplementary carrier, the wireless device uses the indicated DL BWP and the indicated UL BWP on the secondary cell as the respective first active DL BWP and first active UL BWP on the secondary cell or supplementary carrier.

In an example, for paired spectrum operation, a wireless device does not expect to transmit HARQ-ACK information on a PUCCH resource indicated by a DCI format 1_0 or a DCI format 1_1 if the wireless device changes its active UL BWP on the PCell between a time of a detection of the DCI format 1_0 or the DCI format 1_1 and a time of a corresponding HARQ-ACK information transmission on the PUCCH.

In an example, a wireless device may not expect to monitor PDCCH when the wireless device performs RRM over a bandwidth that is not within the active DL BWP for the wireless device.

In an example, a BWP IE may be used to configure a bandwidth part. In an example, for each serving cell the network may configure at least an initial bandwidth part comprising of at least a downlink bandwidth part and one (if the serving cell is configured with an uplink) or two (if using supplementary uplink (SUL)) uplink bandwidth parts. Furthermore, the network may configure additional uplink and downlink bandwidth parts for a serving cell.

In an example, the bandwidth part configuration may be split into uplink and downlink parameters and into common and dedicated parameters. Common parameters (in BWP-UplinkCommon and BWP-DownlinkCommon) may be "cell specific" and the network ensures the necessary alignment with corresponding parameters of other wireless devices. The common parameters of the initial bandwidth part of the PCell may be provided via system information. In an example, the network may provide the common parameters via dedicated signaling. Example BWP IE is shown below:

```
BWP ::= SEQUENCE {
    locationAndBandwidth   INTEGER (0..37949),
    subcarrierSpacingSubcarrierSpacing,
    cyclicPrefixENUMERATED { extended } OPTIONAL -- Need R
}
BWP-Uplink ::= SEQUENCE {
    bwp-Id BWP-Id,
    bwp-Common BWP-UplinkCommon   OPTIONAL, -- Need M
    bwp-Dedicated BWP-UplinkDedicatedOPTIONAL, -- Need M
    ...
}
BWP-UplinkCommon ::= SEQUENCE {
    genericParameters BWP,
    rach-ConfigCommon   SetupRelease { RACH-ConfigCommon }OPTIONAL, -- Need M
    pusch-ConfigCommon SetupRelease { PUSCH-ConfigCommon }OPTIONAL, -- Need M
    pucch-ConfigCommon SetupRelease { PUCCH-ConfigCommon }OPTIONAL, -- Need M
    ...
}
BWP-UplinkDedicated ::= SEQUENCE {
    pucch-Config   SetupRelease { PUCCH-Config }   OPTIONAL,   -- Need M
    pusch-Config   SetupRelease { PUSCH-Config }   OPTIONAL,   -- Cond SetupOnly
    configuredGrantConfig SetupRelease { ConfiguredGrantConfig } OPTIONAL, -- Need M
    srs-Config SetupRelease { SRS-Config }   OPTIONAL,   -- Need M
    beamFailureRecoveryConfig   SetupRelease { BeamFailureRecoveryConfig }OPTIONAL,
        -- Cond SpCellOnly
    ...
}
BWP-Downlink ::= SEQUENCE {
    bwp-Id        BWP-Id,
    bwp-Common BWP-DownlinkCommon OPTIONAL, -- Need M
    bwp-Dedicated BWP-DownlinkDedicated OPTIONAL, -- Need M
    ...
}
BWP-DownlinkCommon ::= SEQUENCE {
    genericParameters     BWP,
    pdcch-ConfigCommon SetupRelease { PDCCH-ConfigCommon } OPTIONAL, -- Need M
    pdsch-ConfigCommon SetupRelease { PDSCH-ConfigCommon } OPTIONAL,-- Need M
    ...
}
```

```
BWP-DownlinkDedicated ::= SEQUENCE {
    pdcch-Config   SetupRelease { PDCCH-Config }OPTIONAL, -- Need M
    pdsch-Config   SetupRelease { PDSCH-Config }OPTIONAL, -- Need M
    sps-Config     SetupRelease { SPS-Config } OPTIONAL,  -- Need M
    radioLinkMonitoringConfig   SetupRelease { RadioLinkMonitoringConfig }
OPTIONAL, -- Need M
    ...
}
```

In an example, cyclic prefix may indicate whether to use the extended cyclic prefix for this bandwidth part. If not set, the wireless device may use the normal cyclic prefix. Normal CP may be supported for all numerologies and slot formats. Extended CP may be supported only for 60 kHz subcarrier spacing. In an example, locationAndBandwidth may indicate frequency domain location and bandwidth of this bandwidth part. The value of the field may be interpreted as resource indicator value (RIV). The first PRB may be a PRB determined by subcarrierSpacing of this BWP and offsetToCarrier (configured in SCS-SpecificCarrier contained within FrequencyInfoDL) corresponding to this subcarrier spacing. In case of TDD, a BWP-pair (UL BWP and DL BWP with the same bwp-Id) may have the same center frequency. In an example, subcarrierSpacing may indicate subcarrier spacing to be used in this BWP for all channels and reference signals unless explicitly configured elsewhere. In an example, the value kHz15 may corresponds to µ=0, kHz30 to µ=1, and so on. In an example, the values 15, 30, or 60 kHz may be used. In an example, bwp-Id may indicate an identifier for this bandwidth part. Other parts of the RRC configuration may use the BWP-Id to associate themselves with a particular bandwidth part. A particular BWP ID (e.g., BWP ID=0) may be associated with the initial BWP and may hence not be used here (in other bandwidth parts). The base station may trigger the wireless device to switch UL or DL BWP using a DCI field. The four code points in that DCI field may map to the RRC-configured BWP-ID as follows: For up to 3 configured BWPs (in addition to the initial BWP) the DCI code point may be equivalent to the BWP ID (initial=0, first dedicated=1, . . . ). If the NW configures 4 dedicated bandwidth parts, they may be identified by DCI code points 0 to 3. In this case it is not possible to switch to the initial BWP using the DCI field. In an example, bwp-Id may indicate an identifier for this bandwidth part. Other parts of the RRC configuration may use the BWP-Id to associate themselves with a particular bandwidth part. The BWP ID=0 may be associated with the initial BWP and may hence may not be used here (in other bandwidth parts). The NW may trigger the wireless device to switch UL or DL BWP using a DCI field. The four code points in that DCI field map to the RRC-configured BWP-ID as follows: For up to 3 configured BWPs (in addition to the initial BWP) the DCI code point may be equivalent to the BWP ID (initial=0, first dedicated=1, . . . ). If the NW configures 4 dedicated bandwidth parts, they may be identified by DCI code points 0 to 3. In this case it may not be possible to switch to the initial BWP using the DCI field. In an example, rach-ConfigCommon may indicate configuration of cell specific random access parameters which the wireless device may use for contention based and contention free random access as well as for contention based beam failure recovery. In an example, the NW may configure SSB-based RA (and hence RACH-ConfigCommon) only for UL BWPs if the linked DL BWPs allows the wireless device to acquire the SSB associated to the serving cell. In an example, PUCCH-config may indicate PUCCH configuration for one BWP of the regular UL or SUL of a serving cell. If the wireless device is configured with SUL, the network may configure PUCCH only on the BWPs of one of the uplinks (UL or SUL).

In an example, the network may configure PUCCH-Config for each SpCell. If supported by the wireless device, the network may configure at most one additional SCell of a cell group with PUCCH-Config (i.e. PUCCH SCell). In an example, the IE BWP-Id may be used to refer to Bandwidth Parts (BWP). The initial BWP is referred to by BWP-Id 0. The other BWPs are referred to by BWP-Id 1 to maxNrofBWPs. In an example, the ServingCellConfig IE may be used to configure (add or modify) the wireless device with a serving cell, which may be the SpCell or an SCell of an MCG or SCG. In an example, the parameters may be mostly wireless device specific but partly also cell specific (e.g. in additionally configured bandwidth parts). An example, ServingCellConfig IE is shown below:

```
ServingCellConfig ::= SEQUENCE {
    tdd-UL-DL-ConfigurationDedicated    TDD-UL-DL-ConfigDedicated
OPTIONAL,   -- Cond TDD
    initialDownlinkBWP   BWP-DownlinkDedicated OPTIONAL,  -- Cond ServCellAdd
    downlinkBWP-ToReleaseList   SEQUENCE (SIZE (1..maxNrofBWPs)) OF BWP-Id
OPTIONAL,   -- Need N
    downlinkBWP-ToAddModList SEQUENCE (SIZE (1..maxNrofBWPs)) OF BWP-
Downlink OPTIONAL,   -- Need N
    firstActiveDownlinkBWP-Id  BWP-Id OPTIONAL,  -- Cond SyncAndCellAdd
    bwp-InactivityTimer   ENUMERATED { ms2, ms3, ms4, ms5, ms6, ms8, ms 10, ms20,
ms30, ms40,ms50, ms60, ms80, ms100, ms200, ms300, ms500, ms750, ms1280, ms1920,
ms2560, spare10, spare9, spare8, spare7, spare6, spare5, spare4, spare3, spare2, spare1 }
OPTIONAL,   -- Need R
    defaultDownlinkBWP-Id  BWP-Id OPTIONAL,  -- Need S
    uplinkConfig  UplinkConfig OPTIONAL,   -- Cond ServCellAdd-UL
    supplementaryUplink  UplinkConfig OPTIONAL,   -- Cond ServCellAdd-SUL
    pdcch-ServingCellConfig  SetupRelease { PDCCH-ServingCellConfig } OPTIONAL, --
Need M
    pdsch-ServingCellConfig  SetupRelease { PDSCH-ServingCellConfig } OPTIONAL, --
Need M
```

```
    csi-MeasConfig  SetupRelease { CSI-MeasConfig } OPTIONAL,  -- Need M
    sCellDeactivationTimer  ENUMERATED { ms20, ms40, ms80, ms160, ms200, ms240,
ms320, ms400, ms480, ms520, ms640, ms720, ms840, ms1280, spare2,spare1} OPTIONAL, --
Cond ServingCellWithoutPUCCH
    crossCarrierSchedulingConfig CrossCarrierSchedulingConfig OPTIONAL,  -- Need M
    tag-id TAG-Id,
    ue-BeamLockFunction ENUMERATED {enabled}  OPTIONAL,  -- Need R
    pathlossReferenceLinking  ENUMERATED {pCell, sCell} OPTIONAL,  -- Cond
SCellOnly
    servingCellMO  MeasObjectId OPTIONAL,  -- Cond MeasObject
    ...
}
UplinkConfig ::= SEQUENCE {
    initialUplinkBWP  BWP-UplinkDedicated OPTIONAL,   -- Cond ServCellAdd
    uplinkBWP-ToReleaseList SEQUENCE (SIZE (1..maxNrofBWPs)) OF BWP-Id
OPTIONAL,  -- Need N
    uplinkBWP-ToAddModList SEQUENCE (SIZE (1..maxNrofBWPs)) OF BWP-Uplink
OPTIONAL, -- Need N
    firstActiveUplinkBWP-Id  BWP-Id  OPTIONAL,  -- Cond SyncAndCellAdd
    pusch-ServingCellConfig  SetupRelease { PUSCH-ServingCellConfig } OPTIONAL, --
Need M
    carrierSwitching  SetupRelease { SRS-CarrierSwitching } OPTIONAL,  -- Need M
    ...
}
```

In an example, the bwp_InactivityTimer may have a duration in ms after which the wireless device may fall back to the default Bandwidth Part. In an example, the value 0.5 ms may be applicable for carriers >6 GHz. In an example, when the network releases the timer configuration, the wireless device may stop the timer without switching to the default BWP.

In an example, defaultDownlinkBWP-Id may correspond to L1 parameter 'default-DL-BWP'. The initial bandwidth part may be referred to by BWP-Id=0. ID of the downlink bandwidth part to be used upon expiry. This field may be wireless device specific. When the field is absent the wireless device may use the initial BWP as default BWP.

In an example, downlinkBWP-ToAddModList may indicate list of additional downlink bandwidth parts to be added or modified. In an example, downlinkBWP-ToReleaseList may indicate list of additional downlink bandwidth parts to be released. In an example, firstActiveDownlinkBWP-Id if configured for an SpCell, may contain the ID of the DL BWP to be activated upon performing the reconfiguration in which it is received. If the field is absent, the RRC reconfiguration may not impose a BWP switch (corresponds to L1 parameter 'active-BWP-DL-Pcell'). If configured for an SCell, this field may contain the ID of the downlink bandwidth part to be used upon MAC-activation of an SCell. The initial bandwidth part may be referred to by BWP-Id=0. In an example, initialDownlinkBWP may indicate a dedicated (UE-specific) configuration for the initial downlink bandwidth-part. In an example, firstActiveUplinkBWP-Id if configured for an SpCell, may contains the ID of the DL BWP to be activated upon performing the reconfiguration in which it is received. If the field is absent, the RRC reconfiguration may not impose a BWP switch (corresponds to L1 parameter 'active-BWP-UL-Pcell'). If configured for an SCell, this field may contain the ID of the uplink bandwidth part to be used upon MAC-activation of an SCell. The initial bandwidth part may be referred to by BandwidthPartId=0. In an example, initialUplinkBWP may indicate a dedicated (UE-specific) configuration for the initial uplink bandwidth-part.

In an example, a base station may configure a wireless device with one or more UL carriers associated with one DL carrier of a cell. One of one or more UL carriers configured with a DL carrier may be referred to as a supplementary uplink (SUL) carrier or a normal UL (NUL or may be referred to as a non-SUL) carrier. In an example, a base station may enhance UL coverage and/or capacity by configuring an SUL carrier. A base station may configure a BWP configuration per an uplink (e.g., per uplink carrier) in a cell. For example, a base station may configure one or more BWPs on an SUL separately from one or more BWPs on a NUL. A base station may control an active BWP of an SUL independently of an active BWP of a NUL. For example, a base station may control two uplink transmissions on two ULs (e.g., NUL and SUL) to avoid overlapping PUSCH transmissions in time. For example, SUL and/or NUL may be configured in an unlicensed band. A base station may configure a wireless device with one or more following operations: an SUL in a licensed band and a NUL in a licensed band, an SUL in a licensed band and a NUL in an unlicensed band, an SUL in an unlicensed band and a NUL in a licensed band, and/or an SUL in an unlicensed band and a NUL in an unlicensed band In an example, a base station may avoid configuring parallel uplink transmissions via SUL and NUL of a cell, wherein the parallel uplink transmissions may be PUCCH (and/or PUSCH) via SUL and PUCCH (and/or PUSCH) via NUL. In an example, a base station may transmit one or more RRC message (e.g., wireless device specific RRC signaling) to (re-)configure a location of a PUCCH on an SUL carrier and/or on a NUL carrier. A base station may transmit, to a wireless device, one or more RRC messages comprising configuration parameters for a carrier, wherein the configuration parameters may indicate at least one of random access procedure configuration, BWP configurations (e.g., number of DL/UL BWPs, bandwidth and/or index of configured DL/UL BWP, and/or initial, default, and/or active DL/UL BWP), PUSCH configurations, PUCCH configurations, SRS configurations, and/or a power control parameters.

In an example, a base station may configure an SUL carrier and a NUL carrier to support a random access procedure (e.g., initial access). For example, as shown in FIG. 12, to support a random access to a cell configured with SUL, a base station may configure a RACH configuration 1210 of SUL independent of a RACH configuration 1210 of NUL. For example, one or more parameters associated with Msg1 1220, Msg 2 1230, Msg 3 1240, and/or contention resolution 1250 via SUL may be configured independent of one or more parameters associated with Msg1 1220, Msg 2 1230, Msg 3 1240, and/or contention resolution 1250 via NUL. For example, one or more parameters associated with PRACH transmissions in Msg 1 1220 via SUL may be independent of one or more parameters associated with PRACH transmission via NUL.

For a random access procedure in an unlicensed band and/or in a licensed band, based on a measurement (e.g., RSRP) of one or more DL pathloss references, a wireless device may determine which carrier (e.g., between NUL and SUL) to use. For example, a wireless device may select a first carrier (e.g., SUL or NUL carrier) if a measured quality (e.g., RSRP) of DL pathloss references is lower than a broadcast threshold (e.g., an RRC parameter, rsrp-ThresholdSSB-SUL in RACH-ConfigCommon). If a wireless device selects a carrier between SUL carrier and NUL carrier for a random access procedure, one or more uplink transmissions associated with the random access procedure may remain on the selected carrier.

In an example, a base station may configure NUL and SUL with a TAG. For example, for an uplink transmission of a first carrier (e.g., SUL) of a cell, a wireless device may employ a TA value received during a random access procedure via a second carrier (e.g., NUL) of the cell.

Figure 23:
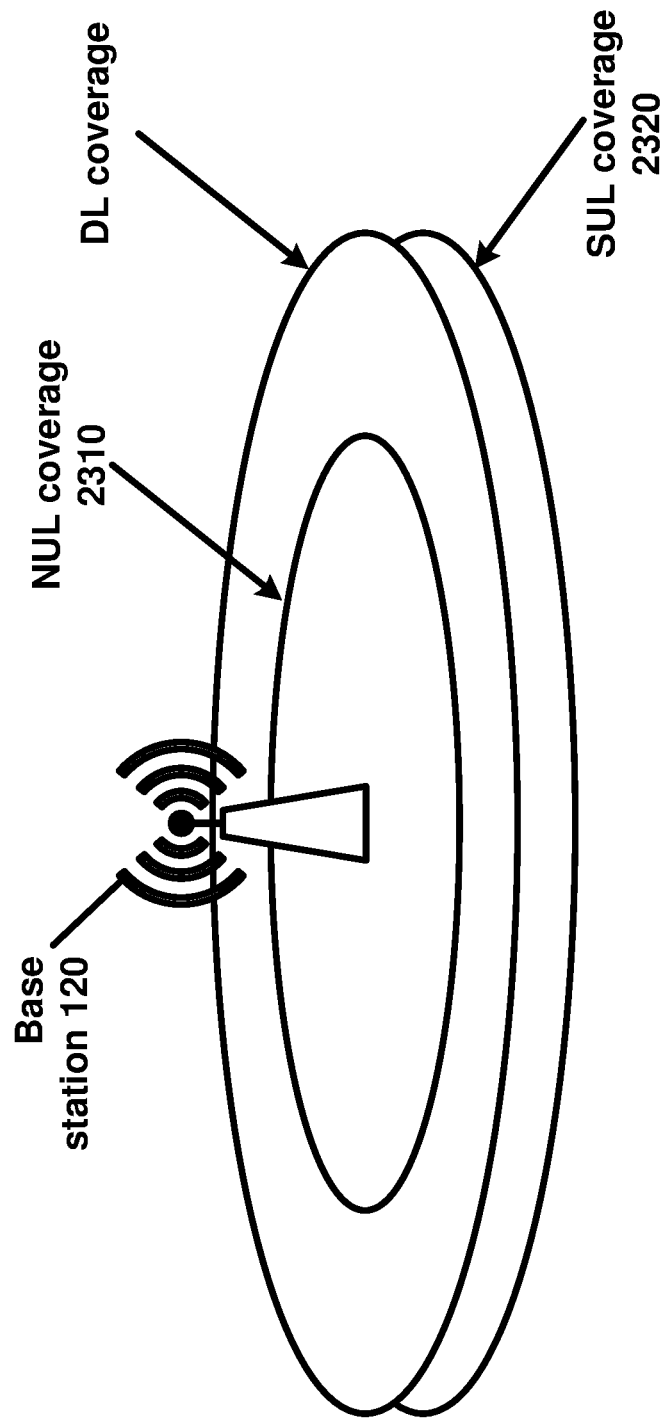
FIG. 23 is an example of a coverage of a cell configured with a DL and two ULs as per an aspect of an embodiment of the present disclosure.

FIG. 23 is an example of a coverage of a cell configured with a DL and two ULs. For example, a base station may configure a NUL and DL over a first frequency (e.g., high frequency). An SUL may be configured over a second frequency (e.g., low frequency) to support uplink transmission (e.g., in terms of coverage and/or capacity) of a cell. In an example, a broadcast threshold (e.g., an RRC parameter, rsrp-ThresholdSSB-SUL) for a wireless device to select a carrier may be determined such that a wireless device located outside a NUL coverage 2310 but inside an SUL coverage 2320 may start a random access procedure via an SUL. A wireless device located inside a NUL coverage 2310 may start a random access procedure via a NUL. A wireless device may employ a RACH configuration associated with a selected carrier for a random access procedure.

In an example, a wireless device may perform a contention based random access procedure and/or a contention free random access procedure. In an example, a wireless device may perform a random access procedure on an UL selected based on a broadcast threshold (e.g., rsrp-ThresholdSSB-SUL). For example, this is a case when a base station does not indicate (e.g., explicitly) the wireless device which carrier to start a random access procedure. In an example, a base station may indicate which carrier a wireless device performs a random access procedure by transmitting a RACH configuration with an SUL indicator (e.g., 0 may indicates a NUL carrier, 1 may indicate an SUL carrier or vice versa). In an example, a base station may indicate (e.g., explicitly) to a wireless device which UL carrier to be employed for a contention free or contention based random access procedure. In an example, a base station may indicate a contention free random access procedure by transmitting a RACH configuration with a dedicated preamble index. In an example, a base station may indicate a contention based random access procedure by transmitting a RACH configuration without a dedicated preamble index.

In an example, it may be beneficial for a network to receive one or more measurements of NUL carrier(s) and/or SUL carrier(s) to initiate a (contention free or contention based) random access procedure for a wireless device. For example, a base station may configure a wireless device (e.g., a wireless device in RRC Connected) with one or more measurements on one or more DL reference signals associated with NUL carrier(s) and/or SUL carrier(s) of a cell.

For example, if a wireless device transmits quality information of one or more measurements on one or more DL reference signals associated with NUL carrier(s) and/or SUL carrier(s), a base station may select a carrier between NUL carrier(s) and/or SUL carrier(s) based on the quality of the one or more measurements. A base station may indicate, to a wireless device, a selected carrier via RRC signaling (e.g., handover) and/or PDCCH order (e.g., SCell addition) for initiating a (contention free or contention based) random access procedure. In an example, e.g., for load balancing between NUL carrier(s) and/or SUL carrier(s), a base station may select one of NUL and SUL carrier by taking into consideration congestion in NUL carrier(s) and/or SUL carrier(s). For example, based on one or more measurement reports associated with NUL carrier(s) and/or SUL carrier(s), a base station may better select a carrier (e.g., NUL or SUL) of a target cell for a (contention free or contention based) random access procedure for a handover. For example, based on one or more measurement reports associated with NUL carrier(s) and/or SUL carrier(s), a base station may better select a carrier (e.g., NUL or SUL) of an SCell (e.g., when the SCell is configured with at least a NUL carrier and an SUL carrier) for a (contention free or contention based) random access procedure for an SCell addition.

In an example, for a handover of a wireless device, a source base station may make a decision on a handover to one or more target cells. A source base station may indicate a handover decision to a target base station associated with one or more target cells that the source base station selects. A target base station may indicate to a wireless device (e.g., through a cell of a source gNB) which carrier (between NUL carrier(s) and SUL carrier(s)) to use via a handover command. For example, a handover command received by a wireless device may comprise an SUL indicator (e.g., 1 bit) along with one or more RACH parameters (e.g., dedicated preamble index, and/or PRACH mask index), wherein the SUL indicator may indicate if the one or more RACH parameters are associated with an SUL or NUL carrier.

For example, it may be useful that a source base station informs a target base station about measured results on NUL carrier(s) and SUL carrier(s), e.g., high frequency carrier(s) and low frequency carrier(s), so that the target base station determines a carrier on which a wireless device may perform a (contention free or contention based) random access procedure for a handover. In an example, when a source base station configures DL measurements on one or more cells association with a NUL carrier(s) and/or SUL carrier(s) of a target gNB, the source base station may need to know whether SUL carrier(s) is (are) configured in the target gNB, and/or which carrier is allowed to be employed for a handover. For example, a target base station may inform a source base station of one or more configurations of NUL carrier(s) and/or SUL carrier(s) of one or more cells in the target gNB. A source base station may configure DL measurement on one or more cells in the target gNB, based on one or more configurations indicating carrier configurations at the one or more cells in the target gNB.

In an example, for an SCell addition, a base station may be aware of whether SUL carrier(s) is (are) configured in an SCell, and/or which carrier is allowed to be employed for an SCell addition. A base station may configure DL measurements on NUL carrier(s) and/or SUL carrier(s). A base station may configure a wireless device with one or more RACH configurations for an SCell, e.g., a first RACH configuration for an SUL carrier, a second RACH configuration for a NUL carrier, and so on. A base station may transmit, to a wireless device via a PDCCH order comprising a parameter indicating in which carrier the wireless device starts a (contention free or contention based) random access procedure. For example, a PDCCH order triggering a (contention free or contention based) random access procedure may comprise one or more parameters indicating at least one of at least one preamble (e.g., preamble index), one or more PRACH resources (e.g., PRACH mask index), an SUL indicator, and/or a BWP indicator. For example, for an random access procedure, a wireless device receiving a PDCCH order may transmit at least one preamble via one or more PRACH resources of a BWP indicated by a BWP indicator of a carrier indicated by an SUL indicator.

In an example, a wireless device may determine a random access procedure unsuccessfully completed. For example, if a wireless device receives no RAR corresponding to one or more preambles transmitted by the wireless device during a random access procedure, the wireless device may consider the random access procedure unsuccessfully completed. There may be a number of preamble transmissions allowed during a random access procedure (e.g., preambleTransMax in RACH-ConfigGeneric), wherein the number of preamble transmissions may be semi-statically configured by RRC. For example, if a wireless device receives no RAR corresponding to the number of preamble transmissions, the wireless device may consider a random access procedure unsuccessfully completed. In response to an unsuccessful completion of a random access procedure, a wireless device may indicate a problem to upper layer(s), wherein, in response to the indicated problem, the upper layers(s) may trigger radio link failure that may lead to prolonged random access delay and degraded user experience.

For example, a base station (source base station and/or a target gNB) configuring a wireless device with a RACH configuration for a random access (for a handover and/or SCell addition) may not allow to reuse the RACH configuration if the random access is unsuccessfully completed.

In an example, a failure of a (contention free or contention based) random access may result in a long delay of random access. For example, if a contention free random access is unsuccessfully completed, instead of a contention free random access, a wireless device may initiate a contention based random access procedure. For example, if a wireless device fails a contention free random access to a target base station during a handover, the wireless device may perform an initial access to the target base station based on a contention based random access. A wireless device performing a contention based random access procedure may compete with one or more wireless devices to get an access to a gNB, which may not guarantee a success of the contention based random access procedure, and/or which may take long (e.g., four step procedure of the contention based random access procedure comparing with a contention free random access comprising MSG 1 1220 and MSG 2 1230 transmissions) to receive a corresponding RAR.

In an example, if a wireless device fails a contention free random access for an SCell addition, the wireless device may wait until a base station transmits a message (e.g., PDCCH order) indicating a RACH configuration, based on which the wireless device may initiate a random access for an SCell addition. It may take long for a base station to detect a failure of a random access for an SCell addition. A wireless device may wait for a message (e.g., PDCCH order) transmitted a base station for an SCell addition unnecessarily long.

In an unlicensed band, a failure of a random access may occur due to LBT. For example, in an unlicensed band, at least one LBT may be performed prior to DL and/or UL transmission. For example, in a random access procedure in FIG. 12, Msg 1 1220, Msg 2 1230, Msg 3 1240, and contention resolution 1250 may require at least one LBT before the transmission for contention based random access, e.g., at least 4 LBTs. For contention-free case, Msg 1 1220 and Msg2 1230 may require at least one LBT, e.g., at least 2 LBTs.

Figure 24:
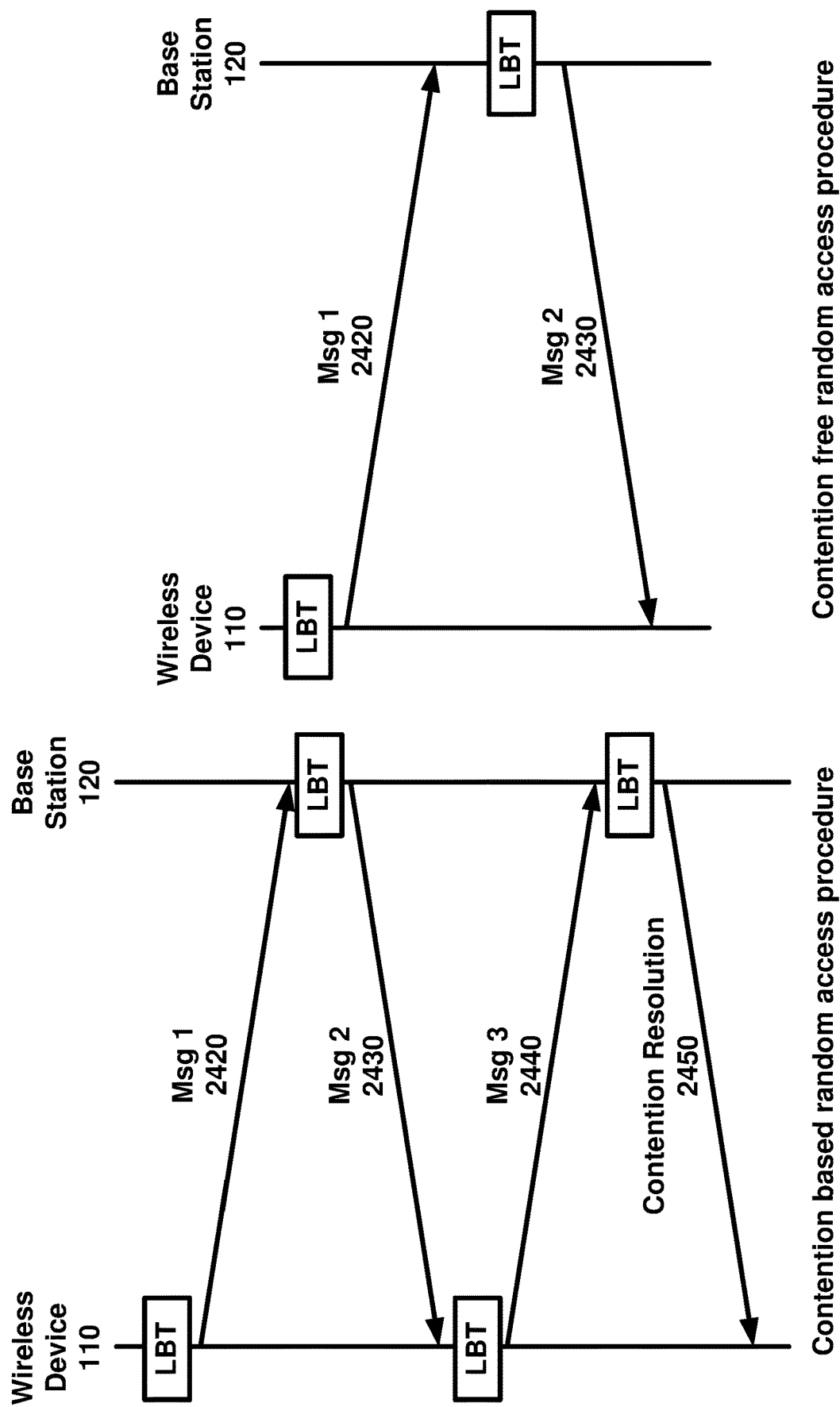
FIG. 24 is an example diagram of contention based and contention-free random access procedures with LBT as per an aspect of an embodiment of the present disclosure.

FIG. 24 is an example diagram of contention based and contention-free random access procedures with LBT. In an example, a base station and/or a wireless device may not transmit a message (e.g., Msg 1 2420, Msg 2 2430, Msg 3 2440, and contention resolution 2450) for a random access procedure if LBT is failed prior to transmitting the message, e.g., CCA in LBT determines that a channel in unlicensed band is busy (occupied by other device). In an example, a failure of LBT may result in degrading a user experience (e.g., in terms of QoS, capacity (throughput), and/or coverage). For example, a base station and/or a wireless device may wait until the channel becomes idle. This may result in a latency problem to make a radio link connection between a base station and a wireless device. For example, a failure of an LBT during a random access procedure may lead a long delay for a wireless device to receive an UL grant and/or TA value from a base station. This may result in a call drop and/or traffic congestion. For example, a failure of an LBT in a random access procedure for an SCell addition may lead a cell congestion (e.g., load imbalancing) on one or more existing cells, e.g., since an SCell may not take over traffic from the one or more existing cells in time.

In an example, there may be a need to improve an efficiency of random access procedure operating in unlicensed band, e.g., to compensate a latency/delay, and/or performance degradation, due to the LBT failure. For example, selecting two or more SSBs and performing one or more LBTs on one or more PRACH occasions associated with the two or more SSBs my increase a success rate of LBT. For example, a wireless device may measure a plurality of downlink reference signals (SSBs or CSI-RSs, if CSI-RS is configured by RRC). The wireless device may select two or more SSBs by comparing RSRPs of the plurality of downlink reference signals and a threshold. For example, the threshold may comprise rsrp-ThresholdSSB when the plurality of downlink reference signals are SSBs. For example, the threshold may comprise rsrp-Threshold-CSI-RS when the plurality of downlink reference signals are CSI-RSs. For example, the wireless device may select two or more downlink referencing signals (SSBs or CSI-RSs) whose RSRPs are higher than the threshold. For example, if SSBs are configured with the wireless device, the wireless device may determine one or more PRACH occasions associated with the selected two or more downlink reference signals, e.g., SSBs. For example, the wireless device may determine the one or more PRACH based on an association between PRACH occasions and SSBs that may be indicated by one or more RRC parameters, e.g., ra-ssb-OccasionMaskIndex. For example, if CSI-RSs are configured with the wireless device, the wireless device may determine one or more PRACH occasions associated with the selected two or more downlink reference signals, e.g., CSI-RSs. For example, the wireless device may determine the one or more PRACH based on an association between PRACH occasions and CSI-RSs that may be indicated by one or more RRC parameters, e.g., ra-OccasionList.

Figure 25:
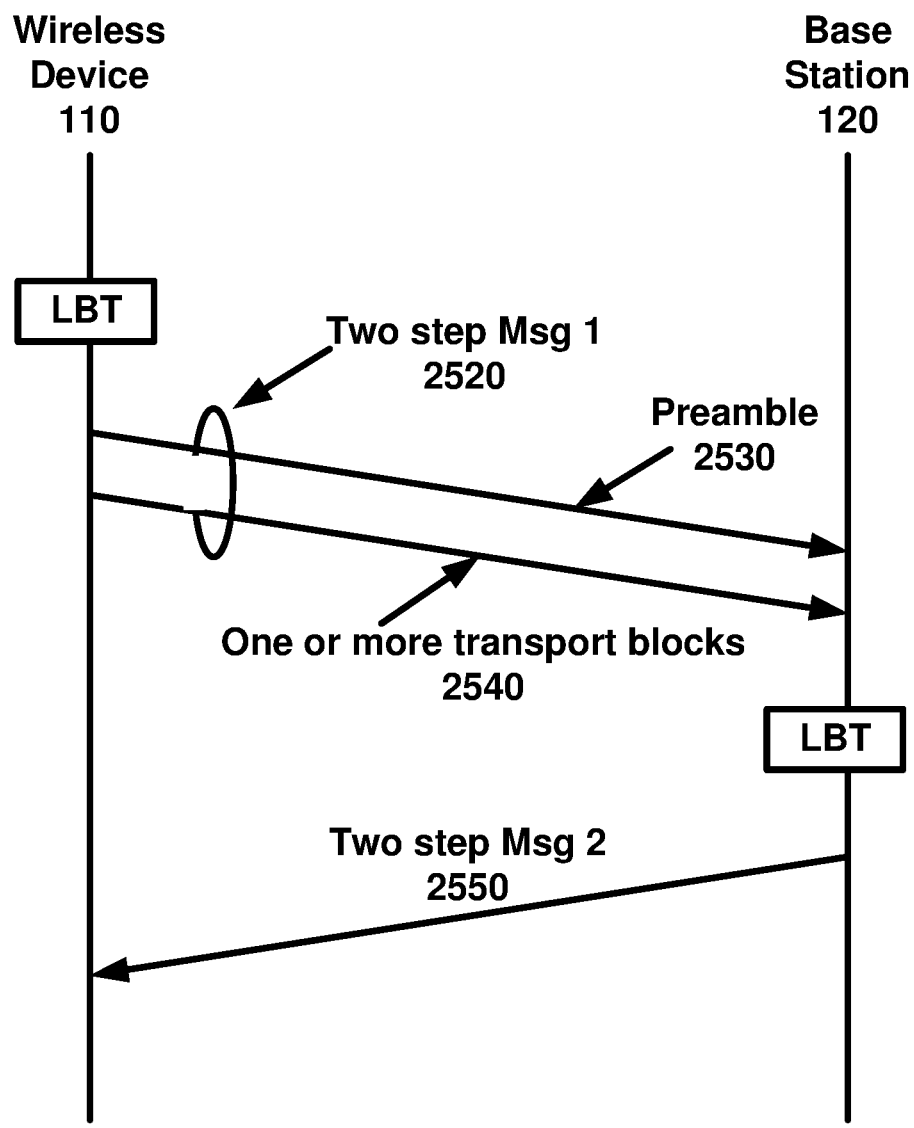
FIG. 25 is an example diagram of a two-step RA procedure with LBT as per an aspect of an embodiment of the present disclosure.

In an example, a two-step RA procedure may employ LBT in an unlicensed band. FIG. 25 is an example diagram of a two-step RA procedure with LBT. A base station and/or a wireless device may not transmit a message (e.g., two-step Msg 1 2520, preamble 2530, one or more transport blocks 2540, and/or two-step Msg 2 2550) for a random access procedure if LBT is failed prior to transmitting the message, e.g., CCA in LBT determines that a channel in unlicensed band is busy (occupied by other device). The transmissions of Preamble 2530 and for one or more transport blocks 2540 may have a same LBT and/or different LBTs.

Figure 26:
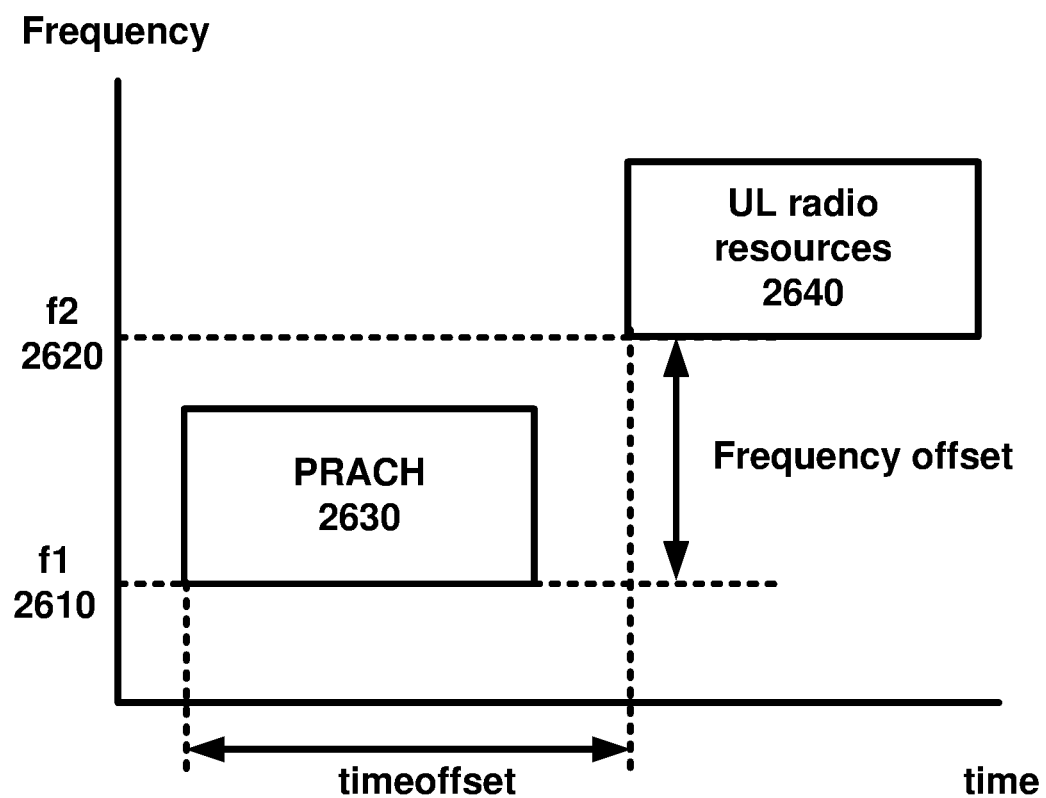
FIG. 26 is an example of radio resource allocation for a two-step RA procedure as per an aspect of an embodiment of the present disclosure.

For example, radio resources for transmissions of Preamble 2530 and/or one or more transport blocks 2540 may be configured in a same channel (or a same subband or a same BWP or a same UL carrier), where a wireless device performs an LBT for the transmissions (e.g., based on a regulation). In this case, an LBT result on the same channel (or the same subband or the same BWP or the same UL carrier) may applied for transmissions of Preamble 2530 and for one or more transport blocks 2540. For example, FIG. 26 is an example of radio resource allocation for a two-step RA procedure. If a frequency offset in FIG. 26 is zero, PRACH 2930 and UL radio resources 2940 may be time-multiplexed. If a timeoffset in FIG. 26 is zero, PRACH 2930 and UL radio resources 2940 may be frequency-multiplexed. The frequency offset in FIG. 26 may be an absolute number in terms of Hz, MHz, and GHz, and/or a relative number, e.g., one of frequency indices predefined/preconfigured. The timeoffset in FIG. 26 may be an absolute number in terms of microsecond, milli-second, or second and/or a relative number, e.g., in terms of subframe, slot, mini-slot, OFDM symbol. PRACH 2930 for transmission of preamble 2530 and UL radio resources for transmission of one or more TBs 2540 may be subject to one LBT if f1 2610 and f2 2620 are configured in the same channel (or a same subband or a same BWP or a same UL carrier). For example, in FIG. 26, one LBT before PRACH 2930 may be performed by a wireless device (e.g., based on a regulation of unlicensed band). For example, a number of LBTs may be determined based on a value of timeoffset in FIG. 26. For example, one LBT before PRACH 2930 may be performed by a wireless device if the value of timeoffset is equal to and/or less than a threshold (that may be configured and/or defined by a regulation). For example, the one LBT determines idle, a wireless device may perform a transmission of Preamble 2530 via PRACH 2930 followed by a second transmission of one or more TBs 2540 via the UL radio resources 2940 with no LBT (the transmission order may be switched if the UL radio resources 2940 is allocated before PRACH 2930 in time domain). This may be a case that PRACH and UL radio resources are allocated closely enough in time domain. For example, if the value of timeoffset is larger than the threshold, a wireless device may perform a first LBT before PRACH 2930 and perform a second LBT before Ul radio resources 2940.

A wireless may perform an LBT and apply a result (idle/busy) of the LBT to the transmission of preamble 2530 and UL radio resources for transmission of one or more TBs 2540. For example, a bandwidth of BWP and/or UL carrier, where f1 2610 and f2 2620 are configured, may be larger than a particular value (e.g., 20 MHz). For example, the bandwidth may be less than the particular value (e.g., 20 MHz). For example, a wireless device may perform the transmissions of Preamble 2530 and for one or more transport blocks 2540, for example, if the channel is idle. A transmissions of Preamble 2530 may be followed by a transmission of one or more transport blocks 2540 or vice versa. A transmissions of Preamble 2530 may be overlapped partially in time with a transmission of one or more transport blocks 2540. A wireless device may not perform the transmissions of Preamble 2530 and for one or more transport blocks 2540, for example, if the channel is busy. A wireless device may perform a particular LBT (e.g., CAT2 LBT) for a first transmission followed after or in response to a first transmission.

Figure 27:
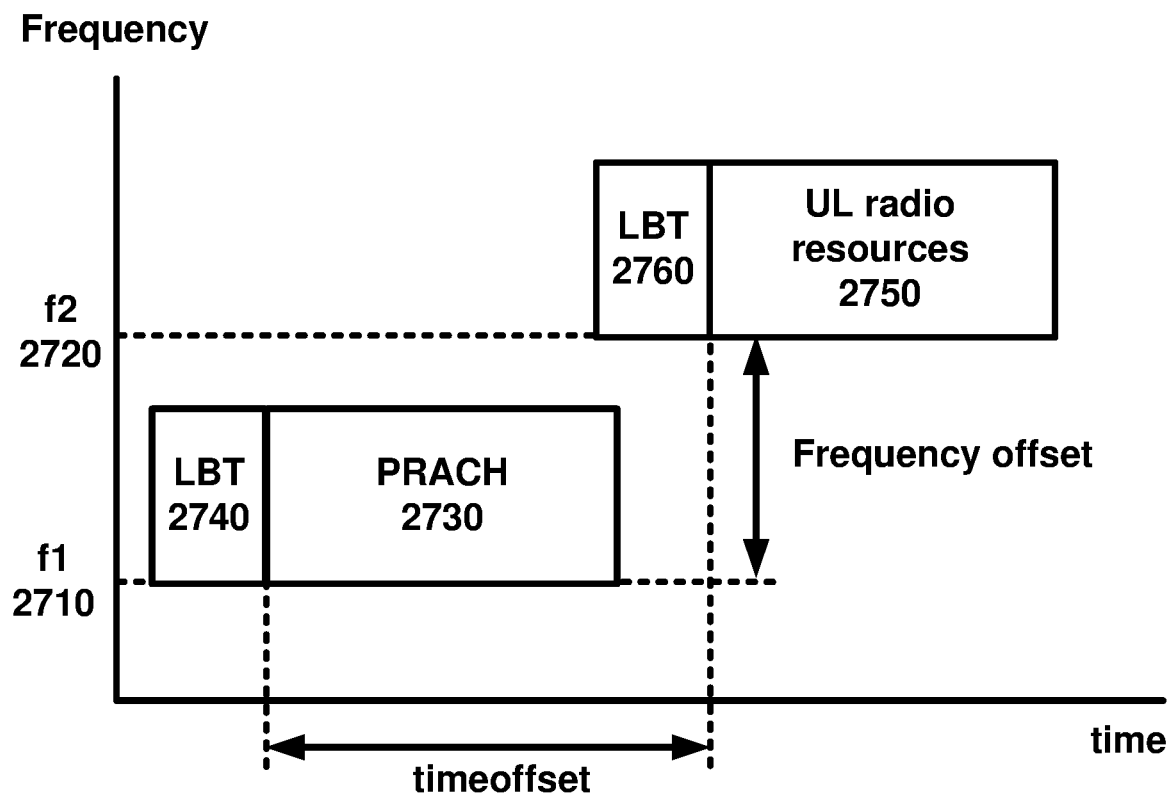
FIG. 27 is an example of one or more LBTs performed for a two-step RA procedure as per an aspect of an embodiment of the present disclosure.

For example, radio resources for transmissions of Preamble 2530 and one or more transport blocks 2540 may be configured in different channels (or different subbands or different BWPs or different UL carriers e.g., one in NUL and the other one in SUL) that may require separate LBTs. For example, a wireless device may perform an LBT per one or more channels, per one or more subbands, per one or more BWPs, and/or per one or more UL carriers. FIG. 27 is an example of one or more LBTs performed for a two-step RA procedure. In some cases, UL radio resources 2750 may be allocated before or aligned with PRACH 2730 in time. A wireless device may perform a first LBT (e.g., LBT 2740 in FIG. 27) before a first transmission of preamble 2530 (e.g., via PRACH 2730) and perform a second LBT (e.g., LBT 2760 in FIG. 27) before a second transmission of one or more transport blocks 2540 (e.g., via UL radio resources 2750). Depending on results of the first LBT and the second LBT, a wireless device may perform none of, one of, or both of the first transmission and the second transmission.

For example, the first transmission may be performed when a first result of the first LBT is idle. The second transmission may be independent of the first result. For example, the second transmission may be performed when a second result of the second LBT is idle. In this case, there may be a case that a wireless device may transmit Preamble 2530 in response to the first LBT being idle and may not be able to transmit one or more transport blocks 2540 in response to the second LBT being busy. For example, a wireless device may not transmit Preamble 2530 in response to the first LBT being busy and may transmit one or more transport blocks 2540 in response to the second LBT being idle. In a two-step RA procedure, one or more transport blocks may comprise an identifier of the wireless device so that a base station may identify which wireless device transmit the one or more transport blocks. The identity may be configured by the base station and/or may be at least a portion of wireless device-specific information, e.g., resume ID, DMRS sequence/index, IMSI, etc. If a wireless device transmits one or more TBs with no Preamble 2530 (e.g., when a channel, e.g. PRACH 2730 is busy), a base station may identify the wireless device based on the identity in the one or more TBs.

In a two-step RA procedure configured in an unlicensed band, the separate LBTs for transmissions of Preamble and one or more TBs may be performed in one or more cases. For example, a base station may configure a wireless device with the separate LBTs for a wideband operation (e.g., for a case that a bandwidth may be larger than 20 MHz). In the wideband operation, a base station may configure a wireless device with a wideband comprising one or more subbands and/or one or more BWPs. Some of the one or more subbands may be overlapped to each other at least a portion in frequency domain. Some of the one or more subbands may not be overlapped to each other at least a portion in frequency domain. Some of the one or more BWPs may be overlapped to each other at least a portion in frequency domain. Some of the one or more BWPs may not be overlapped to each other at least a portion in frequency domain. In a wideband operation, if two radio resources are allocated with a space larger than a threshold (e.g., 20 MHz) in frequency domain, separate LBTs may be required for transmissions via the two radio resources. For example, a wideband may comprise one or more subbands, and two radio resources may be allocated in different subbands. In this case, a first transmission scheduled in a first subband requires a first LBT, and a second transmission scheduled in a second subband requires an second LBT. The first LBT and the second LBT may be independent of each other.

For example, UL radio resources for transmission of one or more TBs 2540 may be subject to a first LBT (e.g., LBT 2760) and be independent of a second LBT (e.g., LBT 2740) for transmission of Preamble 2530. For example, PRACH 2730 for transmission of Preamble 2530 may be subject to a second LBT (e.g., LBT 2760) and be independent of a first LBT (e.g., LBT 2760) for transmission of one or more TBs 2540. For example, if f1 2610 and f2 2620 are configured in different channels (or different subbands or different BWPs or different UL carriers), a wireless device may perform separate LBTs for a first transmissions of Preamble 2530 and a second transmission of one or more transport blocks 2540.

Figure 28A:
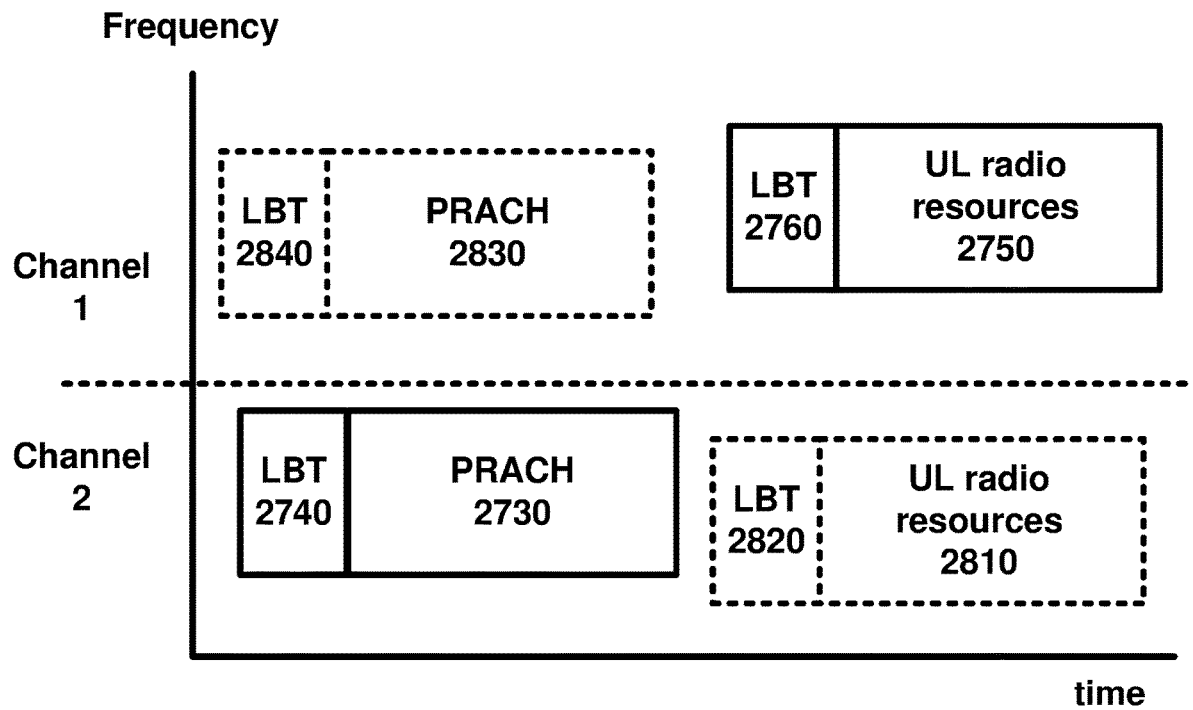
FIG. 28A and FIG. 28B are examples of one or more LBTs performed for a two-step RA procedure in an unlicensed band as per an aspect of an embodiment of the present disclosure.
Figure 28B:
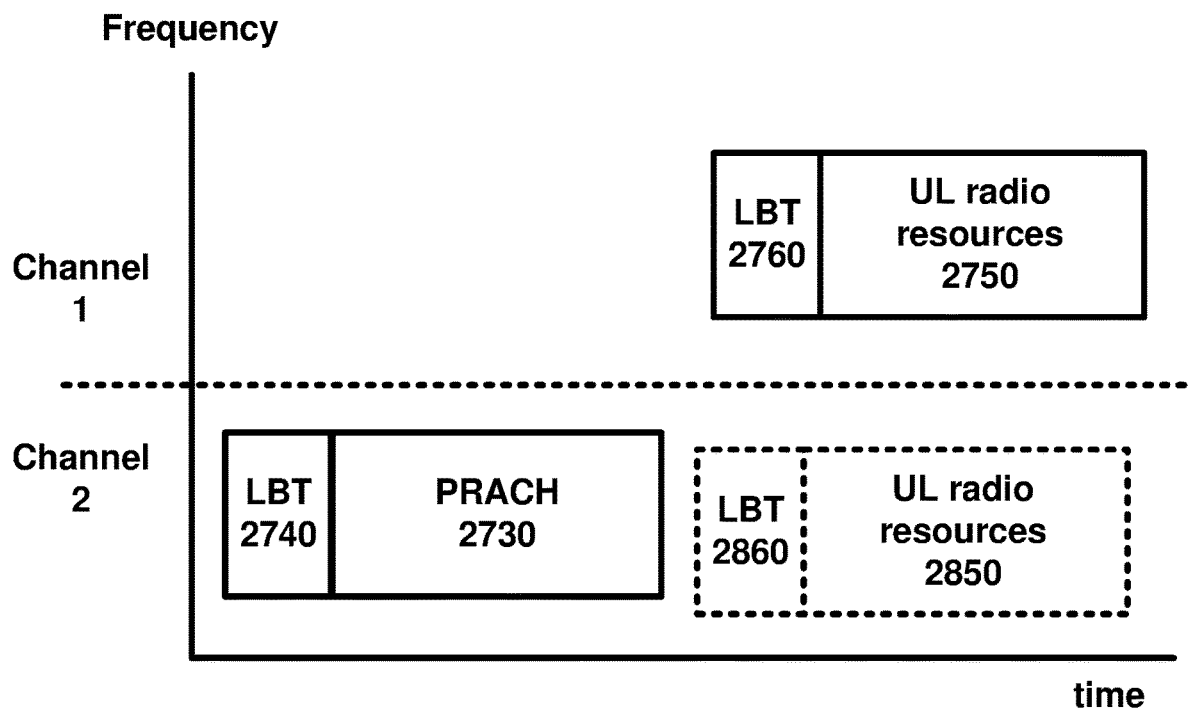

For example, FIG. 28A and FIG. 28B are examples of one or more LBTs performed for a two-step RA procedure in an unlicensed band. The resource allocation and the separate LBTs in FIG. 27 may be resulted from FIG. 28A and/or FIG. 28B. For example, a base station may configure a wireless device with one or more PRACH and one or more UL radio resources in different channels (BWPs and/or UL carriers). The wireless device may one or more first opportunities to transmit preambles and one or more second opportunities to transmit one or more TBs. For example, in FIG. 28A, a wireless device may have two opportunities in PRACH 2830 and PRACH 2730 for preamble transmission. Depending on LBT results, a wireless device may select one of two opportunities. For example, a wireless device may perform a first LBT (e.g., LBT 2840) and a second LBT (e.g., LBT 2740 in FIG. 28A). If the results of the first and second LBTs are idle, a wireless device may select one of PRACH associated either a first LBT or a second LBT (e.g., based on random selection). If one of LBT result is idle and the other of LBT result is busy, a wireless device may select PRACH associated with the LBT being idle for preamble transmission. If the first and second LBTs are busy, a wireless device may not transmit a preamble and may perform one or more LBTs for one or more TB transmissions.

A wireless device may have one or more opportunities for transmission of one or more TBs via UL radio resources (e.g., in a similar way that a wireless device has for preamble transmission above). For example, the one or more opportunities for transmission of one or more TBs may be independent of one or more opportunities for transmission of preamble. For example, if a wireless device does not transmit a preamble due to a result (busy) of LBT, the wireless device may perform one or more LBTs to gain access to a channel to transmit one or more TBs. For example, in FIG. 28A, a wireless device may have a first LBT (e.g., LBT 2820) followed by a first transmission opportunity of one or more TBs via first UL radio resources 2810 and a second LBT (e.g., LBT 2760 in FIG. 28A) followed by a second transmission opportunity of one or more TBs via second UL radio resources 2750. Depending on LBT results, a wireless device may select one of opportunities. For example, in FIG. 28A, if LBT 2820 is busy but LBT 2760 is idle, a wireless device may transmit one or more TBs via UL radio resources 2750. If one or more LBTs (e.g., LBT 2740 and LBT 2840 in FIG. 28A) to gain access for transmitting a preamble are busy, a wireless device may not transmit any preamble. In this case, a wireless device may perform one or more second LBTs (e.g., LBT 2820 and LBT 2760 in FIG. 28A) for transmission of one or more TBs.

For example, before a wireless device initiates a two-step RA procedure, the wireless device may receive, from a base station, control message(s) (e.g., RRC and/or PDCCH) indicating one or more associations between PRACH and UL radio resources. The associations may be one-to-one, multi-to-one, one-to-multi, and/or multi-to-multi between one or more PRACHs and one or more UL radio resources. Based on the associations, a wireless device may determine which UL radio resources and/or which PRACH need to be selected. For example, in FIG. 28A, the associations may indicate one-to-multi association from PRACH 2730 to UL radio resources 2750 and UL radio resources 2810. For example, the associations may indicate one-to-one association from PRACH 2830 to UL radio resources 2750. In this case, a wireless device may perform one or more LBTs (depending on a regulation and/or resource allocation whether they are in the same channel) for transmission of one or more TBs depending on a selection of PRACH. For example, in FIG. 28A, a wireless device may perform two LBTs (LBT 2740 and LBT 2840). If LBT 2740 may be idle but LBT 2840 may be busy, a wireless device transmits a preamble via PRACH 2730. The wireless device may choose one or more candidate UL radio resources based on a configured association of PRACH 2730, which may be one-to-multi from PRACH 2730 to UL radio resources 2750 and UL radio resources 2810. The wireless device may perform LBT 2820 and LBT 2760 based on the configured association. Depending on the results of the LBTs, a wireless device may transmit one or more TBs. FIG. 28B is an example of a two-step RA procedure. In this case, UL radio resources is associated with one PRACH. For example, a base station configured an association from PRACH 2730 to UL radio resource 2750 and UL radio resources 2850.

The PRACH and/or Ul radio resources in FIG. 26, FIG. 27, FIG. 28A, and/or FIG. 28B may be associated with at least one reference signal configuration (SSB, CSI-RS, DM-RS). A base station may transmit at least one control message to a wireless device to indicate such an association. If the base station transmits a plurality of reference signals, a configuration of each reference signal has an association with at least one PRACH, that may be configured by RRC and/or PDCCH. In downlink channel, there may be a plurality of PRACHs and a plurality of UL radio resources associated with the plurality of PRACHs.

In an example, a failure of LBT may result in degrading a user experience (e.g., in terms of QoS, capacity (throughput), and/or coverage). For example, a base station and/or a wireless device may wait until the channel becomes idle. This may result in a latency problem to make a radio link connection between a base station and a wireless device. For example, a failure of an LBT during a random access procedure may lead a long delay for a wireless device to receive an UL grant and/or TA value from a base station. This may result in a call drop and/or traffic congestion. For example, a failure of an LBT in a random access procedure for an SCell addition may lead a cell congestion (e.g., load imbalancing) on one or more existing cells, e.g., since an SCell may not take over traffic from the one or more existing cells in time.

In an example, there may be a need to improve an efficiency of random access procedure operating in unlicensed band, e.g., to compensate a latency/delay, and/or performance degradation, due to the LBT failure. For example, selecting two or more SSBs and performing one or more LBTs on one or more PRACH occasions associated with the two or more SSBs my increase a success rate of LBT. For example, a wireless device may measure a plurality of downlink reference signals (SSBs or CSI-RSs, if CSI-RS is configured by RRC). The wireless device may select two or more SSBs by comparing RSRPs of the plurality of downlink reference signals and a threshold. For example, the threshold may comprise rsrp-ThresholdSSB when the plurality of downlink reference signals are SSBs. For example, the threshold may comprise rsrp-Threshold-CSI-RS when the plurality of downlink reference signals are CSI-RSs. For example, the wireless device may select two or more downlink referencing signals (SSBs or CSI-RSs) whose RSRPs are higher than the threshold. For example, if SSBs are configured with the wireless device, the wireless device may determine one or more PRACH occasions associated with the selected two or more downlink reference signals, e.g., SSBs. For example, the wireless device may determine the one or more PRACH based on an association between PRACH occasions and SSBs that may be indicated by one or more RRC parameters, e.g., ra-ssb-OccasionMaskIndex. For example, if CSI-RSs are configured with the wireless device, the wireless device may determine one or more PRACH occasions associated with the selected two or more downlink reference signals, e.g., CSI-RSs. For example, the wireless device may determine the one or more PRACH based on an association between PRACH occasions and CSI-RSs that may be indicated by one or more RRC parameters, e.g., ra-OccasionList.

Figure 29:
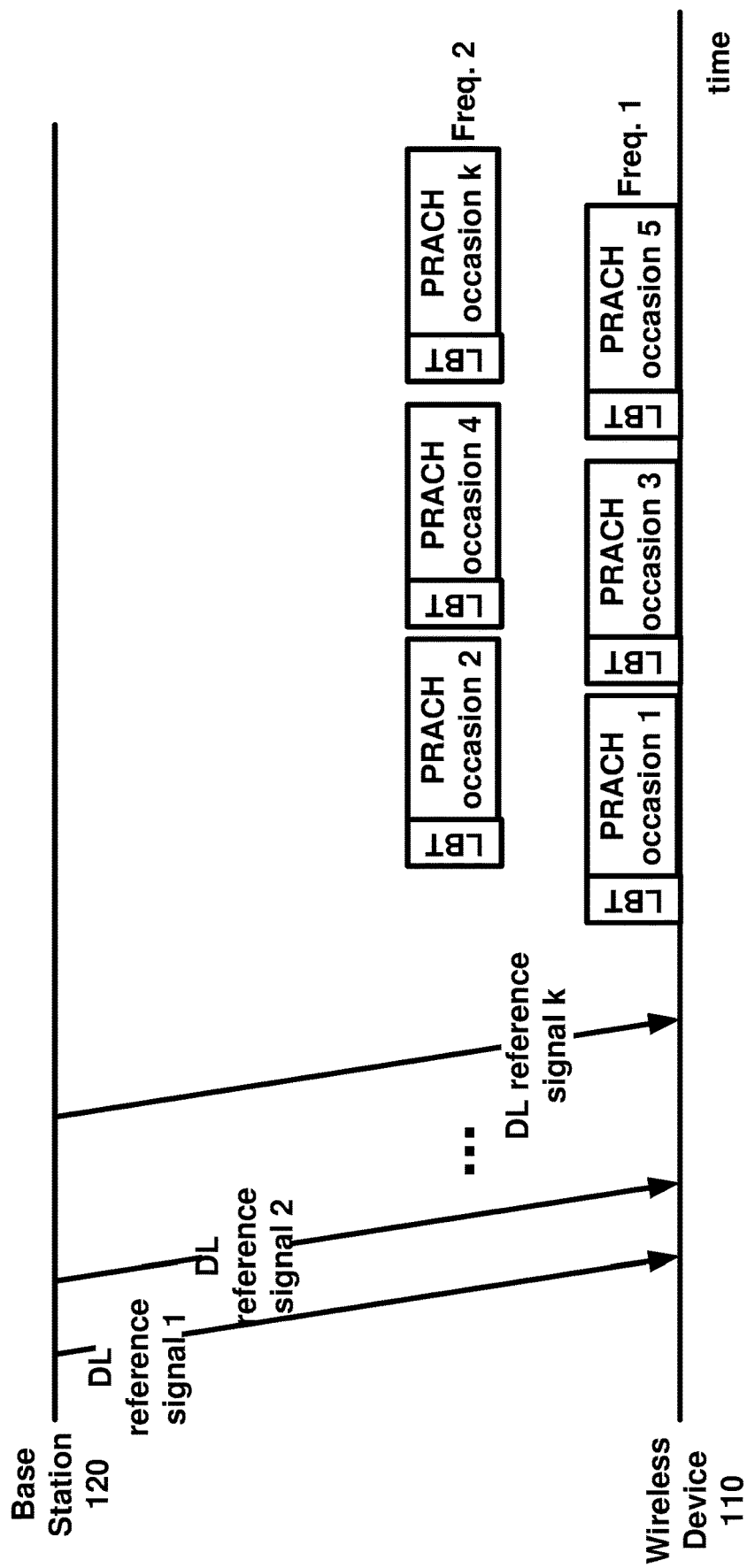
FIG. 29 is an example of one or more PRACH occasion configurations as per an aspect of an embodiment of the present disclosure.

FIG. 29 is an example of an association between DL reference signals and PRACH occasions. For example, the association may be one-to-one mapping, multi-to-one mapping between DL reference signals and PRACH occasions. For example, in FIG. 29, a wireless device measures k DL reference signals, and select DL reference signal 1, DL reference signal 2, and DL reference signal 3. For example, if PRACH occasion 1, PRACH occasion 2, and PRACH occasion 3 are associated with DL reference signal 1, DL reference signal 2, and DL reference signal 3, respectively, the wireless device may perform at most 3 LBTs, each LBT is performed prior to each of selected PRACH occasions. For example, a type of LBT may be pre-defined and/or semi-statically by a base station. For example, a base station may indicate a type of LBT of PRACH occasions in a RACH configuration. The type may be one of CAT 1, CAT 2, CAT 3, CAT 4 (or long LBT and/or short LBT).

For example, if an LBT succeed (channel is idle) in a first PRACH occasion, a wireless device may transmit one or more preambles via the first PRACH occasion and may not perform one or more LBTs in other PRACH occasions that may be available after the first PRACH occasions in the same PRACH burst. The wireless device may select a PRACH occasion based on a DL reference signal that the wireless device selects. The DL reference signal may be selected based on a measured received signal, random selection, etc. The wireless device may selection one or more DL reference signals thereby select one or more PRACH occasions associated with the one or more DL reference signals. For example, if a wireless device selects PRACH occasion 1, PRACH occasion 3, and LBT on PRACH occasion 1 is successful, the wireless device may not perform another LBT on PRACH occasion 3. For example, if a wireless device selects all PRACH occasions in Freq.1 in FIG. 29, the wireless device may perform one or more LBTs prior to each of PRACH occasions in Freq. 1 until an LBT is successful. In response to the LBT being successful, the wireless device may transmit one or more preambles associated with a PRACH occasion where the LBT was successful. The wireless device may transmit one or more preambles via one or more PRACH occasions selected based on one or more DL reference signals associated with the one or more PRACH occasions.

For example, if one or more PRACH occasions are FDMed, e.g., PRACH occasion1 and PRACH occasion 2 in FIG. 29, a wireless device may perform one LBT for the one or more PRACH occasions FDMed, which may be firstly available and/or may be randomly selected. For example, a wireless device may, based on RSRPs of DL reference signals, select PRACH occasion 1 and PRACH occasion 2 FDMed. In this case, the wireless device may perform LBTs on PRACH occasion 1 and PRACH occasion 2. If both LBTs are successful, the wireless device may randomly select one of them. For example, if both LBTs are successful, the wireless device may select one available first in time domain. For example, if both LBTs are successful, the wireless device may select one whose corresponding DL reference signal's RSRP is higher than the others. For example, PRACH occasion 1 and PRACH occasion 2 are FDMed within a threshold (less than a bandwidth threshold), the wireless device may perform a wideband LBT that may cover frequency range of PRACH occasion 1 and PRACH occasion2. In this case if the wideband LBT is successful, the wireless device may select one of PRACH occasions based on a random selection, time location of PRACH occasions, and/or RSRPs of corresponding DL reference signals as described in this paragraph.

For example, a wireless device may perform a long LBT on a first PRACH occasion firstly available and perform a short LBT on a second PRACH occasion followed by the first PRACH occasion if the LBT on the first PRACH occasion is failed, e.g., long LBT for PRACH occasion 1 and short LBT for PRACH occasion 3 in FIG. 29. For example, a type of LBT on the second PRACH occasion may be configured by a base station. For example, a type of LBT on the second PRACH occasion may be determined by a time difference of two PRACH occasions. For example, the first PRACH occasion and the second PRACH occasion has a guard time less than a threshold (configurable or pre-defined, e.g., 25 us,or 16 us), the wireless device may perform a short LBT on the second PRACH occasion, otherwise perform a long LBT.

For example, based on RSRPs of DL reference signals, a wireless device may select two or more PRACH occasions. For example, FIG. 29, a wireless device may select PRACH occasion 1, PRACH occasion 2, PRACH occasion 3. Then the wireless device may perform a first LBT on a first PRACH occasion available firstly in time, e.g., PRACH occasion1. The wireless device may determine a second LBT on a second PRACH occasion in response to the first LBT. For example, if the first LBT was successful, the wireless device may transmit a preamble via the first PRACH occasion. If the first LBT was not successful, the wireless device may determine to perform a second LBT on a second PRACH occasion available firstly after the first PRACH occasion, e.g., PRACH occasion 2. A third LBT on a third RACH occasion may be performed if the second LBT on the second PRACH occasion is failed. For example, the one or more FDMed PRACH occasions are configured within a guard time less than a threshold, the wireless device may perform a wideband LBT, LBTs on all of the one or more FDMed PRACH occasions.

In an example, a wireless device may transmit a plurality of preambles via a plurality of PRACH occasions. In an example, FIG. 29 is an example of one or more PRACH occasion configurations. For example, on Freq 1 in FIG. 29, PRACH occasions may be TDMed with a guard time (e.g., a time difference). In this case, a wireless device may perform an LBT in each PRACH occasions in Freq 1 for multiple preamble transmissions. For example, depending on the guard time between two PRACH occasions, a wireless device may perform a long LBT and/or short LBT. For example, if the guard time (time difference) is less than a threshold (25 us or 16 us), a wireless device may perform a short LBT (or no LBT) on a PRACH occasion available later than the other, otherwise the wireless device may perform long LBT. The type of LBT in each PRACH occasion may be configured by an RRC. The type of LBT in each PRACH occasion may be determined by a wireless device by comparing with a guard time between PRACH occasions and the threshold.

Figure 30:
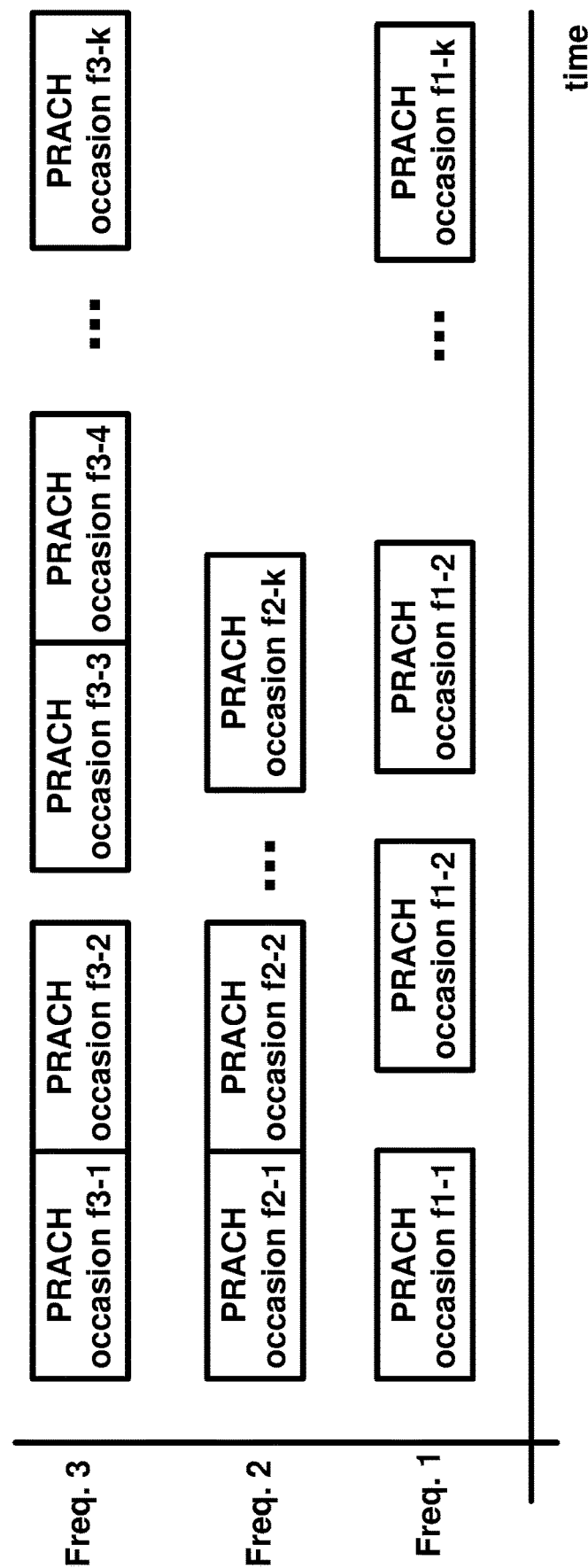
FIG. 30 is an example of one or more PRACH occasion configurations as per an aspect of an embodiment of the present disclosure.

For example, on Freq 2 in FIG. 29, one or more PRACH occasions may be TDMed without a guard time (or with a guard time less than a threshold). In this case, a wireless device may perform an LBT on the first PRACH occasion occurs firstly among the selected PRACH occasions in Freq 2. For the subsequent PRACH occasions followed by the first PRACH occasion in Freq 2, a wireless device may not perform an LBT if the LBT on the first PRACH occasion was successful. In an example, the LBT on the first PRACH occasion may be a long LBT. An LBT on the subsequent PRACH occasions may be a short LBT if the LBT on the first PRACH occasion was successful. If the selected PRACH occasions are not contiguous in time, a wireless device may perform a long LBT or a short LBT. For example, a type of LBT is configured by a base station or determined based on a time difference of the selected PRACH occasions non-contiguous. For example, on Freq 3 in FIG. 30, one or more PRACH occasions may be grouped without a guard time. For example, there may be a guard time between two groups as shown in PRACH occasion f3-2 and PRACH occasion f3-3 in FIG. 30. Similar mechanism determining an LBT in Freq. 2 and Freq.1 may be applied to the grouped PRACH occasions in other frequency bands.

In an unlicensed spectrum, one or more uplink and/or downlink transmissions may be blocked by an LBT. For example, a wireless device and/or a base station may not transmit any message transmission in a four-step random access procedure and/or two-step random access procedure if a channel is busy (occupied by other device(s)).

For example, a wireless device may transmit at least one preamble to a base station on an unlicensed spectrum. For example, a wireless device may perform one or more LBTs (e.g., for example preamble transmissions from FIG. 24 to FIG. 30). The wireless device may transmit at least one preamble to a base station when the uplink random access channel is idle on an unlicensed spectrum. At a base station side, a base station may receive at least one preamble that a wireless device transmits. The base station may perform one or more LBTs to transmit at least one random access response corresponding to the at least one preamble. The base station may perform a second LBT with a certain period of time (e.g., backoff) if a channel is identified as busy based on a first LBT (that performed earlier than the second LBT).

There may be a random access response window where a wireless device may monitors a downlink control channel for a random access response transmitted from a base station as a response to a preamble transmitted by the wireless device. For example, a base station may transmit a message comprising a value of an RAR window. For example, a message comprising a random access configuration parameters (e.g., RACH-ConfigGeneric) may indicates a value of an RAR window (e.g., ra-ResponseWindow in RACH-ConfigGeneric). For example, the value of an RAR window may be fixed, for example, to 10 ms or other time value. For example, the value of an RAR window may be defined in terms of a number of slots as shown in RACH-ConfigGeneric. Based on the number of slots and a numerology configured for a random access procedure, a wireless device may determine a size of an RAR window. For example, in RACH-ConfigGeneric, s110, s120, s140, and s180 may be values of ra-ResponseWindow for numerologies $\mu=0$, $\mu=1$, $\mu=2$, and $\mu=3$ in FIG. 31, respectively. The parameters in each numerology may be limited to the case in FIG. 31. For example, the parameters in each numerology may be pre-defined with different subcarrier spacing, slot duration, and/or cyclic prefix size.

A wireless device may perform one or more retransmission of one or more preambles during a random access procedure. There may be one or more conditions at least based on which the wireless device determines the one or more retransmission of one or more preambles. For example, the wireless device determines the one or more retransmission of one or more preambles when the wireless device determines that a random access response reception is not successful. The wireless device may determine that a random access response reception is not successful, for example, if at least one random access response comprising one or more random access preamble identifiers that matches the transmitted PREAMBLE_INDEX has not been received until an RAR window (e.g., ra-ResponseWindow configured in RACH-ConfigCommon) expires. The wireless device may determine that a random access response reception is not successful, for example, if a PDCCH addressed to the C-RNTI has not been received on the Serving Cell where the preamble was transmitted until a RAR window for a beam failure recovery procedure (e.g., ra-ResponseWindow configured in BeamFailureRecoveryConfig) expires.

For example, a wireless device determines the one or more retransmission of one or more preambles when the wireless device determines that a contention resolution is not successful. A MAC entity of the wireless device may start a contention resolution timer (e.g., ra-ContentionResolution-Timer) and may restart the contention resolution timer (e.g., ra-ContentionResolutionTimer) at each HARQ retransmission in the first symbol after the end of a Msg3 transmission, for example, once a wireless device transmits, to a base station, Msg3. The wireless device may monitor a PDCCH while the contention resolution timer (e.g., ra-Contention-ResolutionTimer) is running, e.g., for example, regardless of the possible occurrence of a measurement gap. A wireless device may stop the contention resolution timer and determine that a contention resolution is successful, for example, if a notification of a reception of a PDCCH transmission of a cell (e.g., SpCell) is received from lower layers, and the wireless device identifies that the PDCCH transmission is an indication of a contention resolution corresponding to a Msg3 transmission (or MsgB transmission) that the wireless device performed.

A wireless device may determine one or more retransmission of one or more preambles, for example, if the wireless device determines that a contention resolution is not successful. A wireless device may determine that a contention resolution is not successful, for example, if the wireless device does not receive an indication of a contention resolution while a contention resolution timer (e.g., ra-ContentionResolutionTimer) is running. For example, the wireless device may determine that a contention resolution is not successful, for example, if the contention resolution timer (e.g., ra-ContentionResolutionTimer) expires. The wireless device may discard a TEMPORARY_C-RNTI indicated by an RAR in response to an expiry of the contention resolution timer (and/or in response to the contention resolution being unsuccessful).

For a two-step RA procedure, a wireless device may determine one or more retransmission of one or more preambles, for example, if the wireless device may not receive MsgB corresponding to MsgA, for example, during a window configured to monitor MsgB in one or more DL control channels. A wireless device performing a two-step RA procedure may receive a response (e.g., MsgB) indicating a fallback to a four-step RA procedure. In this case, the wireless device may start a timer (e.g., ra-ContentionResolutionTimer) in response to transmitting one or more TBs (e.g., Msg3) to a base station. The wireless device may determine one or more retransmission of one or more preambles, for example, if the timer (e.g., ra-ContentionResolutionTimer).

A wireless device may increment a counter counting a number of preamble transmissions (e.g., PREAMBLE_TRANSMISSION_COUNTER) by 1 in response to a random access response reception being unsuccessful and/or in response to a contention resolution being unsuccessful. The wireless device may determine that a random access procedure is unsuccessfully completed and/or a MAC entity of the wireless device may indicate a random access problem to upper layer(s), for example, if the number of preamble transmissions may reach a threshold, (e.g., if PREAMBLE_TRANSMISSION_COUNTER=preambleTransMax+1). The wireless device may determine that a random access procedure is not completed (and/or one or more retransmission of one or more preambles), for example, if the number of preamble transmissions may not reach a threshold, (e.g., if PREAMBLE_TRANSMISSION_COUNTER<preambleTransMax+1).

A wireless device may delay a particular period of time (e.g., a backoff time) for performing a retransmission of one or more preamble. For example, the wireless device may set the backoff time to 0 ms, for example, when a random access procedure is initiated. The wireless device may set (or update) the backoff time based on the PREAMBLE_BACKOFF determined by a value in a BI field of the MAC subPDU (e.g., BI field in FIG. 19B). For example, the wireless device may set the PREAMBLE_BACKOFF to value of the BI field of the MAC subPDU using a predefined table. FIG. 32 is an example of backoff parameter values. For example, if the wireless device receives BI indicating index 3 (or 0010 in a bit string) in the table of FIG. 32, the wireless device may set the PREAMBLE_BACKOFF to 30 ms. The wireless device may set the PREAMBLE_BACKOFF to value of the BI field of the MAC subPDU multiplied with SCALING_FACTOR_BI (e.g., a scaling factor) if a base station configures the wireless device with scalingFactorBI by one or more RRC messages. The wireless device may set (or update) the PREAMBLE_BACKOFF based on a BI field, for example, if a downlink assignment has been received on the PDCCH for the RA-RNTI and the received TB is successfully decoded, and/or if the Random Access Response comprises a MAC subPDU with Backoff Indicator (BI in FIG. 19B). The wireless device may set the PREAMBLE_BACKOFF to 0 ms, for example, if a downlink assignment has not been received on the PDCCH for the RA-RNTI and/or the received TB is not successfully decoded, and/or if the Random Access Response does not comprise a MAC subPDU with Backoff Indicator (BI in FIG. 19B).

A wireless device may determine a backoff time based on the PREAMBLE_BACKOFF. For example, the wireless device may determine the backoff time, for example, if the wireless device determines that a random access response is not successful and/or a contention resolution is not successful. The wireless device may employ a particular selection mechanism to determine the backoff time. For example, the wireless device may determine the backoff time based on a uniform distribution between 0 and the PREAMBLE_BACKOFF. The wireless device may employ any type of distribution to select the backoff time based on the PREAMBLE_BACKOFF. The wireless device may ignore the PREAMBLE_BACKOFF (e.g., a value in BI field in FIG. 19B) and/or may not have a backoff time. For example, the wireless device may determine whether to apply the backoff time to a retransmission of at least one preamble based on an event type initiating the random access procedure (e.g., Beam Failure Recovery request, handover, etc.) and/or a type of the random access procedure (e.g., four-step or two-step RA and/or CBRA or CFRA). For example, the wireless device may apply the backoff time to the retransmission, for example, if the random access procedure is CBRA (e.g., where a preamble is selected by a MAC entity of the wireless device) and/or if the wireless device determines that a random access procedure is not completed based on a random access response reception being unsuccessful. For example, the wireless device may apply the backoff time to the retransmission, for example, if the wireless device determines that a random access procedure is not completed based on a contention resolution being unsuccessful.

A wireless device may perform a random access resource selection procedure (e.g., select at least one SSB or CSI-RS and/or select PRACH corresponding to at least one SSB or CSI-RS selected by the wireless device), for example, if the random access procedure is not completed. The wireless device may delay the subsequent random access preamble transmission (e.g., or delay to perform a random access resource selection procedure) by the backoff time.

A radio access technology may allow a wireless device to change (switch) a channel (a BWP, and/or a subband) to transmit at least one preamble for a retransmission. This may increase a number of preamble transmission opportunities. For example, a base station may transmit, to a wireless device, one or more messages (broadcast messages, and/or RRC messages) indicating a configuration of the one or more channels (e.g., BWPs and/or subbands) that one or more PRACH are configured. A wireless device may select one of the one or more channels (e.g., BWPs, and/or subbands) as a channel (e.g., a BWP and/or a subband) to transmit at least one first preamble. The wireless device may select the channel (e.g., BWP and/or subband) based on an LBT result. For example, the wireless device performs one or more LBTs on one or more channels, and select the channel among the channel(s) being sensed as idle. The wireless device may select the one of channels being sensed as idle based on, for example, a random selection.

The channel may be defined based on a BWP configuration and/or a subband configuration. For example, a base station may configure a wireless device with one or more initial DL and/or UL BWP. A configuration of each of the one or more initial DL and/or UL BWPs may comprise BWP-DownlinkDedicated (e.g., for initial DL BWP) and/or BWP-UplinkDedicated (e.g., for initial UL BWP) configuration that may indicate at least one of following: subcarrier spacing, cyclic prefix, location and a bandwidth of the each of the one or more initial DL and/or UL BWPs, DL control channel configuration, DL shared channel configuration, rach-configuration (e.g., rach-ConfigCommon and/or rach-ConfigDedicated), UL control configuration, and/or UL shared channel configuration.

For example, one of (initial) UL BWP(s) may be associated with at least one of (initial) DL BWP(s). The association may be indicated by configuration parameter(s) in the one or more messages transmitted by the base station and/or predefined. For example, the association may be made, for example, by an (initial) UL BWP configuration (or an (initial) DL BWP configuration) may comprise a DL BWP index (resp. a UL BWP index) of one of one or more DL BWPs (resp. one of one or more UL BWPs). The association may be made by a predefined rule and/or table. For example, an (initial) UL BWP may have an association with an (initial) DL BWP that has a same BWP index (e.g., UL BWP #0 with DL BWP #0, UL BWP #1 with DL BWP #1, and so on). For example, a wireless device may monitor, for a random access response, a control channel based on the association. For example, a wireless device may monitor, for a random access response, a control channel of an (initial) DL BWP associated with an (initial) UL BWP where the wireless device transmits at least one preamble. For example, a wireless device may monitor, for a contention resolution, a control channel of an (initial) DL BWP associated with an (initial) UL BWP where the wireless device transmits Msg3.

For example, a wireless device may receive, from a base station, an RRC message indicating the association between one of (initial) UL BWP(s) and least one of (initial) DL BWP(s). For example, a serving cell configuration (e.g., ServingCellConfigCommon or ServingCellConfigCommonSIB) in the RRC message may indicate a BWP configuration (e.g., DownlinkConfigCommon or DownlinkConfigCommonSIB for initial DL BWP and/or UplinkConfigCommonSIB for initial uplink BWP) for a random access procedure. For example, there may be one or more DL/UL BWP pairs, each pair may comprise at least one (initial) DL BWP configuration and one or more (initial) UL BWP configuration. For example, one (initial) DL BWP configuration and one or more (initial) UL BWP configuration may be paired. The RRC message (and/or the one (initial) DL BWP configuration and/or the serving cell configuration) may comprise parameters indicating one or more transmissions of one or more SSBs (or CSI-RSs). For example, the one or more SSBs may be configured per a BWP (e.g., via the one (initial) DL BWP configuration) and/or per a cell (e.g., via the serving cell configuration). One or more PRACH resources configured in the one or more (initial) UL BWP configuration may be associated with the one or more SSBs. A wireless device may switch (change, and/or select) a UL BWP for a preamble retransmission among the one or more UL BWP associated with the one (initial) DL BWP configuration, for example, if the wireless device selects one of the one or more SSBs. A wireless device may select PRACH resource(s) configured in one or more (initial) UL BWPs associated with one or more one or more (initial) DL BWPs. For example, the wireless device may select PRACH resource(s) configured in one or more (initial) UL BWPs associated with one or more one or more (initial) DL BWPs, for example, if A wireless device may select one or more SSBs from the one or more (initial) DL BWPs.

In an unlicensed band, a wireless device and/or a base station may perform an LBT before transmitting each message (e.g., Msg1, Msg2, Msg3, Msg4, MsgA, and/or MsgB). Each message may subject to an LBT failure that may cause a random access delay/latency. A large delay/latency during a random access procedure may result in failing to meet a control plane requirement. Increasing transmission opportunities configured over a frequency domain (e.g., over one or more channels, BWPs and/or subbands) may enhance the random access procedure (e.g., improve the random access delay/latency caused by an LBT failure in an unlicensed band).

For example, a base station may configure a wireless device with a plurality of DL and/or UL BWPs (channels and/or subbands). For a Msg1 (e.g., MsgA) transmission, the wireless device may attempt to perform an LBT in one or more UL BWPs configured with RACH resource(s). Once at least one LBT succeeds on a UL BWP, the wireless device may perform Msg1 (e.g., MsgA) transmission via RACH resource(s) in the UL BWP. This may increase the probability of LBT success, for example, if each channel status of the one or more UL BWPs is independent of each other.

For Msg2/Msg4 (or MsgB) enhancement, a base station may attempt to perform at least one LBT in a plurality of DL BWPs. Once one LBT succeeds, the base station may perform Msg2/Msg4 (MsgB) transmission. A wireless device may monitor PDCCH in one or more DL BWPs of the plurality of DL BWPs. The one or more DL BWPs may be associated with one or more UL BWPs where the wireless device transmits at least one Msg1, Msg3 and/or MsgB. The one or more DL BWPs may be predefined and/or semi-statically configured by a RRC message transmitted by the base station.

For Msg3 enhancement, a base station may transmit at least one RAR comprising a plurality of UL grants corresponding to a plurality of BWPs. For example, the at least one RAR may comprises one or more UL grants, each of the one or more UL grants may comprise one or more fields indicating a BWP identifier and time/frequency domain resource in a BWP corresponding to the BWP identifier. The wireless device may perform at least one LBT in one or more of indicated BWPs (e.g., the plurality of BWPs). Once one LBT succeeds, the wireless device may perform Msg3 transmission.

For example, a wireless device may transmit Msg1 and Msg3 via different channels (e.g., UL BWPs and/or subbands). For example, a wireless device may receive Msg2 and Msg4 via different channels (e.g., DL BWPs and/or subbands). For example, a wireless device may transmit Msg1 for a preamble retransmission via a channel (e.g., a UL BWP and/or a subband). The channel may be different from a channel where the wireless device transmits Msg1 in a previous preamble (re)transmission.

In a radio access technology (e.g., LTE LAA and/or NR unlicensed), a base station may configure multiple preamble transmission opportunities over a frequency domain. A wireless device may select a different UL BWP (e.g., a different subband) during one or more retransmissions (e.g., comprising an initial transmission) of at least one preamble. For example, a wireless device may transmit a first preamble via a first PRACH in a first BWP (or a first subband) for a first (re)transmission during an RA procedure. The wireless device may transmit a second preamble via a second PRACH in a second BWP (or a second subband) for a second (re)transmission during the RA procedure. The first BWP (or the first subband) may be different from the second BWP (resp. the second subband), for example, depending on one or more LBT results at least on the first and second BWPs (or the first and second subbands). The first BWP (or the first subband) the second BWP (resp. the second subband) may be the same, for example, depending on one or more LBT results at least on the first and second BWPs (or the first and second subbands).

Figure 33:
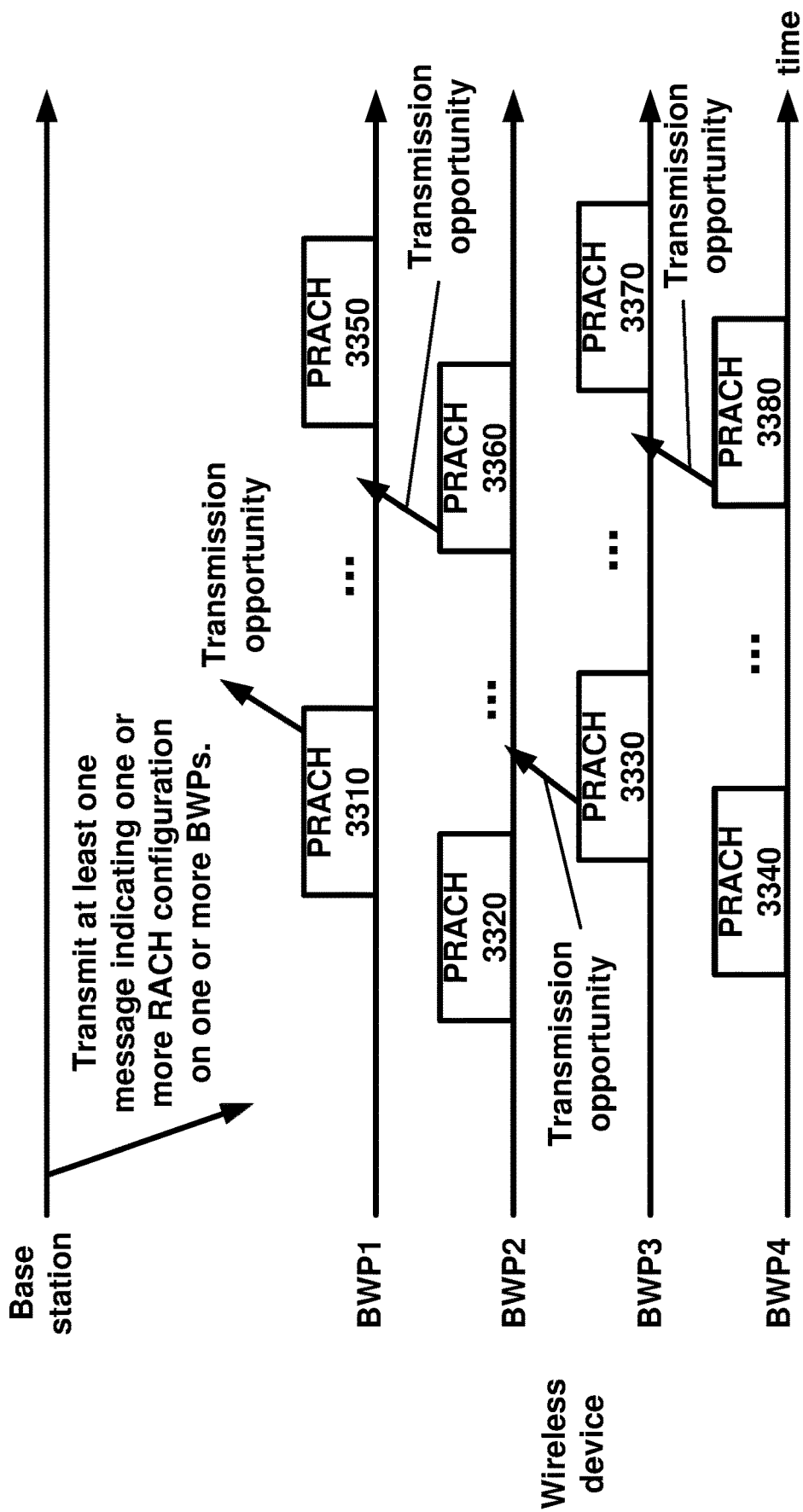
FIG. 33 is an example of one or more preamble transmission opportunities as per an aspect of an embodiment of the present disclosure.

FIG. 33 is an example of one or more preamble transmission opportunities configured via one or more BWPs (or subbands). A base station may transmit one or more RRC messages indicating one or more PRACH resources for one or more preamble transmission opportunities on one or more BWPs. The wireless device may select at least one PRACH (and/or at least one BWP or subband) for at least one preamble transmission. The wireless device may select a different PRACH (and/or different BWP or subband), for example, when the wireless device performs a preamble retransmission. For example, an LBT result may determine a selection of PRACH. For example, a wireless device may perform one or more LBTs before one or more PRACHs (e.g., PRACH 3310, PRACH 3320, PRACH 3330, PRACH 3340). The wireless device may transmit at least one preamble via at least one PRACH (BWP, and/or subband) where a corresponding LBT succeeds. For example, the wireless device may determine a plurality of preamble transmission opportunities over one or more PRACHs (e.g., PRACH 3310, PRACH 3330). The wireless device may select one of the one or more PRACHs, for example, based on a random selection. The wireless device may determine a retransmission of at least one preamble, for example, if the wireless device determine that a reception of an RAR is not successful and/or a contention resolution is not unsuccessful. The wireless device may determine one or more preamble transmission opportunities over one or more PRACHs (e.g., PRACH 3360, PRACH 3380) that may be configured in different BWP(s) (or subband(s)).

For a retransmission of preamble, a wireless device may delay the retransmission of preamble based on a backoff time. In a legacy system, a BI (e.g., BI in FIG. 19B) may subject to a UL BWP (e.g., an initial UL BWP) configured for a random access procedure (e.g., configured in a SIB1 IE). A number of the UL BWP(s) (e.g., the initial UL BWP(s)) may be at most one in a legacy system. In a radio access technology (e.g., LTE LAA and/or NR unlicensed), a base station may configure multiple preamble transmission opportunities over a frequency domain. A wireless device may select a different UL BWP (e.g., a different subband), for example, each time of one or more retransmissions (e.g., comprising an initial transmission) of at least one preamble. There may be a need to manage one or more backoff times of one or more (initial) UL BWPs (or subbands) that one or more PRACH are configured.

For example, a wireless device may transmit to a base station, at least one preamble. The wireless device may receive, from a base station, a random access response comprising a plurality of BIs. For example, a single MAC subPDU may indicates a single BI. For example, a single MAC subPDU may indicates the plurality of BIs. For example, a plurality of MAC subPDUs may indicates the plurality of BIs. For example, each of the plurality of BIs may be associated with at least one BWP (and/or at least one subband). An association may be indicated by a field with a BI field. For example, each of the plurality of BIs may comprise an BWP (or a subband) index (or indicator) and a BI field. The wireless device may determine a backoff value of the BWP (or the subband) based on a value indicated by the BI field.

Figure 34A:
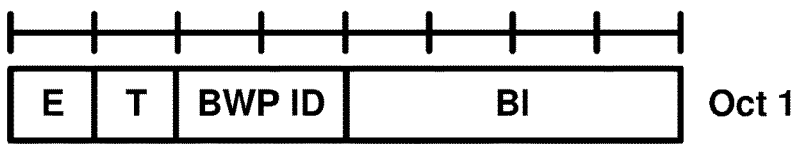
FIG. 34A, FIG. 34B, FIG. 34C, FIG. 34D, and FIG. 34E are examples of a MAC subPDU (or an RAR) as per an aspect of an embodiment of the present disclosure.
Figure 34B:
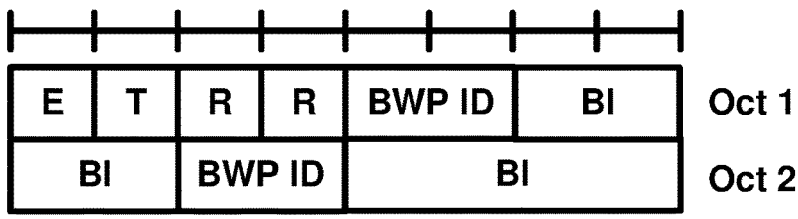
Figure 34C:
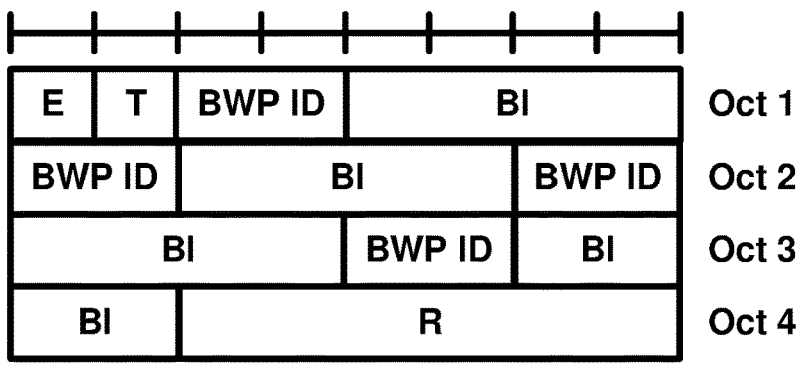
Figure 34D:
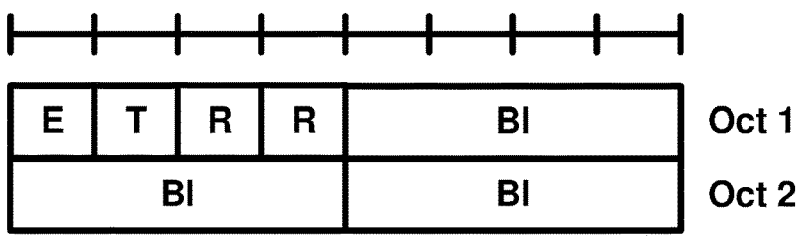
Figure 34E:
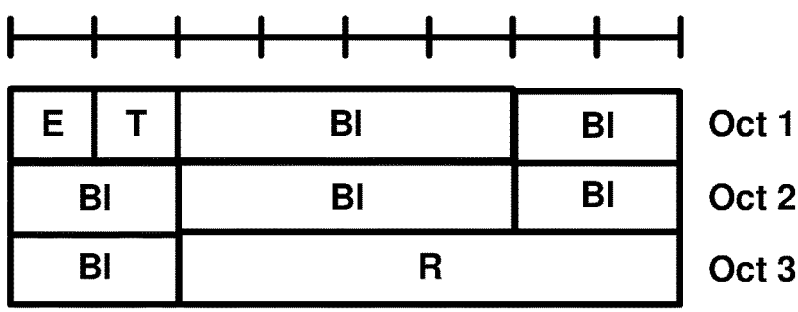

FIG. 34A, FIG. 34B, FIG. 34C, FIG. 34D, and FIG. 34E are examples of a MAC subPDU (or an RAR) comprising one or more BIs. FIG. 34A, FIG. 34B, FIG. 34C, FIG. 34D, and FIG. 34E are example of a MAC subPDU comprise at least one of following: an extension field (E) indicating if the MAC subPDU is a last MAC subPDU or not in a MAC PDU, a type filed (T) indicating whether the MAC subPDU (or subheader) comprises at least one RAP ID or at least one BI, a reservation filed (R) indicating one or more reserved bit (R may be set to zero), a backoff indicator field (BI) indicating an overload condition and/or indicating one of PREAMBLE_BACKOFF (e.g., one of indices indicating backoff parameter values in FIG. 32), and/or a BWP index field indicating one of configured one or more UL BWPs (e.g., UL BWP or initial UL BWP). In an implementation, one or more fields in FIG. 34A, FIG. 34B, FIG. 34C, FIG. 34D, and FIG. 34E may not be used (dropped or omitted). One or more fields in FIG. 34A, FIG. 34B, FIG. 34C, FIG. 34D, and FIG. 34E may be presented in a different order. A wireless device may transmit at least one preamble and receive an RAR comprising a MAC subPDU indicating a BI in FIG. 19B. The wireless device may apply the BI to determine a backoff time for a BWP (or subband) where the at least one preamble transmitted. A wireless device may transmit at least one preamble and receive an RAR comprising a MAC subPDU indicating a BI in FIG. 34A. The wireless device may apply the BI to determine a backoff time for a BWP (or subband) indicated by BWP ID. For example, a base station may transmit a MAC PDU (an RAR) indicating one or more BIs in one or more MAC subPDUs. For example, a wireless device may receive a MAC PDU comprising one or more MAC subPDUs, each may comprise a BI filed and a BWP ID field (e.g. in FIG. 34A). A wireless device may transmit at least one preamble and receive an RAR comprising a MAC subPDU indicating a plurality of BIs (e.g., in FIG. 34B, in FIG. 34C, FIG. 34D and/or in FIG. 34E). For example, a number of BIs in the MAC subPDU may be the same to or less than a number of one or more UL (or DL) BWPs (subbands) configured. FIG. 34B is an example of two BIs are indicated in a MAC subPDU. FIG. 34C is an example of four BIs are indicated in a MAC subPDU. For example, a wireless device may select one or more PRACH for preamble (re) transmission(s) from one or more BWPs (subbands) among a plurality of BWPs indicated by a plurality of BWP IDs in the received RAR. A wireless device may receive a MAC subPDU comprising one or more BIs without BWP ID. FIG. 34D and FIG. 34E are examples of a MAC subPDU comprising three and four BIs, respectively, without BWP ID. For example, a mapping between a BI and a BWP may be predefined. For example, a BI firstly located in a MAC subPDU may be associated with a BWP #0, and a BI secondly located in a MAC subPDU may be associated with a BWP #1, and so on. A wireless device may receive a MAC PDU (an RAR) comprising one or more MAC subPDUs. For example, each of one or more MAC subPDUs may comprise at least one BI and/or at least one BWP ID of the at least one BI. A wireless device may receive a plurality of MAC PDUs (e.g., RARs) comprising one or more MAC subPDUs. For example, each of one or more MAC subPDUs may comprise at least one BI and/or at least one BWP ID of the at least one BI. In an implementation, a BWP ID may be replaced by a frequency resource indicator (e.g., a channel index, frequency index, PRB index, a subband ID).

Figure 35:
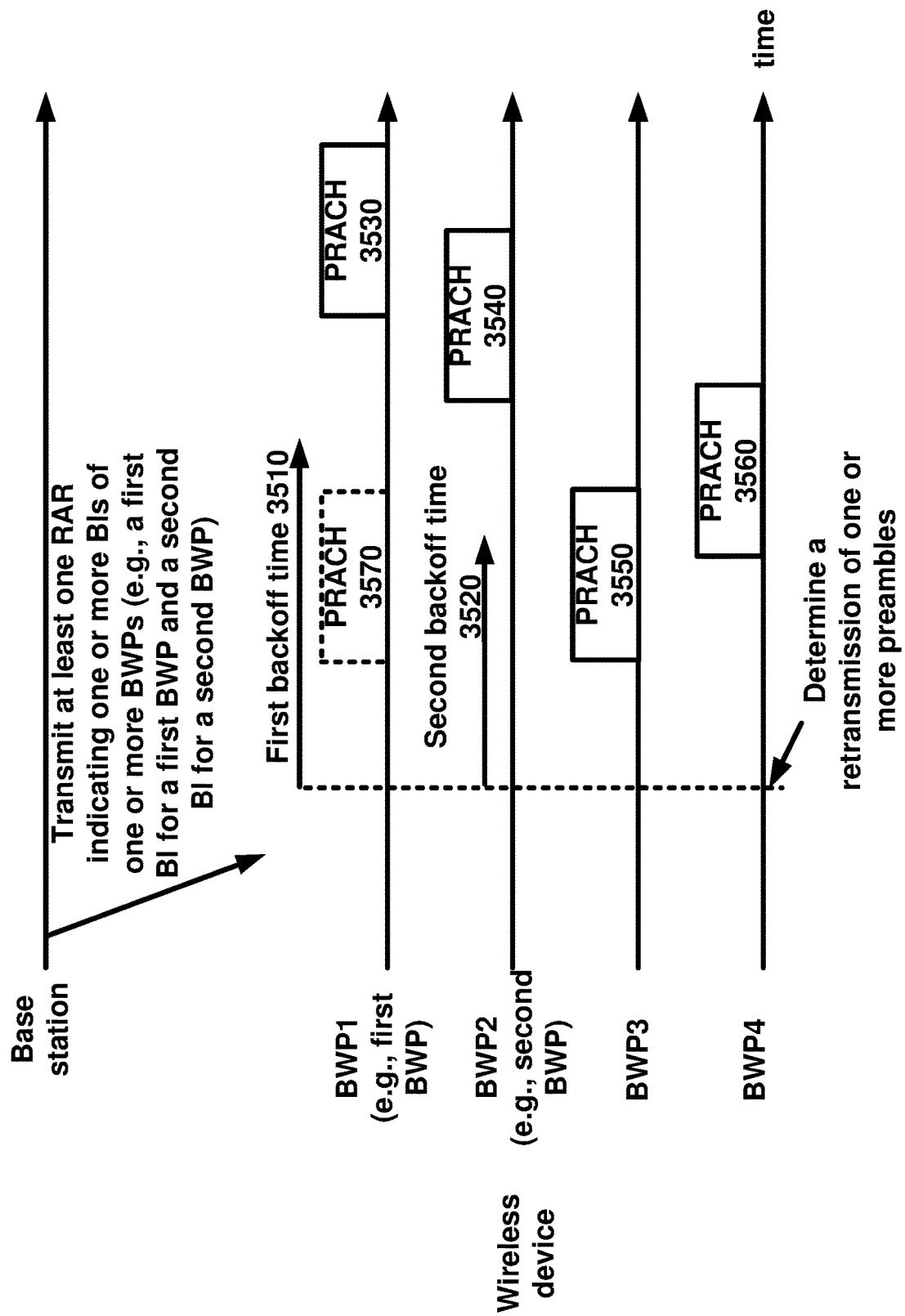
FIG. 35 is an example of one or more preamble transmissions with one or more backoff times as per an aspect of an embodiment of the present disclosure.

FIG. 35 is an example of one or more preamble transmissions with one or more backoff times. A wireless device may receive, from a base station, at least one RAR indicating one or more BIs of one or more BWPs. For example, the at least one RAR may comprise a first BI for a first BWP and a second BI for a second BWP. The wireless device may determine a retransmission of one or more preambles. The retransmission may be determined, for example, based on (or in response to) a determination of a random access procedure being not completed (e.g., a reception of an RAR being unsuccessful and/or a contention resolution being unsuccessful). The wireless device may determine one or more backoff times of one or more BWPs (or subbands) based on the one or more BIs in the at least one RAR. For example, in FIG. 35, the wireless device may determine a first backoff time 3510 based on a first BI and a second time offset 3520 based on a second BI. Mapping between a BI field and a BWP may be indicated by a BWP ID in the at least one RAR or predefined. The wireless device may perform a retransmission of at least one preamble transmission with a delay of a time offset. For example, in FIG. 35, the wireless device may attempt to perform a retransmission of at least one preamble transmission on a PRACH 3530 in a first BWP with a delay of the first backoff time 3510 and/or a PRACH 3540 in a second BWP with a delay of the second backoff time 3520. A wireless device may select at least one preamble retransmission opportunity among one or more PRACHs (e.g., PRACH 3530 and PRACH 3540) in one or more BWPs (or subbands, e.g., in BWP1 and BWP 2 in FIG. 35) associated with one or more BIs in the at least one RAR. A wireless device may select at least one preamble retransmission opportunity among one or more PRACHs (e.g., PRACH 3530, PRACH 3540, PRACH 3550, and/or PRACH 3560) in one or more BWPs (or subbands, e.g., BWP1, BWP2, BWP3, and BWP4 in FIG. 35) configured in one or more RRC messages (e.g., SIB1). For example, a wireless device may select at least one preamble retransmission opportunity among a plurality of PRACHs. For example, the plurality of PRACHs may comprise at least one PRACH resource (e.g., PRACH 3570) configured within a delay (First backoff time 3510). For example, the plurality of PRACHs may not comprise the at least one PRACH resource (e.g., PRACH 3570) configured within the delay (First backoff time 3510). A wireless device may determine, based on a type of a RA procedure, whether the plurality of PRACHs may or may not comprise the at least one PRACH resource (e.g., PRACH 3570) configured within the delay (First backoff time 3510). For example, the plurality of PRACHs may comprise at least one PRACH resource (e.g., PRACH 3570) configured within a delay (First backoff time 3510), for example, for a CFRA procedure, an RA for a beam failure recovery request, and/or an RA for an SI request. For example, the plurality of PRACHs may not comprise the at least one PRACH resource (e.g., PRACH 3570) configured within the delay (First backoff time 3510), for example, for a CBRA procedure.

There may be a case that the at least one RAR may not comprise a BI of a BWP that may be activated (or allowed) for the retransmission (e.g., BWP3 and/or BWP4 in FIG. 35). In this case, a wireless device may select at least one preamble retransmission opportunity among one or more PRACHs (e.g., PRACH 3530 and PRACH 3540) in one or more BWPs (or subbands, e.g., in BWP1 and BWP 2 in FIG. 35) associated with one or more BIs in the at least one RAR.

Figure 36A:
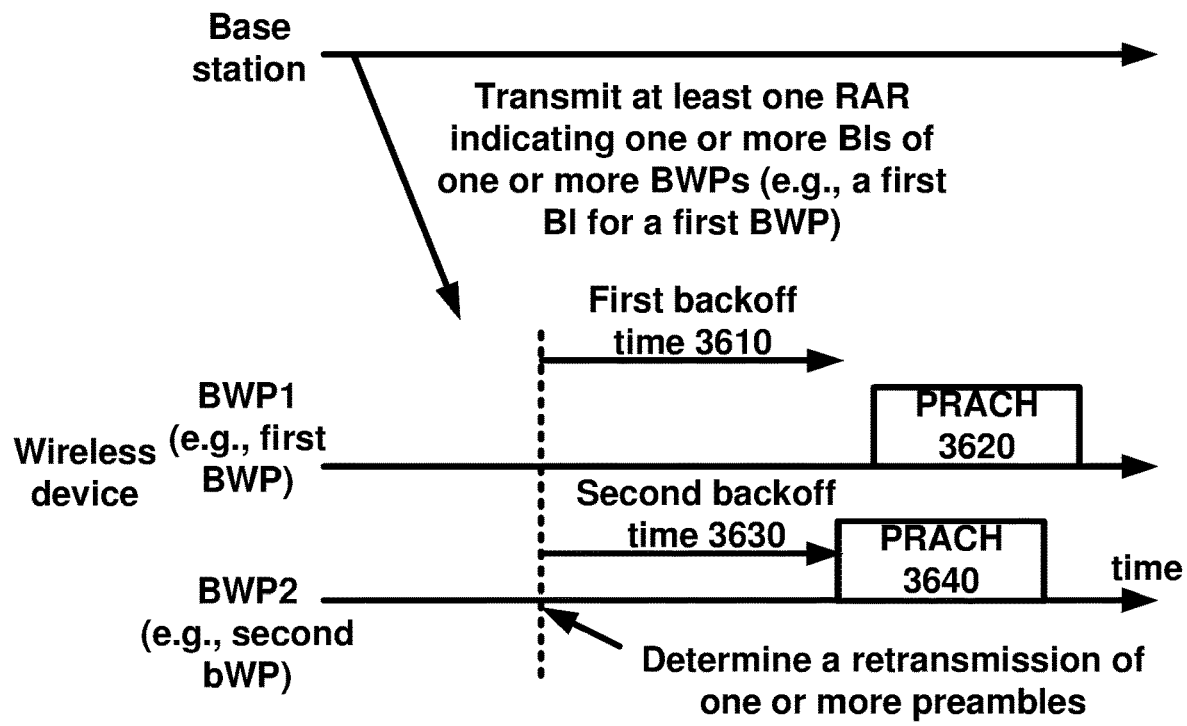
FIG. 36A and FIG. 36B are examples of one or more preamble transmissions with one or more backoff times as per an aspect of an embodiment of the present disclosure.

There may be a case that the at least one RAR (e.g., FIG. 36A) may not comprise a BI of a BWP (e.g., BWP2 in FIG. 36A) that may be activated (or allowed) for the retransmission (e.g., BWP2 in FIG. 36A). In this case, the wireless device may set its corresponding backoff time (e.g., Second backoff time 3630) based on one of the one or more BIs (e.g., a first BI in FIG. 36A) in the at least one RAR (e.g., the one of the one or more BIs may be selected based on a random selection, the one may be a largest or smallest value of the one or more BIs). The wireless device may set its corresponding backoff time (e.g., Second backoff time 3630) to a predefined value (e.g., 0 ms). The wireless device may select at least one preamble retransmission opportunity among one or more PRACHs (e.g., PRACH 3620 and PRACH 3640) in one or more BWPs (or subbands, e.g., BWP1, BWP2 in FIG. 36) configured in one or more RRC messages (e.g., SIB1).

There may be a case that a first RAR (e.g., a first RAR in FIG. 36B) may not comprise a BI of a BWP (e.g., BWP2 in FIG. 36B) that may be activated (or allowed) for the retransmission. The wireless device may set its corresponding backoff time (e.g., second backoff time 3620) based on a second RAR (e.g., Second RAR in FIG. 36B) that the wireless device received previously (e.g., before receiving First RAR in FIG. 36B). For example, a wireless device may receive the first RAR and the second RAR in a same RA procedure. For example, a wireless device may receive the first RAR and the second RAR in a different RA procedure. The second RAR may comprise a second BI corresponding to a second BWP (e.g., BWP2 in FIG. 36B). The wireless device may store a PREAMBLE_BACKOFF indicated by the second BI for the second BWP and may apply the PREAMBLE_BACKOFF to the second backoff time 3670. The wireless device may set the second backoff time 3670 based on one of the one or more BIs (e.g., the first BI in FIG. 36B) in the first RAR (e.g., the one of the one or more BIs may be selected based on a random selection, the one may be a largest or smallest value of the one or more BIs), for example, if there is no stored PREAMBLE_BACKOFF for BWP2. The wireless device may set the second backoff time 3670 to a predefined value (e.g., 0 ms), for example, if there is no stored PREAMBLE_BACKOFF for BWP2. The wireless device may select at least one preamble retransmission opportunity among one or more PRACHs (e.g., PRACH 3660, PRACH 3680) in one or more BWPs (or subbands, e.g., BWP1, BWP2 in FIG. 36) configured in one or more RRC messages (e.g., SIB1).

Figure 36B:
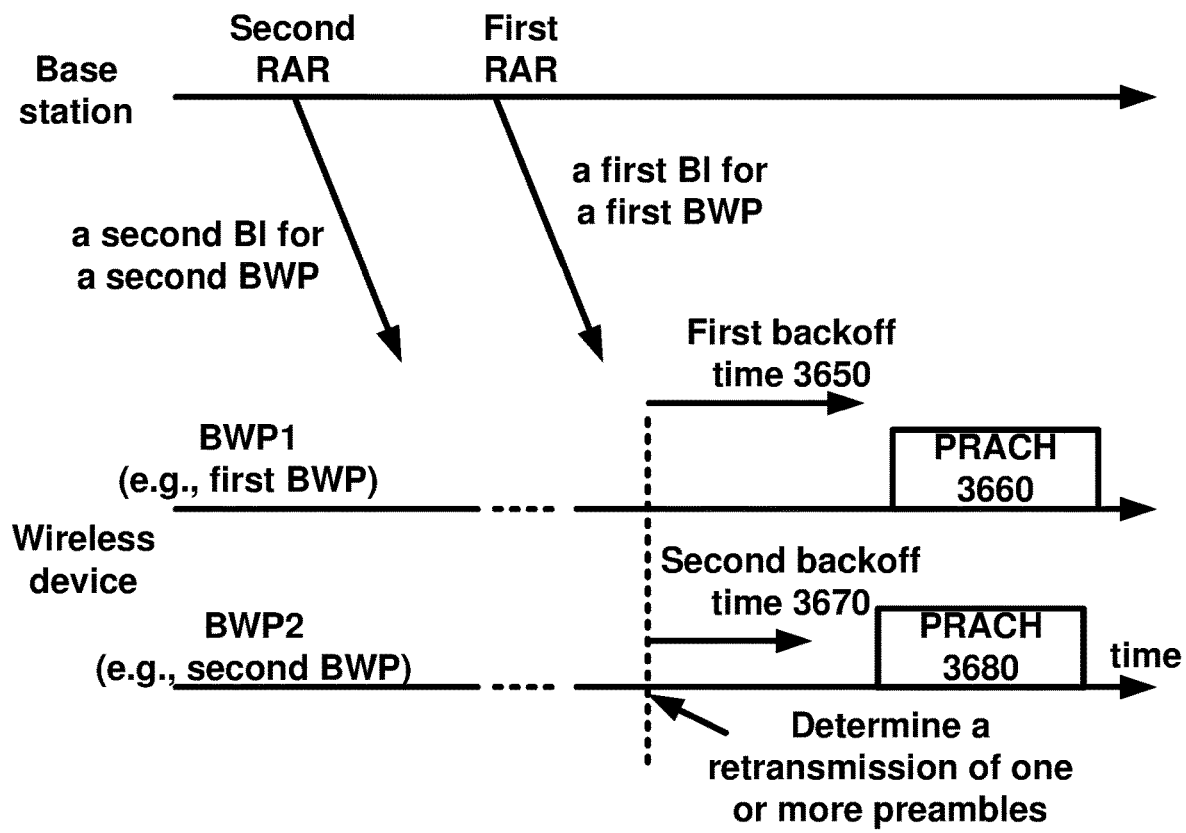
Figure 37:
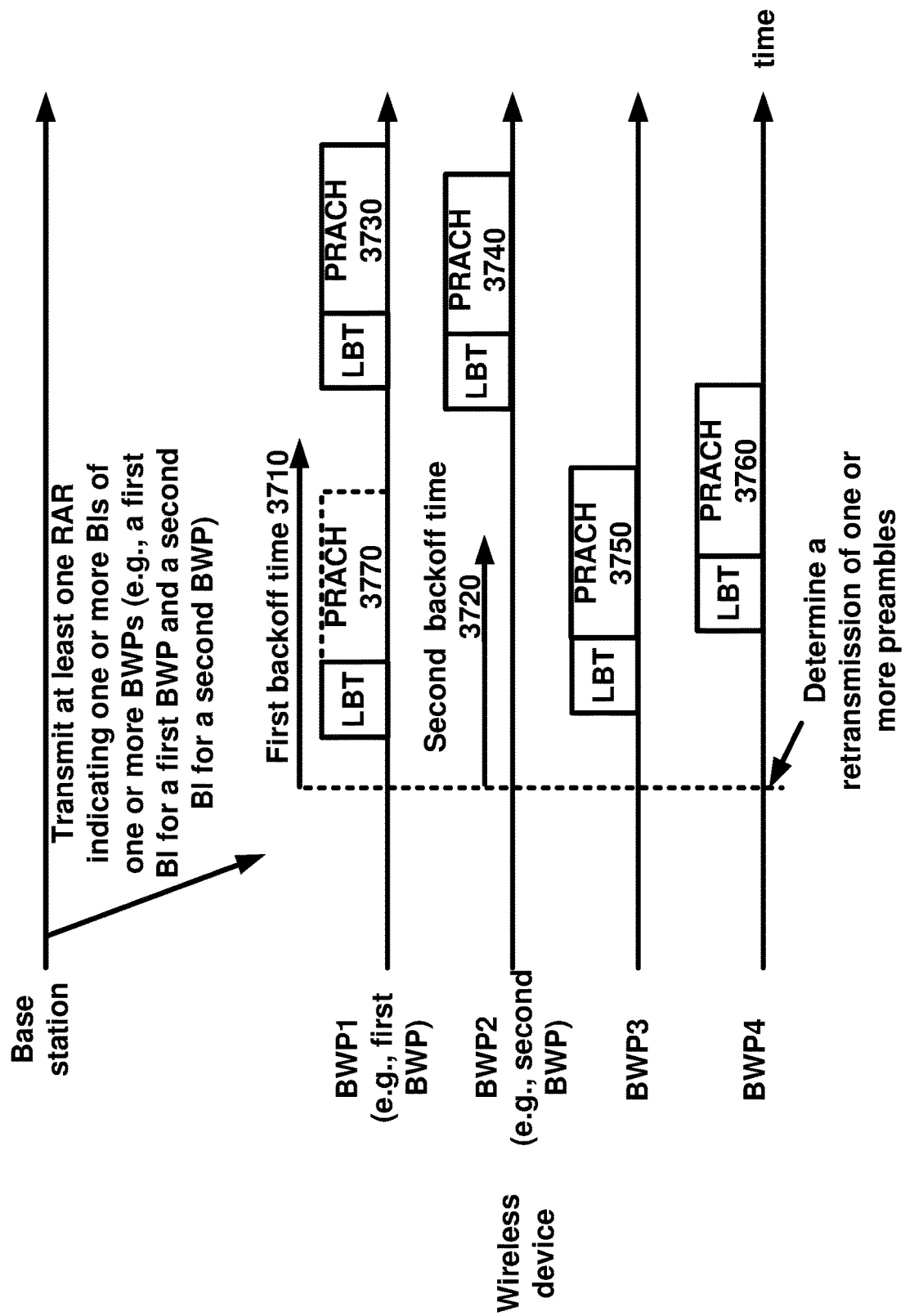
FIG. 37 is an example of one or more LBTs performed with one or more backoff times as per an aspect of an embodiment of the present disclosure.

Examples in FIG. 35, FIG. 36A, and FIG. 36B may be implemented with one or more LBTs in unlicensed band(s). FIG. 37 is an example of one or more LBTs performed with one or more backoff times. A wireless device may perform a preamble retransmission in an unlicensed band. For example, one or more UL BWPs (e.g., four UL BWPs in FIG. 37) may be configured in an unlicensed band for a random access procedure. A wireless device may determine when to attempt an LBT. For example, a wireless device may perform an LBT with (after, and/or in response to) a delay of a backoff time for a preamble (re)transmission. For example, a wireless device may perform an LBT (e.g., LBT for PRACH 3740) with a delay of a backoff time (e.g., second backoff time 3720) for a preamble (re)transmission, for example, for a CBRA procedure. For example, a wireless device may perform an LBT (e.g., LBT for PRACH 3770) regardless of a delay of a backoff time for a preamble (re)transmission, for example, for a CFRA procedure. A wireless device may select at least one preamble opportunity over a PRACH being sensed as idle by an LBT.

Figure 38:
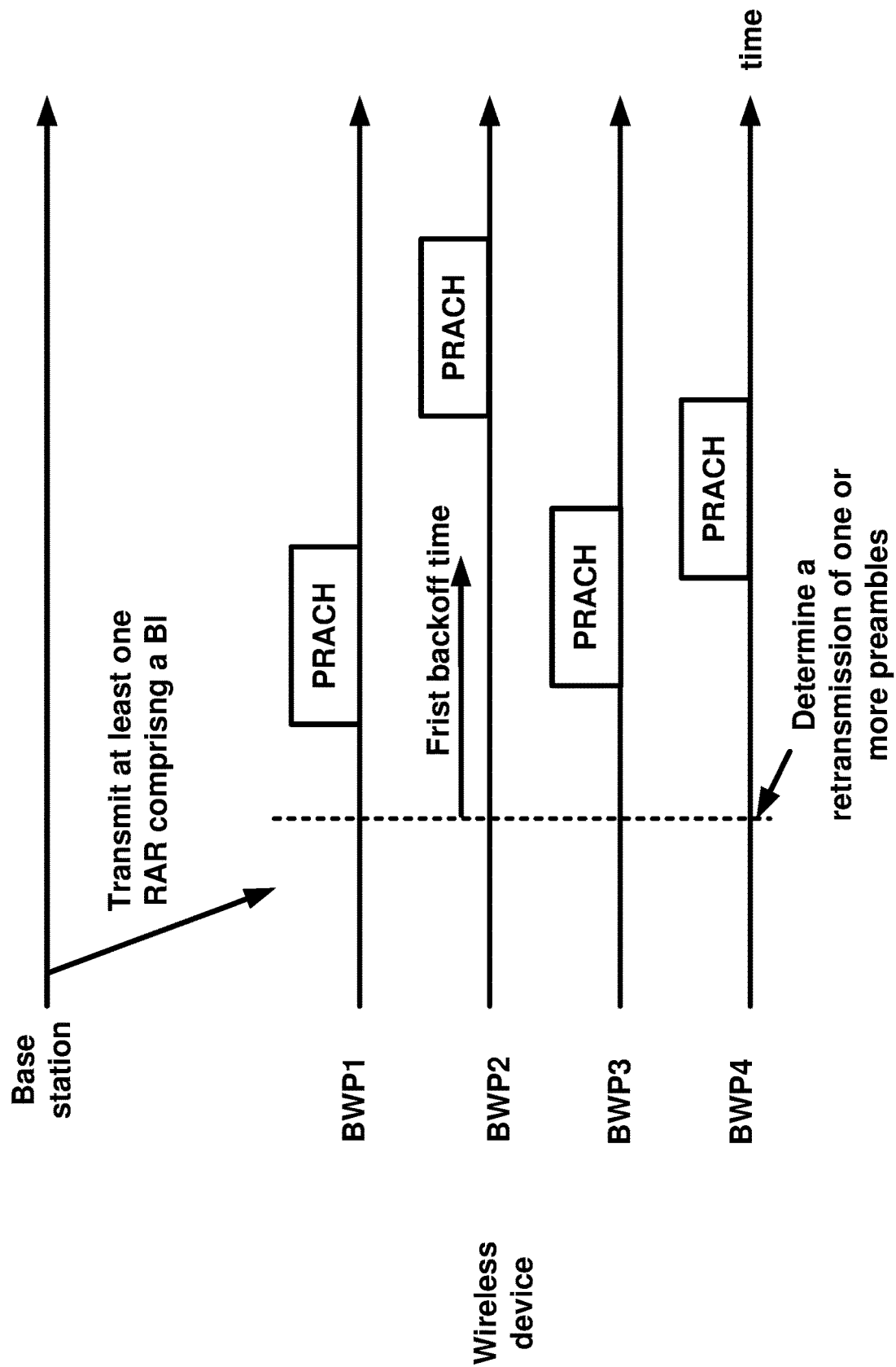
FIG. 38 is an example of a single BI as per an aspect of an embodiment of the present disclosure.
Figure 39:
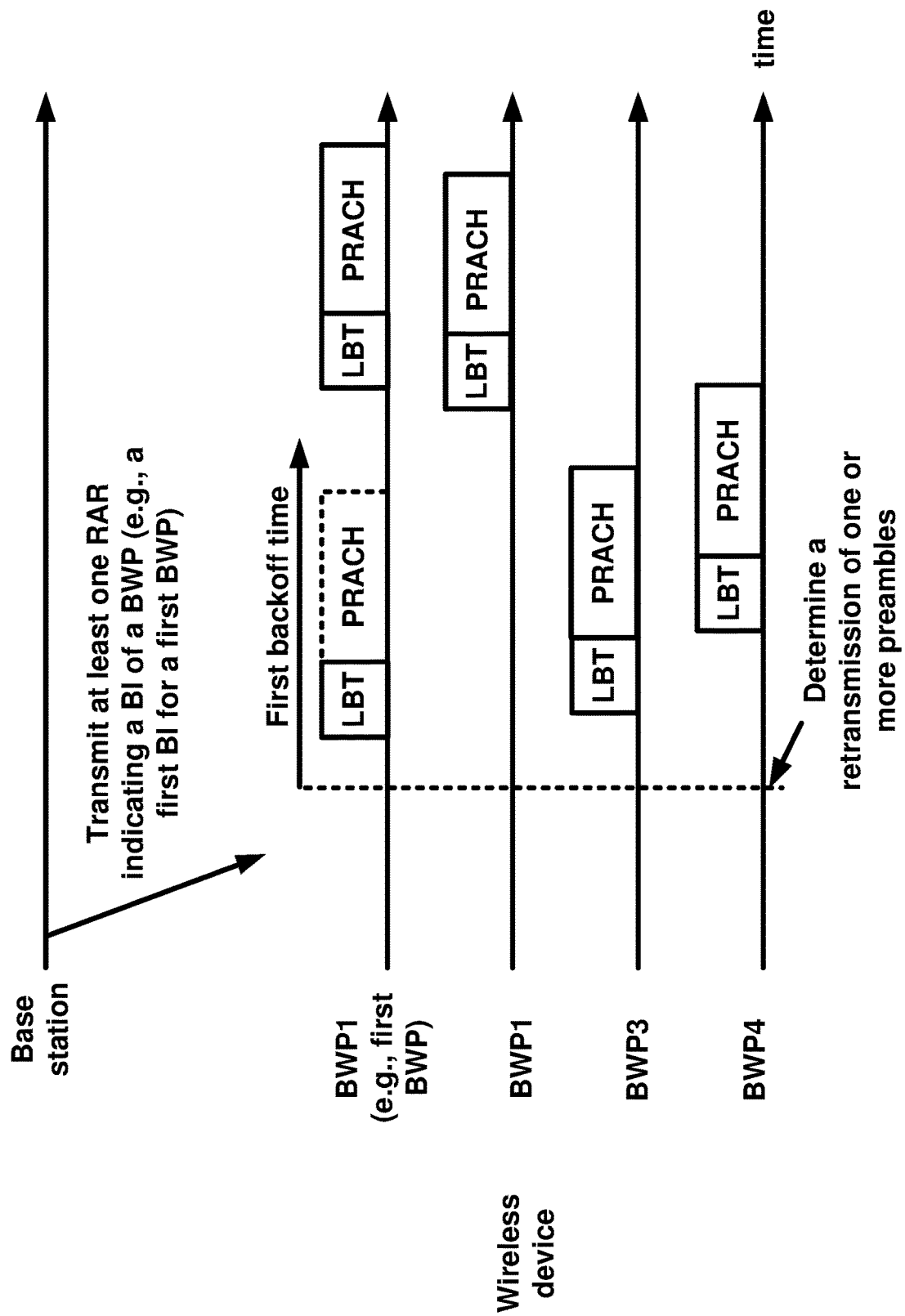
FIG. 39 as per an aspect of an embodiment of the present disclosure

FIG. 38 is an example of a single BI. For example, the example in FIG. 35 may be the example in FIG. 38, for example, if the at least one RAR comprises a single BI. FIG. 39 is an example of a single BI. For example, the example in FIG. 37 may be the example in FIG. 39, for example, if the at least one RAR comprises a single BI.

Figure 40:
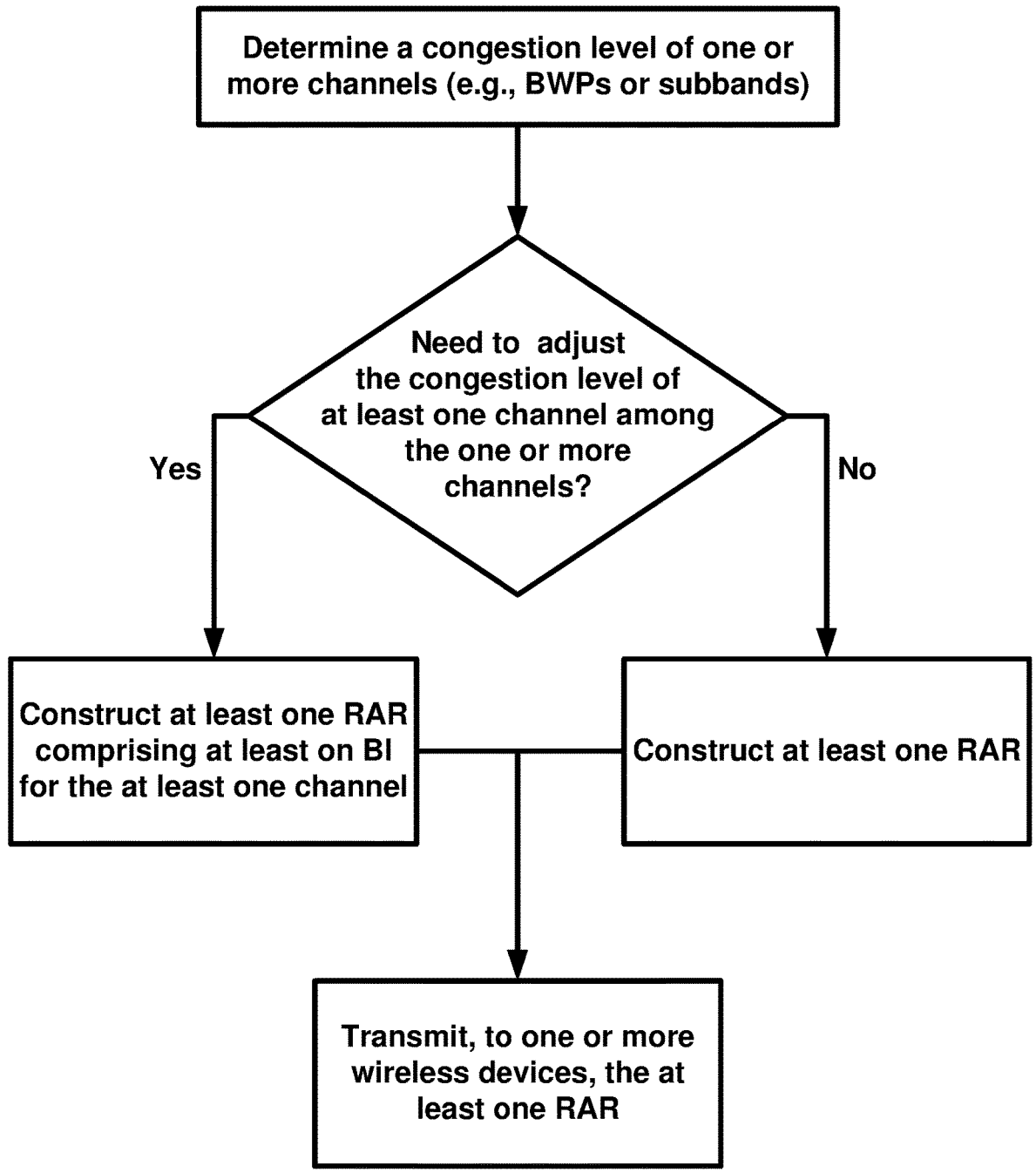
FIG. 40 is an example flowchart of a base station as per an aspect of an embodiment of the present disclosure.

FIG. 40 is an example flowchart of a base station. A base station may measure a congestion level of one or more channels (e.g., BWPs, and/or subbands). For example, the one or more channels may comprise one or more PRACH resources. The congestion level may be determined based on one or more reports (e.g., key performance indicators) comprising a load information (e.g., interference level, throughput, number of drop calls, number of contentions, etc.). The base station may construct a MAC PDU (e.g., an RAR) comprising at least one BI that indicating a congestion level and/or PREAMBLE_BACKOFF of at least one channel (e.g., BWP and/or subband), for example, if the base station may determine to adjust the congestion level. The base station may construct a MAC PDU (e.g., an RAR) with no BI, for example, if the base station may not need to adjust the congestion level. The base station may transmit, to one or more wireless devices, the constructed MAC PDU. The constructed MAC PDU (e.g., an RAR) may be transmitted with one or more transmitting beams via one or more frequency/time domain resources.

Figure 41:
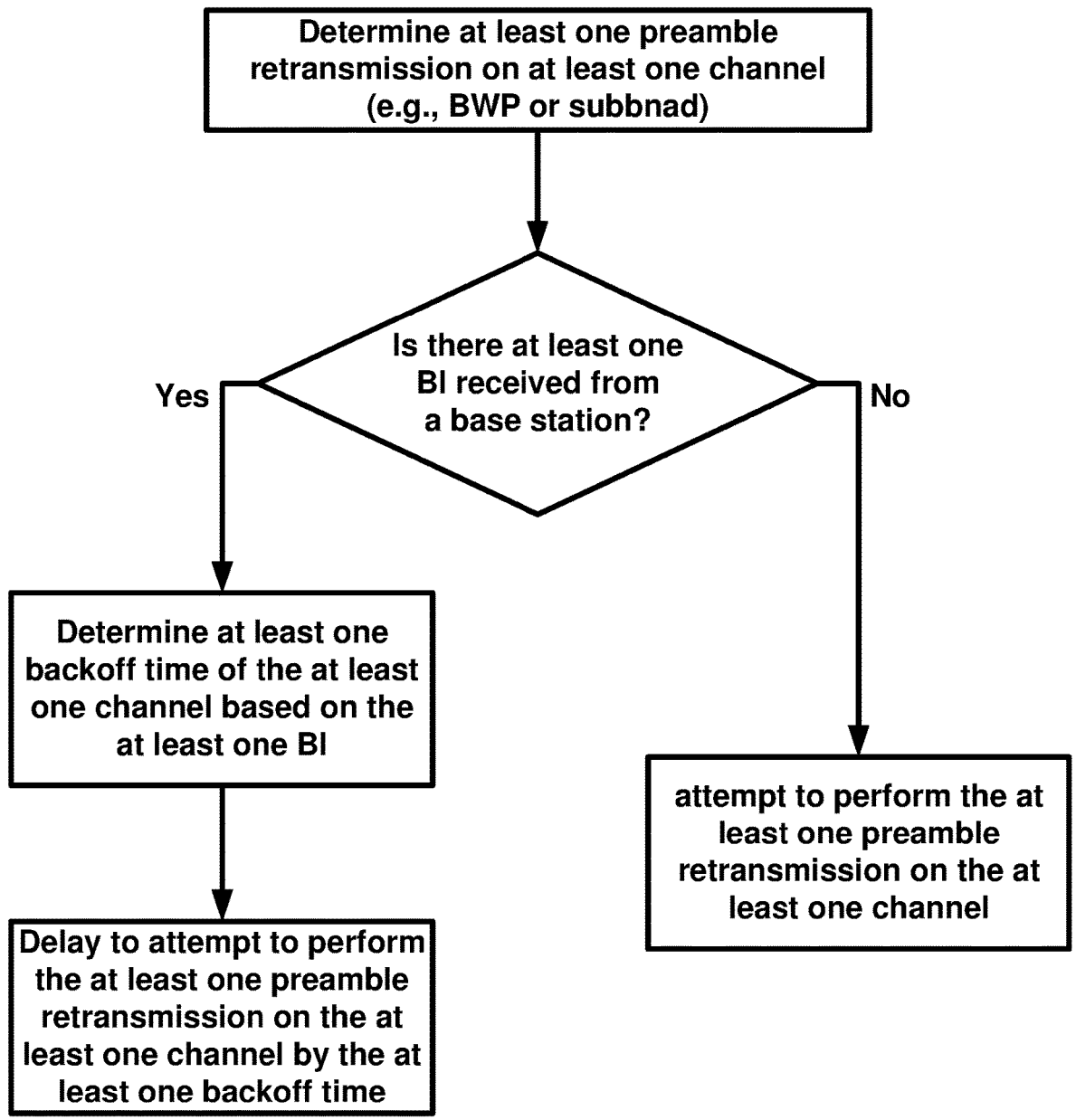
FIG. 41 is an example flowchart of a wireless device as per an aspect of an embodiment of the present disclosure.

FIG. 41 is an example flowchart of a wireless device. A wireless device may perform (or initiate) a RA procedure. The wireless device may determine at least one preamble retransmission on at least one channel (e.g., BWP or subband). The wireless device may determine at least one backoff time of the at least one channel based on the at least one BI (e.g., based on one or more examples from FIG. 35 to FIG. 39), for example, if the wireless device may receive, from a base station, at least one RAR comprising at least one BI. The wireless device may delay attempting to perform the at least one preamble retransmission on the at least one channel by the at least one backoff time. The wireless device may attempt to perform the at least one preamble retransmission on the at least one channel in response to the determining the at least one preamble retransmission, for example, if the wireless device may not receive, from a base station, at least one RAR comprising at least one BI. For example, the at least one preamble retransmission may subject to one or more LBTs in an unlicensed band.

In an example, a wireless device may receive, from a base station, one or more messages comprising: configuration parameters of a plurality of subbands, the plurality of subbands comprising: a first subband; and one or more second subbands. The wireless device may transmit the at least one first preamble via first random access resources on the first subband. The wireless device may receive a random access response comprising a backoff indicator. The wireless device may determine a preamble retransmission. The wireless device may perform, in response to determining the preamble retransmission: a first channel access procedure on the first subband with a delay based on the backoff indicator; and one or more second channel access procedures on the one or more second subbands. The wireless device may transmit at least one second preamble. In an example, the at least one second preamble may be transmitted via second random access resources. In an example, the second random access resources may be on one of the plurality of subbands being sensed idle. In an example, the wireless device may select the first subband among the plurality of subbands. For example, the selecting the first subband among the plurality of subbands may be based on the first subband being sensed idle. The wireless device may determine the first subband in response to the first subband being sensed idle. In an example, the random access response comprises a preamble identifier corresponding to the at least one first preamble. In an example, the wireless device may calculate a radio network temporary identifier based on time and frequency indices of the at least one of random access channel resources. For example, the random access response is scrambled by the radio network temporary identifier.

In an example, a wireless device may receive, from a base station, a message comprising one or more random access configuration parameters indicating a plurality of random access channel occasions in a plurality of subbands of a cell. The wireless device may transmit, to the base station, at least one first preamble via a first random access channel occasion selected among the plurality of the random access channel occasions. The wireless device may receive a random access response comprising a plurality of backoff indicators. For example, each of the plurality of the backoff indicators is associated with one of the plurality of subbands. The wireless device may transmit at least one second preamble via a second random access channel occasion. For example, the second random access channel occasion may be selected: among the plurality of random access channel occasions; and based on a first backoff time determined by one of the plurality of backoff indicators associated with a subband of the second random access channel occasion. In an example, the plurality of subbands are in unlicensed bands. The wireless device may perform one or more listen-before-talks (LBTs) on at least one of the plurality of the random access channel occasions. For example, the second random access channel occasion is sensed to be idle based on at least one of the one or more LBTs. For example, the at least one of the one or more LBTs is an LBT success. For example, the at least one of the one or more LBTs is an LBT firstly succeeded among the one or more LBTs. For example, the cell is an unlicensed cell. The wireless device may select the first backoff time according to a uniform distribution between zero and a value indicated by the one of the plurality of backoff indicators. The wireless device may delay the transmitting the at least one second preamble at least by the first backoff time. The wireless device may apply (or scale, or adjust) the first backoff time based on a scaling factor. For example, the one or more random access configuration parameters indicates the scaling factor. In an example, the random access response comprises a subheader comprising an index indicating the at least one first preamble. For example, the one of the plurality of subbands comprise at least one bandwidth part. For example, at least one bandwidth part may comprise one of the plurality of subbands.

In an example, a wireless device may receive, from a base station, a message comprising one or more random access configuration parameters indicating a plurality of random access channel occasions in a plurality of subbands, the plurality of subbands comprising a first subband and at least one second subbands. The wireless device may transmit, to the base station, at least one first preamble via a first random access channel occasion selected among the plurality of the random access channel occasions. The wireless device may receive a random access response comprising at least one backoff indicator. For example, the at least one backoff indicator is associated with the first subband. The wireless device may delay a determination selecting: at least one first random access channel occasion in the first subband by a first backoff time determined by the at least one backoff indicator; and/or at least one second random access channel occasion in the at least one second subbands by a second backoff time. The wireless device may transmit at least one second preamble via a second random access channel occasion. For example, the first subband and the second subband are in unlicensed bands. The wireless device may perform a first listen-before-talks (LBT) for the at least one first random access channel occasion and a second LBT for the at least one second random access channel occasion. For example, the second random access channel occasion may be sensed to be idle based on at least one of the one or more LBTs. For example, the second random access channel occasion may be the at least one first random access channel occasion in response to determining that the second LBT performed for the at least one second random access channel occasion may be failed. For example, the second random access channel occasion may be the at least one first random access channel occasion in response to further determining that the first LBT being perform after the second LBT. For example, the second random access channel occasion may be the at least one first random access channel occasion in response to determining that the first LBT being perform before the second LBT. For example, the second random access channel occasion may be the at least one second random access channel occasion in response to determining that the first LBT performed for the at least one first random access channel occasion may be failed. For example, the second random access channel occasion may be the at least one second random access channel occasion in response to further determining that the second LBT being perform after the first LBT. For example, the second random access channel occasion may be the at least one second random access channel occasion in response to determining that the second LBT being perform before the first LBT. The wireless device may select the first backoff time according to a uniform distribution between zero and a value indicated by the at least one backoff indicator. For example, the second backoff time may be a particular value (e.g., zero). The particular value may be predefined and/or semi-statically configured by the base station. The wireless device may select the second backoff time according to a uniform distribution between zero and a value indicated by the at least one backoff indicator. The wireless device may receive a second random access response comprising the at least one second backoff indicator. The wireless device may select the second backoff time according to a uniform distribution between zero and a value indicated by at least one second backoff indicator. For example, the wireless device may receive the second random access response before receiving the random access response.

In an example, a wireless device may receive, from a base station, one or more messages comprising configuration parameters of a plurality of subbands. The wireless device may transmit at least one preamble via random access resources on at least two of the plurality of the subbands. The wireless device may receive at least one random access response, each comprising at least one backoff indicator. The wireless device may determine a preamble retransmission. The wireless device may perform, in response to determining the preamble retransmission: a first channel access procedure on a first subband of the plurality of subbands with a delay determined based on at least a first backoff indicator of the at least one backoff indicator; and one or more second channel access procedures on one or more second subbands of the plurality of subbands with delay(s) determined based on at least one second backoff indicator of the at least one backoff indicator. The wireless device may transmit at least one second preamble. For example, the first channel access procedure comprises at least one LBT. For example, the one or more second channel access procedures comprise at least one LBT.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 42 is a flow diagram as per an aspect of an example embodiment of the present disclosure. At 4210, a wireless device transmits a first preamble via a cell. The first preamble may be transmitted for a random access procedure. The cell may comprise a first sub-band and a second sub-band. At 4220, the wireless device receives a random access response. The random access response is received after or in response to transmitting the first preamble. The random access response indicates a first backoff indicator. The first backoff indicator indicates a first backoff time interval of the first sub-band. The random access response indicates a second backoff indicator. The second backoff indicator indicates a second backoff time interval of the second sub-band. At 4230, the wireless device determines a preamble retransmission for the random access procedure. At 4240, the wireless device selects, as a backoff time interval, a shorter one of the first backoff time interval and the second backoff time interval. At 4250, the wireless device performs, at a time determined based on the backoff time interval, a listen-before-talk procedure.

Figure 43:
FIG. 43 is an example flowchart of a base station as per an aspect of an embodiment of the present disclosure.

FIG. 43 is a flow diagram as per an aspect of an example embodiment of the present disclosure. At 4310, a base station may receive, for a random access procedure, a first preamble via a cell. The cell may comprise a first sub-band and a second sub-band. At 4320, the base station may transmit a random access response. The random access response may indicate a first backoff indicator. The random access response may indicate a second backoff indicator. The base station may receive, at a first time, a second preamble as a preamble retransmission for the random access procedure. The first time may be determined based on a backoff time interval that is a shorter one of a first backoff time interval and a second backoff time interval. The first backoff time interval of the first sub-band may be determined based on the first backoff indicator. The second backoff time interval of the second sub-band may be determined based on the second backoff indicator.

According to an example embodiment, a wireless device may transmit, for a random access procedure, a first preamble via a cell comprising a first sub-band and a second sub-band. The wireless device may receive a random access response. The random access response may indicate a first backoff indicator. The first backoff indicator may indicate a first backoff time interval of the first sub-band. The random access response may indicate a second backoff indicator. The second backoff indicator may indicate a second backoff time interval of the second sub-band. The wireless device may determine a preamble retransmission for the random access procedure. The wireless device may select, as a backoff time interval, a shorter one of the first backoff time interval and the second backoff time interval. The wireless device may perform, at a time determined based on the backoff time interval, a listen-before-talk procedure.

According to an example embodiment, the listen-before-talk procedure may be performed, on the first sub-band, based on the first backoff time interval being shorter than the second backoff time interval. According to an example embodiment, the wireless device may transmit a second preamble via the first sub-band. The wireless device may transmit the second preamble based on the listen-before-talk procedure indicating the first sub-band clear. According to an example embodiment, the wireless device may perform, at a second time, a second listen-before-talk procedure on the second sub-band. According to an example embodiment, the second time may be determined based on the second backoff time interval. According to an example embodiment, the wireless device may perform the second listen-before-talk procedure based on the listen-before-talk procedure indicating the first-sub-band occupied. According to an example embodiment, the wireless device may transmit a third preamble via the second sub-band. The wireless device may transmit the third preamble based on the second listen-before-talk procedure indicating the second sub-band clear. According to an example embodiment, there may be no random access channel occasion available on the first-sub-band between the time and the second time. According to an example embodiment, there may be at least one random access channel occasion available on the first-sub-band between the time and the second time. According to an example embodiment, the wireless device may perform, for the at least one random access channel occasion, at least one third listen-before-talk procedure on the first sub-band. According to an example embodiment, the at least one third listen-before-talk procedure may indicate the first-sub-band is occupied. According to an example embodiment, the wireless device may perform, at a third time, at least one fourth listen-before-talk procedure on the first sub-band. According to an example embodiment, the wireless device may perform the fourth listen-before-talk based on the listen-before-talk procedure indicating the first-sub-band occupied. According to an example embodiment, there may be no random access channel occasion available on the second sub-band between the first time and the third time. According to an example embodiment, the wireless device may transmit a fourth preamble via the first sub-band. According to an example embodiment, the wireless device may transmit the fourth preamble based on the fourth listen-before-talk procedure indicating the first sub-band clear. According to an example embodiment, the wireless device may perform at least one fifth listen-before-talk procedure on the second sub-band between the first time and the third time. According to an example embodiment, the at least one fifth listen before-talk procedure may indicate the second sub-band occupied. According to an example embodiment, the at least one fifth listen-before-talk procedure may comprise a sixth listen-before-talk procedure. According to an example embodiment, the wireless device may perform the sixth listen-before-talk procedure at a fifth time. According to an example embodiment, the wireless device may determine the fifth time based on the second backoff time interval. According to an example embodiment, the wireless device may perform the listen-before-talk procedure on the second sub-band based on the second backoff time interval being shorter than the first backoff time interval. According to an example embodiment, the wireless device transmit at least one preamble via the second sub-band based on the listen-before-talk procedure indicating the second sub-band clear.

According to an example embodiment, a wireless device may transmit, for a random access procedure, a first preamble via a bandwidth part. The bandwidth part may comprise a first sub-band and a second sub-band. According to an example embodiment, the wireless device may receive a random access response. The random access response may indicate a first backoff indicator of the first sub-band. The random access response may indicate a second backoff indicator of the second sub-band. According to an example embodiment, the wireless device may determine a preamble retransmission for the random access procedure. The wireless device may transmit a second preamble via the second sub-band. According to an example embodiment, the wireless device transmit the second preamble based on a second listen-before-talk procedure indicating the second sub-band clear. According to an example embodiment, the wireless device may perform the second listen-before-talk before a first time instance determined by the first backoff indicator. According to an example embodiment, the wireless device may perform the second listen-before-talk after a second time instance determined by the second backoff indicator.

According to an example embodiment, a wireless device may transmit, for a random access procedure, a first preamble via a bandwidth part. The bandwidth part may comprise a first sub-band and a second sub-band. The wireless device may receive a random access response. The random access response may indicate a first backoff indicator of the first sub-band. The wireless device may determine a preamble retransmission for the random access procedure. The wireless device may transmit a second preamble via the first sub-band. According to an example embodiment, the wireless device may transmit the second preamble based on a first listen-before-talk procedure. According to an example embodiment, the wireless device may perform the first listen-before-talk procedure based on the determining with a delay. The wireless device may determine the delay based on the first backoff indicator. According to an example embodiment, the first listen-before-talk procedure may indicate the first sub-band clear. According to an example embodiment, the wireless device may transmit the second preamble based on one or more second listen-before-talk procedures. According to an example embodiment, the wireless device may perform the one or more second listen-before-talk procedure indicating the second sub-band occupied;

According to an example embodiment, a base station may receive, for a random access procedure, a first preamble via a cell. According to an example embodiment, the cell may comprise a first sub-band and a second sub-band. The base station may transmit a random access response. The random access response may indicate a first backoff indicator. According to an example embodiment, a first backoff time interval of the first sub-band may be determined based on the first backoff indicator. The random access response may indicate a second backoff indicator. The second backoff time interval of the second sub-band may be determined based on the second backoff indicator. According to an example embodiment, the base station may receive, at a first time, a second preamble as a preamble retransmission for the random access procedure. According to an example embodiment, the first time may be determined based on a backoff time interval that is a shorter one of the first backoff time interval and the second backoff time interval.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   transmitting, by a wireless device and for a random access procedure, a first preamble via a cell comprising a first sub-band and a second sub-band;
   receiving a random access response indicating:
   a first backoff indicator indicating a first backoff time interval of the first sub-band; and
   a second backoff indicator indicating a second backoff time interval of the second sub-band;
   determining a preamble retransmission for the random access procedure;
   selecting, as a backoff time interval, a shorter one of the first backoff time interval and the second backoff time interval; and
   performing, at a time based on the backoff time interval, a listen-before-talk procedure.

2. The method of claim 1, wherein the listen-before-talk procedure is performed on the first sub-band in response to the first backoff time interval being shorter than the second backoff time interval.

3. The method of claim 2, further comprising transmitting a second preamble via the first sub-band based on the listen-before-talk procedure indicating that the first sub-band is clear.

4. The method of claim 2, further comprising performing, at a second time based on the second backoff time interval, a second listen-before-talk procedure on the second sub-band based on the listen-before-talk procedure indicating that the first sub-band is occupied.

5. The method of claim 4, further comprising transmitting a third preamble via the second sub-band in response to the second listen-before-talk procedure indicating the second sub-band is clear.

6. The method of claim 5, wherein there is no random access channel occasion on the first sub-band between the time and the second time.

7. The method of claim 5, wherein there is at least one random access channel occasion on the first sub-band between the time and the second time.

8. The method of claim 7, further comprising performing, for the at least one random access channel occasion, at least one third listen-before-talk procedure on the first sub-band, wherein the at least one third listen-before-talk procedure indicates the first sub-band is occupied.

9. The method of claim 1, further comprising transmitting a fourth preamble via the first sub-band in response to a fourth listen-before-talk procedure indicating the first sub-band is clear, the fourth listen-before-talk procedure performed at a third time on the first sub-band after the listen-before-talk procedure indicating the first sub-band is occupied.

10. The method of claim 9, wherein there is no random access channel occasion on the second sub-band between the time and the third time.

11. A wireless device comprising one or more processors and memory storing instructions that, when executed by the one or more processors, cause the wireless device to:
   transmit, for a random access procedure, a first preamble via a cell comprising a first sub-band and a second sub-band;
   receive a random access response indicating:
   a first backoff indicator indicating a first backoff time interval of the first sub-band; and
   a second backoff indicator indicating a second backoff time interval of the second sub-band;
   determine a preamble retransmission for the random access procedure;
   select, as a backoff time interval, a shorter one of the first backoff time interval and the second backoff time interval; and
   perform, at a time based on the backoff time interval, a listen-before-talk procedure.

12. The wireless device of claim 11, wherein the listen-before-talk procedure is performed on the first sub-band in response to the first backoff time interval being shorter than the second backoff time interval.

13. The wireless device of claim 12, wherein the instructions further cause the wireless device to transmit a second preamble via the first sub-band based on the listen-before-talk procedure indicating that the first sub-band is clear.

14. The wireless device of claim 12, wherein the instructions further cause the wireless device to perform, at a second time based on the second backoff time interval, a second listen-before-talk procedure on the second sub-band based on the listen-before-talk procedure indicating that the first sub-band is occupied.

15. The wireless device of claim 14, wherein the instructions further cause the wireless device to transmit a third preamble via the second sub-band in response to the second listen-before-talk procedure indicating the second sub-band is clear.

16. The wireless device of claim 15, wherein there is no random access channel occasion on the first sub-band between the time and the second time.

17. The wireless device of claim 15, wherein there is at least one random access channel occasion on the first sub-band between the time and the second time.

18. The wireless device of claim 17, wherein the instructions further cause the wireless device to perform, for the at least one random access channel occasion, at least one third listen-before-talk procedure on the first sub-band, wherein the at least one third listen-before-talk procedure indicates the first sub-band is occupied.

19. The wireless device of claim 11, wherein the instructions further cause the wireless device to transmit a fourth preamble via the first sub-band in response to a fourth listen-before-talk procedure indicating the first sub-band is clear, the fourth listen-before-talk procedure performed on the first sub-band after the listen-before-talk procedure indicating the first sub-band is occupied.

20. A base station and a wireless device, wherein:
   the base station comprises one or more processors of the base station and memory storing instructions of the base station that, when executed by the one or more processors of the base station, cause the base station to:
   receive, for a random access procedure, a first preamble via a cell comprising a first sub-band and a second sub-band; and
   transmit a random access response indicating:
   a first backoff indicator indicating a first backoff time interval of the first sub-band; and
   a second backoff indicator indicating a second backoff time interval of the second sub-band; and
   the wireless device comprises one or more processors of the wireless device and memory storing instructions of the wireless device that, when executed by the one or more processors of the wireless device, cause the wireless device to:
   transmit the first preamble;
   receive the random access response;
   determine a preamble retransmission for the random access procedure;

select, as a backoff time interval, a shorter one of the first backoff time interval and the second backoff time interval; and perform, at a time based on the backoff time interval, a listen-before-talk procedure.

\* \* \* \* \*